US010759953B2

(12) United States Patent
Landa et al.

(10) Patent No.: US 10,759,953 B2
(45) Date of Patent: Sep. 1, 2020

(54) INK FORMULATIONS AND FILM CONSTRUCTIONS THEREOF

(71) Applicant: LANDA CORPORATION LTD., Rehovot (IL)

(72) Inventors: Benzion Landa, Nes Ziona (IL); Gregory Nakhmanovich, Rishon LeZion (IL); Galia Golodetz, Rehovot (IL); Sagi Abramovich, Ra'anana (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 16/048,299

(22) Filed: Jul. 29, 2018

(65) Prior Publication Data

US 2019/0023919 A1 Jan. 24, 2019

Related U.S. Application Data

(63) Continuation of application No. 14/917,461, filed as application No. PCT/IB2014/002395 on Sep. 11, 2014, now abandoned.

(60) Provisional application No. 61/876,727, filed on Sep. 11, 2013.

(30) Foreign Application Priority Data

Jan. 23, 2014 (GB) .................................. 1401173.8

(51) Int. Cl.
*C09D 11/107* (2014.01)
*C09D 11/104* (2014.01)
*C09D 11/38* (2014.01)
*C09D 11/06* (2006.01)
*C09D 11/30* (2014.01)
*C09D 11/106* (2014.01)

(52) U.S. Cl.
CPC .......... *C09D 11/107* (2013.01); *C09D 11/104* (2013.01); *C09D 11/106* (2013.01); *C09D 11/30* (2013.01); *C09D 11/38* (2013.01)

(58) Field of Classification Search
CPC ....... C09D 11/07; C09D 11/104; C09D 11/38; C09D 11/06; C09D 11/30
USPC ...................................................... 524/562
See application file for complete search history.

(56) References Cited

U.S. PATENT DOCUMENTS

| | | |
|---|---|---|
| 2,839,181 A | 6/1958 | Renner |
| 3,011,545 A | 12/1961 | Welsh et al. |
| 3,053,319 A | 9/1962 | Cronin et al. |
| 3,697,551 A | 10/1972 | Thomson |
| 3,697,568 A | 10/1972 | Boissieras et al. |
| 3,889,802 A | 6/1975 | Jonkers et al. |
| 3,898,670 A | 8/1975 | Erikson et al. |
| 3,947,113 A | 3/1976 | Buchan et al. |
| 4,009,958 A | 3/1977 | Kurita et al. |
| 4,093,764 A | 6/1978 | Duckett et al. |
| 4,293,866 A | 10/1981 | Takita et al. |
| 4,401,500 A | 8/1983 | Hamada et al. |
| 4,535,694 A | 8/1985 | Fukuda |
| 4,538,156 A | 8/1985 | Durkee et al. |
| 4,555,437 A | 11/1985 | Tanck |
| 4,575,465 A | 3/1986 | Viola |
| 4,642,654 A | 2/1987 | Toganoh et al. |
| 4,853,737 A | 8/1989 | Hartley et al. |
| 4,976,197 A | 12/1990 | Yamanari et al. |
| 5,012,072 A | 4/1991 | Martin et al. |
| 5,039,339 A | 8/1991 | Phan et al. |
| 5,062,364 A | 11/1991 | Lewis et al. |
| 5,075,731 A | 12/1991 | Kamimura et al. |
| 5,099,256 A | 3/1992 | Anderson |
| 5,106,417 A | 4/1992 | Hauser et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,264,904 A | 11/1993 | Audi et al. |
| 5,305,099 A | 4/1994 | Morcos |
| 5,333,771 A | 8/1994 | Cesario |
| 5,349,905 A | 9/1994 | Taylor et al. |
| 5,352,507 A | 10/1994 | Bresson et al. |
| 5,365,324 A | 11/1994 | Gu et al. |
| 5,406,884 A | 4/1995 | Okuda et al. |
| 5,471,233 A | 11/1995 | Okamoto et al. |
| 5,532,314 A | 7/1996 | Sexsmith |
| 5,552,875 A | 9/1996 | Sagiv et al. |

(Continued)

FOREIGN PATENT DOCUMENTS

| | | |
|---|---|---|
| CN | 1121033 A | 4/1996 |
| CN | 1200085 A | 11/1998 |

(Continued)

OTHER PUBLICATIONS

"Amino Functional Silicone Polymers", in Xiameter.Copyrgt. 2009 Dow Corning Corporation.

(Continued)

*Primary Examiner* — Deve V Hall
(74) *Attorney, Agent, or Firm* — Marc Van Dyke; Momentum IP Group

(57) ABSTRACT

Ink formulations suitable for deposition upon the intermediate transfer member of an indirect printing system and for transfer therefrom to a substrate. The inks are aqueous inkjet inks comprising an organic polymeric resin and a colorant. Ink film constructions including a plurality of continuous ink films fixedly adhered to the printing substrate that can be obtained with these inks are also disclosed. The inks and the printed constructions are such that the ink films and the dried inks composing them have a first dynamic viscosity within a range of $10^6$ cP to $5 \cdot 10^7$ cP at at least a first temperature within a first range of 60° C. to 87.5° C., and a second dynamic viscosity of at least $6 \cdot 10^7$ cP, for at least a second temperature within a second range of 50° C. to 55° C.

19 Claims, 23 Drawing Sheets

(56) References Cited

U.S. PATENT DOCUMENTS

| | | |
|---|---|---|
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,642,141 A | 6/1997 | Hale et al. |
| 5,660,108 A | 8/1997 | Pensavecchia |
| 5,677,719 A | 10/1997 | Granzow |
| 5,679,463 A | 10/1997 | Visser et al. |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,841,456 A | 11/1998 | Takei et al. |
| 5,859,076 A | 1/1999 | Kozma et al. |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,889,534 A | 3/1999 | Johnson et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 5,991,590 A | 11/1999 | Chang et al. |
| 6,004,647 A | 12/1999 | Bambara et al. |
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,045,817 A | 4/2000 | Ananthapadmanabhan et al. |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,072,976 A | 6/2000 | Kuriyama et al. |
| 6,078,775 A | 6/2000 | Arai et al. |
| 6,094,558 A | 7/2000 | Shimizu et al. |
| 6,102,538 A | 8/2000 | Ochi et al. |
| 6,103,775 A | 8/2000 | Bambara et al. |
| 6,108,513 A | 8/2000 | Landa et al. |
| 6,109,746 A | 8/2000 | Jeanmaire et al. |
| 6,132,541 A | 10/2000 | Heaton |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,332,943 B1 | 12/2001 | Herrmann et al. |
| 6,354,700 B1 | 3/2002 | Roth |
| 6,357,869 B1 | 3/2002 | Rasmussen et al. |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,377,772 B1 | 4/2002 | Chowdry et al. |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,396,528 B1 | 5/2002 | Yanagawa |
| 6,397,034 B1 | 5/2002 | Tarnawskyj et al. |
| 6,400,913 B1 | 6/2002 | De Jong et al. |
| 6,402,317 B2 | 6/2002 | Yanagawa et al. |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 | 10/2002 | Pelland et al. |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,554,189 B1 | 4/2003 | Good et al. |
| 6,559,969 B1 | 5/2003 | Lapstun |
| 6,575,547 B2 | 6/2003 | Sakuma |
| 6,586,100 B1 | 7/2003 | Pickering et al. |
| 6,590,012 B2 | 7/2003 | Miyabayashi |
| 6,608,979 B1 | 8/2003 | Landa et al. |
| 6,623,817 B1 | 9/2003 | Yang et al. |
| 6,630,047 B2 | 10/2003 | Jing et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |
| 6,811,840 B1 | 11/2004 | Cross |
| 6,827,018 B1 | 12/2004 | Hartmann et al. |
| 6,881,458 B2 | 4/2005 | Ludwig et al. |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,966,712 B2 | 11/2005 | Trelewicz et al. |
| 6,970,674 B2 | 11/2005 | Sato et al. |
| 6,974,022 B2 | 12/2005 | Saeki |
| 6,982,799 B2 | 1/2006 | Lapstun |
| 6,983,692 B2 | 1/2006 | Beauchamp et al. |
| 7,025,453 B2 | 4/2006 | Ylitalo et al. |
| 7,057,760 B2 | 6/2006 | Lapstun et al. |
| 7,084,202 B2 | 8/2006 | Pickering et al. |
| 7,128,412 B2 | 10/2006 | King et al. |
| 7,134,953 B2 | 11/2006 | Reinke |
| 7,160,377 B2 | 1/2007 | Zoch et al. |
| 7,204,584 B2 | 4/2007 | Lean et al. |
| 7,213,900 B2 | 5/2007 | Ebihara |
| 7,224,478 B1 | 5/2007 | Lapstun et al. |
| 7,265,819 B2 | 9/2007 | Raney |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,334,520 B2 | 2/2008 | Geissler et al. |
| 7,348,368 B2 | 3/2008 | Kakiuchi et al. |
| 7,360,887 B2 | 4/2008 | Konno |
| 7,362,464 B2 | 4/2008 | Kitazawa |
| 7,459,491 B2 | 12/2008 | Tyvoll et al. |
| 7,527,359 B2 | 5/2009 | Stevenson et al. |
| 7,575,314 B2 | 8/2009 | Desie et al. |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |

(56) References Cited

U.S. PATENT DOCUMENTS

| | | |
|---|---|---|
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,038,284 B2 | 10/2011 | Hori et al. |
| 8,042,906 B2 | 10/2011 | Chiwata et al. |
| 8,059,309 B2 | 11/2011 | Lapstun et al. |
| 8,095,054 B2 | 1/2012 | Nakamura |
| 8,109,595 B2 | 2/2012 | Tanaka et al. |
| 8,122,846 B2 | 2/2012 | Stiblert et al. |
| 8,147,055 B2 | 4/2012 | Cellura et al. |
| 8,162,428 B2 | 4/2012 | Eun et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,072 B2 | 11/2012 | Shibata et al. |
| 8,304,043 B2 | 11/2012 | Nagashima et al. |
| 8,353,589 B2 | 1/2013 | Ikeda et al. |
| 8,434,847 B2 | 5/2013 | Dejong et al. |
| 8,460,450 B2 | 6/2013 | Taverizatshy et al. |
| 8,469,476 B2 | 6/2013 | Mandel et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,867,097 B2 | 10/2014 | Mizuno |
| 8,885,218 B2 | 11/2014 | Hirose |
| 8,891,128 B2 | 11/2014 | Yamazaki |
| 8,894,198 B2 | 11/2014 | Hook et al. |
| 8,919,946 B2 | 12/2014 | Suzuki et al. |
| 9,004,629 B2 | 4/2015 | De Jong et al. |
| 9,186,884 B2 | 11/2015 | Landa et al. |
| 9,229,664 B2 | 1/2016 | Landa et al. |
| 9,264,559 B2 | 2/2016 | Motoyanagi et al. |
| 9,284,469 B2 | 3/2016 | Song et al. |
| 9,327,496 B2 | 5/2016 | Landa et al. |
| 9,353,273 B2 | 5/2016 | Landa et al. |
| 9,446,586 B2 | 9/2016 | Matos et al. |
| 9,498,946 B2 | 11/2016 | Landa et al. |
| 9,505,208 B2 | 11/2016 | Shmaiser et al. |
| 9,517,618 B2 | 12/2016 | Landa et al. |
| 9,566,780 B2 | 2/2017 | Landa et al. |
| 9,568,862 B2 | 2/2017 | Shmaiser et al. |
| 9,643,400 B2 | 5/2017 | Landa et al. |
| 9,643,403 B2 | 5/2017 | Landa et al. |
| 9,776,391 B2 | 10/2017 | Landa et al. |
| 9,782,993 B2 | 10/2017 | Landa et al. |
| 9,849,667 B2 | 12/2017 | Landa et al. |
| 9,884,479 B2 | 2/2018 | Landa et al. |
| 9,902,147 B2 | 2/2018 | Shmaiser et al. |
| 9,914,316 B2 | 3/2018 | Landa et al. |
| 10,065,411 B2 | 9/2018 | Landa et al. |
| 10,175,613 B2 | 1/2019 | Watanabe |
| 10,179,447 B2 | 1/2019 | Shmaiser et al. |
| 10,195,843 B2 | 2/2019 | Landa et al. |
| 10,201,968 B2 | 2/2019 | Landa et al. |
| 10,226,920 B2 | 3/2019 | Shmaiser et al. |
| 10,357,963 B2 | 7/2019 | Landa et al. |
| 10,357,985 B2 | 7/2019 | Landa et al. |
| 2001/0022607 A1 | 9/2001 | Takahashi et al. |
| 2002/0041317 A1 | 4/2002 | Kashiwazaki et al. |
| 2002/0064404 A1 | 5/2002 | Iwai |
| 2002/0102374 A1 | 8/2002 | Gervasi et al. |
| 2002/0121220 A1 | 9/2002 | Lin |
| 2002/0150408 A1 | 10/2002 | Mosher et al. |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0018119 A1 | 1/2003 | Frenkel et al. |
| 2003/0030686 A1 | 2/2003 | Abe et al. |
| 2003/0032700 A1 | 2/2003 | Morrison et al. |
| 2003/0043258 A1 | 3/2003 | Kerr et al. |
| 2003/0054139 A1 | 3/2003 | Ylitalo et al. |
| 2003/0055129 A1 | 3/2003 | Alford |
| 2003/0063179 A1 | 4/2003 | Adachi |
| 2003/0064317 A1 | 4/2003 | Bailey et al. |
| 2003/0081964 A1 | 5/2003 | Shimura et al. |
| 2003/0118381 A1 | 6/2003 | Law et al. |
| 2003/0129435 A1 | 7/2003 | Blankenship et al. |
| 2003/0186147 A1 | 10/2003 | Pickering et al. |
| 2003/0214568 A1 | 11/2003 | Nishikawa et al. |
| 2003/0234849 A1 | 12/2003 | Pan et al. |
| 2004/0003863 A1 | 1/2004 | Eckhardt |
| 2004/0020382 A1 | 2/2004 | McLean et al. |
| 2004/0047666 A1 | 3/2004 | Imaizumi et al. |
| 2004/0087707 A1 | 5/2004 | Zoch et al. |
| 2004/0123761 A1 | 7/2004 | Szumla et al. |
| 2004/0125188 A1 | 7/2004 | Szumla et al. |
| 2004/0173111 A1 | 9/2004 | Okuda |
| 2004/0200369 A1 | 10/2004 | Brady |
| 2004/0228642 A1 | 11/2004 | Iida et al. |
| 2004/0246324 A1 | 12/2004 | Nakashima |
| 2004/0246326 A1 | 12/2004 | Dwyer et al. |
| 2005/0031807 A1 | 2/2005 | Quintens et al. |
| 2005/0082146 A1 | 4/2005 | Axmann |
| 2005/0110855 A1 | 5/2005 | Taniuchi et al. |
| 2005/0111861 A1 | 5/2005 | Calamita et al. |
| 2005/0134874 A1 | 6/2005 | Overall et al. |
| 2005/0150408 A1 | 7/2005 | Hesterman |
| 2005/0195235 A1 | 9/2005 | Kitao |
| 2005/0235870 A1 | 10/2005 | Ishihara |
| 2005/0266332 A1 | 12/2005 | Pavlisko et al. |
| 2005/0272334 A1 | 12/2005 | Wang et al. |
| 2006/0004123 A1 | 1/2006 | Wu et al. |
| 2006/0135709 A1 | 6/2006 | Hasegawa et al. |
| 2006/0164488 A1 | 7/2006 | Taniuchi et al. |
| 2006/0164489 A1 | 7/2006 | Vega et al. |
| 2006/0192827 A1 | 8/2006 | Takada et al. |
| 2006/0233578 A1 | 10/2006 | Maki et al. |
| 2006/0286462 A1 | 12/2006 | Jackson et al. |
| 2007/0014595 A1 | 1/2007 | Kawagoe |
| 2007/0025768 A1 | 2/2007 | Komatsu et al. |
| 2007/0029171 A1 | 2/2007 | Nemedi |
| 2007/0045939 A1 | 3/2007 | Toya et al. |
| 2007/0054981 A1 | 3/2007 | Yanagi et al. |
| 2007/0120927 A1 | 5/2007 | Snyder et al. |
| 2007/0123642 A1 | 5/2007 | Banning et al. |
| 2007/0134030 A1 | 6/2007 | Lior et al. |
| 2007/0144368 A1 | 6/2007 | Barazani et al. |
| 2007/0146462 A1 | 6/2007 | Taniuchi et al. |
| 2007/0147894 A1 | 6/2007 | Yokota et al. |
| 2007/0166071 A1 | 7/2007 | Shima |
| 2007/0176995 A1 | 8/2007 | Kadomatsu et al. |
| 2007/0189819 A1 | 8/2007 | Uehara et al. |
| 2007/0199457 A1 | 8/2007 | Cyman, Jr. et al. |
| 2007/0229639 A1 | 10/2007 | Yahiro |
| 2007/0253726 A1 | 11/2007 | Kagawa |
| 2007/0257955 A1 | 11/2007 | Tanaka et al. |
| 2007/0285486 A1 | 12/2007 | Harris et al. |
| 2008/0006176 A1 | 1/2008 | Houjou |
| 2008/0030536 A1 | 2/2008 | Furukawa et al. |

(56) References Cited

U.S. PATENT DOCUMENTS

| | | |
|---|---|---|
| 2008/0032072 A1 | 2/2008 | Taniuchi et al. |
| 2008/0044587 A1 | 2/2008 | Maeno et al. |
| 2008/0055356 A1 | 3/2008 | Yamanobe |
| 2008/0055381 A1 | 3/2008 | Doi et al. |
| 2008/0074462 A1 | 3/2008 | Hirakawa |
| 2008/0112912 A1 | 5/2008 | Springob et al. |
| 2008/0118657 A1* | 5/2008 | Taverizatshy ......... C09D 11/322 427/466 |
| 2008/0138546 A1 | 6/2008 | Soria et al. |
| 2008/0166495 A1 | 7/2008 | Maeno et al. |
| 2008/0167185 A1 | 7/2008 | Hirota |
| 2008/0175612 A1 | 7/2008 | Oikawa et al. |
| 2008/0196612 A1 | 8/2008 | Rancourt et al. |
| 2008/0196621 A1 | 8/2008 | Ikuno et al. |
| 2008/0213548 A1 | 9/2008 | Koganehira et al. |
| 2008/0236480 A1 | 10/2008 | Furukawa et al. |
| 2008/0253812 A1 | 10/2008 | Pearce et al. |
| 2009/0022504 A1 | 1/2009 | Kuwabara et al. |
| 2009/0041515 A1 | 2/2009 | Kim |
| 2009/0041932 A1 | 2/2009 | Ishizuka et al. |
| 2009/0064884 A1 | 3/2009 | Hook et al. |
| 2009/0074492 A1 | 3/2009 | Ito |
| 2009/0080949 A1 | 3/2009 | Yamanobe et al. |
| 2009/0082503 A1 | 3/2009 | Yanagi et al. |
| 2009/0087565 A1 | 4/2009 | Houjou |
| 2009/0098385 A1 | 4/2009 | Kaemper et al. |
| 2009/0116885 A1 | 5/2009 | Ando |
| 2009/0148200 A1 | 6/2009 | Hara et al. |
| 2009/0165937 A1 | 7/2009 | Inoue et al. |
| 2009/0190951 A1 | 7/2009 | Torimaru et al. |
| 2009/0202275 A1 | 8/2009 | Nishida et al. |
| 2009/0211490 A1 | 8/2009 | Ikuno et al. |
| 2009/0220873 A1 | 9/2009 | Enomoto et al. |
| 2009/0237479 A1 | 9/2009 | Yamashita et al. |
| 2009/0256896 A1 | 10/2009 | Scarlata |
| 2009/0279170 A1 | 11/2009 | Miyazaki et al. |
| 2009/0315926 A1 | 12/2009 | Yamanobe |
| 2009/0317555 A1 | 12/2009 | Hori |
| 2009/0318591 A1 | 12/2009 | Ageishi et al. |
| 2010/0012023 A1 | 1/2010 | Lefevre et al. |
| 2010/0053292 A1 | 3/2010 | Thayer et al. |
| 2010/0053293 A1 | 3/2010 | Thayer et al. |
| 2010/0066796 A1 | 3/2010 | Yanagi et al. |
| 2010/0075843 A1 | 3/2010 | Ikuno et al. |
| 2010/0086692 A1 | 4/2010 | Ohta et al. |
| 2010/0091064 A1 | 4/2010 | Araki et al. |
| 2010/0111577 A1 | 5/2010 | Soria et al. |
| 2010/0231623 A1 | 9/2010 | Hirato |
| 2010/0239789 A1 | 9/2010 | Umeda |
| 2010/0282100 A1 | 11/2010 | Okuda et al. |
| 2010/0285221 A1 | 11/2010 | Oki et al. |
| 2010/0303504 A1 | 12/2010 | Funamoto et al. |
| 2010/0310281 A1 | 12/2010 | Miura et al. |
| 2011/0044724 A1 | 2/2011 | Funamoto et al. |
| 2011/0058001 A1 | 3/2011 | Gila et al. |
| 2011/0085828 A1 | 4/2011 | Kosako et al. |
| 2011/0128300 A1 | 6/2011 | Gay et al. |
| 2011/0141188 A1 | 6/2011 | Morita |
| 2011/0150509 A1 | 6/2011 | Komiya |
| 2011/0150541 A1 | 6/2011 | Michibata |
| 2011/0169889 A1 | 7/2011 | Kojima et al. |
| 2011/0195260 A1 | 8/2011 | Lee et al. |
| 2011/0199414 A1 | 8/2011 | Lang |
| 2011/0234683 A1 | 9/2011 | Komatsu |
| 2011/0234689 A1 | 9/2011 | Saito |
| 2011/0249090 A1 | 10/2011 | Moore et al. |
| 2011/0269885 A1 | 11/2011 | Imai |
| 2011/0279554 A1 | 11/2011 | Dannhauser et al. |
| 2011/0304674 A1 | 12/2011 | Sambhy et al. |
| 2012/0013693 A1 | 1/2012 | Tasaka et al. |
| 2012/0013694 A1 | 1/2012 | Kanke |
| 2012/0013928 A1 | 1/2012 | Yoshida et al. |
| 2012/0026224 A1 | 2/2012 | Anthony et al. |
| 2012/0039647 A1 | 2/2012 | Brewington et al. |
| 2012/0094091 A1 | 4/2012 | Van et al. |
| 2012/0098882 A1 | 4/2012 | Onishi et al. |
| 2012/0105561 A1 | 5/2012 | Taniuchi et al. |
| 2012/0105562 A1 | 5/2012 | Sekiguchi et al. |
| 2012/0113180 A1 | 5/2012 | Tanaka et al. |
| 2012/0113203 A1 | 5/2012 | Kushida et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0156375 A1 | 6/2012 | Brust et al. |
| 2012/0156624 A1 | 6/2012 | Rondon et al. |
| 2012/0162302 A1 | 6/2012 | Oguchi et al. |
| 2012/0163846 A1 | 6/2012 | Andoh et al. |
| 2012/0194830 A1 | 8/2012 | Gaertner et al. |
| 2012/0237260 A1 | 9/2012 | Sengoku et al. |
| 2012/0287260 A1 | 11/2012 | Lu et al. |
| 2012/0301186 A1 | 11/2012 | Yang et al. |
| 2012/0314077 A1 | 12/2012 | Clavenna, II et al. |
| 2013/0017006 A1 | 1/2013 | Suda |
| 2013/0044188 A1 | 2/2013 | Nakamura et al. |
| 2013/0057603 A1 | 3/2013 | Gordon |
| 2013/0088543 A1 | 4/2013 | Tsuji et al. |
| 2013/0120513 A1 | 5/2013 | Thayer et al. |
| 2013/0201237 A1 | 8/2013 | Thomson et al. |
| 2013/0234080 A1 | 9/2013 | Torikoshi et al. |
| 2013/0242016 A1 | 9/2013 | Edwards et al. |
| 2013/0338273 A1 | 12/2013 | Shimanaka et al. |
| 2014/0001013 A1 | 1/2014 | Takifuji et al. |
| 2014/0011125 A1 | 1/2014 | Inoue et al. |
| 2014/0043398 A1 | 2/2014 | Butler et al. |
| 2014/0104360 A1 | 4/2014 | Häcker et al. |
| 2014/0168330 A1 | 6/2014 | Liu et al. |
| 2014/0175707 A1 | 6/2014 | Wolk et al. |
| 2014/0232782 A1 | 8/2014 | Mukai et al. |
| 2014/0267777 A1 | 9/2014 | Le Clerc et al. |
| 2014/0339056 A1 | 11/2014 | Iwakoshi et al. |
| 2015/0015650 A1 | 1/2015 | Landa et al. |
| 2015/0022602 A1 | 1/2015 | Landa et al. |
| 2015/0024648 A1 | 1/2015 | Landa et al. |
| 2015/0025179 A1 | 1/2015 | Landa et al. |
| 2015/0072090 A1 | 3/2015 | Landa et al. |
| 2015/0085036 A1 | 3/2015 | Liu et al. |
| 2015/0085037 A1 | 3/2015 | Liu et al. |
| 2015/0116408 A1 | 4/2015 | Armbruster et al. |
| 2015/0118503 A1 | 4/2015 | Landa et al. |
| 2015/0195509 A1 | 7/2015 | Phipps |
| 2015/0210065 A1 | 7/2015 | Kelly et al. |
| 2015/0304531 A1 | 10/2015 | Rodriguez Garcia et al. |
| 2015/0336378 A1 | 11/2015 | Guttmann et al. |
| 2015/0361288 A1 | 12/2015 | Song et al. |
| 2016/0031246 A1 | 2/2016 | Sreekumar et al. |
| 2016/0222232 A1 | 8/2016 | Landa et al. |
| 2016/0286462 A1 | 9/2016 | Gohite et al. |
| 2016/0297190 A1 | 10/2016 | Landa et al. |
| 2016/0297978 A1 | 10/2016 | Landa et al. |
| 2016/0369119 A1 | 12/2016 | Landa et al. |
| 2016/0375680 A1 | 12/2016 | Nishitani et al. |
| 2017/0028688 A1 | 2/2017 | Dannhauser et al. |
| 2017/0104887 A1 | 4/2017 | Nomura |
| 2017/0192374 A1 | 7/2017 | Landa et al. |
| 2017/0244956 A1 | 8/2017 | Stiglic et al. |
| 2018/0079201 A1 | 3/2018 | Landa et al. |
| 2018/0093470 A1 | 4/2018 | Landa et al. |
| 2018/0259888 A1 | 9/2018 | Mitsui et al. |
| 2019/0023000 A1 | 1/2019 | Landa et al. |
| 2019/0084295 A1 | 3/2019 | Shmaiser et al. |
| 2019/0118530 A1 | 4/2019 | Landa et al. |
| 2019/0152218 A1 | 5/2019 | Stein et al. |
| 2019/0168502 A1 | 6/2019 | Shmaiser et al. |
| 2019/0193391 A1 | 6/2019 | Landa et al. |
| 2019/0202198 A1 | 7/2019 | Shmaiser et al. |
| 2019/0218411 A1 | 7/2019 | Landa et al. |

FOREIGN PATENT DOCUMENTS

| | | |
|---|---|---|
| CN | 1212229 A | 3/1999 |
| CN | 1324901 A | 12/2001 |
| CN | 1493514 A | 5/2004 |
| CN | 1720187 A | 1/2006 |
| CN | 1261831 C | 6/2006 |

(56) References Cited

FOREIGN PATENT DOCUMENTS

| | | | |
|---|---|---|---|
| CN | 1809460 A | 7/2006 |
| CN | 1289368 C | 12/2006 |
| CN | 101073937 A | 11/2007 |
| CN | 101177057 A | 5/2008 |
| CN | 101344746 A | 1/2009 |
| CN | 101508200 A | 8/2009 |
| CN | 101524916 A | 9/2009 |
| CN | 101544100 A | 9/2009 |
| CN | 101544101 A | 9/2009 |
| CN | 101607468 A | 12/2009 |
| CN | 201410787 Y | 2/2010 |
| CN | 101873982 A | 10/2010 |
| CN | 102248776 A | 11/2011 |
| CN | 102555450 A | 7/2012 |
| CN | 102648095 A | 8/2012 |
| CN | 102925002 A | 2/2013 |
| CN | 103991293 A | 8/2014 |
| CN | 104271356 A | 1/2015 |
| CN | 104284850 A | 1/2015 |
| CN | 104618642 A | 5/2015 |
| DE | 102010060999 A1 | 6/2012 |
| EP | 0457551 A2 | 11/1991 |
| EP | 0499857 A1 | 8/1992 |
| EP | 0606490 A1 | 7/1994 |
| EP | 0609076 A2 | 8/1994 |
| EP | 0613791 A2 | 9/1994 |
| EP | 0530627 B1 | 3/1997 |
| EP | 0784244 A2 | 7/1997 |
| EP | 0835762 A1 | 4/1998 |
| EP | 0843236 A2 | 5/1998 |
| EP | 0854398 A2 | 7/1998 |
| EP | 1013466 A2 | 6/2000 |
| EP | 1146090 A2 | 10/2001 |
| EP | 1158029 A1 | 11/2001 |
| EP | 0825029 B1 | 5/2002 |
| EP | 1247821 A2 | 10/2002 |
| EP | 0867483 B1 | 6/2003 |
| EP | 1454968 A1 | 9/2004 |
| EP | 1503326 A1 | 2/2005 |
| EP | 1777243 A1 | 4/2007 |
| EP | 2028238 A1 | 2/2009 |
| EP | 2042317 A1 | 4/2009 |
| EP | 2065194 A2 | 6/2009 |
| EP | 2228210 A1 | 9/2010 |
| EP | 2270070 A1 | 1/2011 |
| EP | 2042318 B1 | 2/2011 |
| EP | 2042325 B1 | 2/2012 |
| EP | 2634010 A1 | 9/2013 |
| EP | 2683556 A1 | 1/2014 |
| EP | 2075635 B1 | 10/2014 |
| EP | 2823363 B1 | 10/2018 |
| GB | 748821 A | 5/1956 |
| GB | 1496016 A | 12/1977 |
| GB | 1520932 A | 8/1978 |
| GB | 1522175 A | 8/1978 |
| GB | 2321430 A | 7/1998 |
| JP | S5578904 A | 6/1980 |
| JP | S567968 A | 1/1981 |
| JP | S6076343 A | 4/1985 |
| JP | S60199692 A | 10/1985 |
| JP | S6223783 A | 1/1987 |
| JP | H03248170 A | 11/1991 |
| JP | H05147208 A | 6/1993 |
| JP | H05192871 A | 8/1993 |
| JP | H05297737 A | 11/1993 |
| JP | H06954 A | 1/1994 |
| JP | H06100807 A | 4/1994 |
| JP | H06171076 A | 6/1994 |
| JP | H06345284 A | 12/1994 |
| JP | H07112841 A | 5/1995 |
| JP | H07186453 A | 7/1995 |
| JP | H07238243 A | 9/1995 |
| JP | H0862999 A | 3/1996 |
| JP | H08112970 A | 5/1996 |
| JP | 2529651 B2 | 8/1996 |
| JP | H09123432 A | 5/1997 |
| JP | H09157559 A | 6/1997 |
| JP | H09281851 A | 10/1997 |
| JP | H09314867 A | 12/1997 |
| JP | H1142811 A | 2/1999 |
| JP | H11503244 A | 3/1999 |
| JP | H11106081 A | 4/1999 |
| JP | 2000108320 A | 4/2000 |
| JP | 2000108334 A | 4/2000 |
| JP | 2000169772 A | 6/2000 |
| JP | 2000206801 A | 7/2000 |
| JP | 2001088430 A | 4/2001 |
| JP | 2001098201 A | 4/2001 |
| JP | 2001139865 A | 5/2001 |
| JP | 3177985 B2 | 6/2001 |
| JP | 2001164165 A | 6/2001 |
| JP | 2001199150 A | 7/2001 |
| JP | 2001206522 A | 7/2001 |
| JP | 2002020666 A | 1/2002 |
| JP | 2002069346 A | 3/2002 |
| JP | 2002103598 A | 4/2002 |
| JP | 2002169383 A | 6/2002 |
| JP | 2002234243 A | 8/2002 |
| JP | 2002278365 A | 9/2002 |
| JP | 2002304066 A | 10/2002 |
| JP | 2002326733 A | 11/2002 |
| JP | 2002371208 A | 12/2002 |
| JP | 2003057967 A | 2/2003 |
| JP | 2003114558 A | 4/2003 |
| JP | 2003145914 A | 5/2003 |
| JP | 2003183557 A | 7/2003 |
| JP | 2003211770 A | 7/2003 |
| JP | 2003219271 A | 7/2003 |
| JP | 2003246135 A | 9/2003 |
| JP | 2003246484 A | 9/2003 |
| JP | 2003292855 A | 10/2003 |
| JP | 2003313466 A | 11/2003 |
| JP | 2004009632 A | 1/2004 |
| JP | 2004019022 A | 1/2004 |
| JP | 2004025708 A | 1/2004 |
| JP | 2004034441 A | 2/2004 |
| JP | 2004077669 A | 3/2004 |
| JP | 2004114377 A | 4/2004 |
| JP | 2004114675 A | 4/2004 |
| JP | 2004148687 A | 5/2004 |
| JP | 2004231711 A | 8/2004 |
| JP | 2004524190 A | 8/2004 |
| JP | 2004261975 A | 9/2004 |
| JP | 2004325782 A | 11/2004 |
| JP | 2005014255 A | 1/2005 |
| JP | 2005014256 A | 1/2005 |
| JP | 2005114769 A | 4/2005 |
| JP | 2005215247 A | 8/2005 |
| JP | 2005307184 A | 11/2005 |
| JP | 2005319593 A | 11/2005 |
| JP | 2006001688 A | 1/2006 |
| JP | 2006095870 A | 4/2006 |
| JP | 2006102975 A | 4/2006 |
| JP | 2006137127 A | 6/2006 |
| JP | 2006143778 A | 6/2006 |
| JP | 2006152133 A | 6/2006 |
| JP | 2006224583 A | 8/2006 |
| JP | 2006231666 A | 9/2006 |
| JP | 2006243212 A | 9/2006 |
| JP | 2006263984 A | 10/2006 |
| JP | 2006347081 A | 12/2006 |
| JP | 2006347085 A | 12/2006 |
| JP | 2007025246 A | 2/2007 |
| JP | 2007041530 A | 2/2007 |
| JP | 2007069584 A | 3/2007 |
| JP | 2007190745 A | 8/2007 |
| JP | 2007216673 A | 8/2007 |
| JP | 2007253347 A | 10/2007 |
| JP | 2008006816 A | 1/2008 |
| JP | 2008018716 A | 1/2008 |
| JP | 2008019286 A | 1/2008 |
| JP | 2008036968 A | 2/2008 |
| JP | 2008137239 A | 6/2008 |
| JP | 2008139877 A | 6/2008 |

(56) References Cited

FOREIGN PATENT DOCUMENTS

| | | |
|---|---|---|
| JP | 2008142962 A | 6/2008 |
| JP | 2008183744 A | 8/2008 |
| JP | 2008194997 A | 8/2008 |
| JP | 2008532794 A | 8/2008 |
| JP | 2008201564 A | 9/2008 |
| JP | 2008238674 A | 10/2008 |
| JP | 2008246990 A | 10/2008 |
| JP | 2008255135 A | 10/2008 |
| JP | 2009040892 A | 2/2009 |
| JP | 2009045794 A | 3/2009 |
| JP | 2009045851 A | 3/2009 |
| JP | 2009045885 A | 3/2009 |
| JP | 2009083314 A | 4/2009 |
| JP | 2009083317 A | 4/2009 |
| JP | 2009083325 A | 4/2009 |
| JP | 2009096175 A | 5/2009 |
| JP | 2009148908 A | 7/2009 |
| JP | 2009154330 A | 7/2009 |
| JP | 2009190375 A | 8/2009 |
| JP | 2009202355 A | 9/2009 |
| JP | 2009214318 A | 9/2009 |
| JP | 2009214439 A | 9/2009 |
| JP | 2009226852 A | 10/2009 |
| JP | 2009226886 A | 10/2009 |
| JP | 2009233977 A | 10/2009 |
| JP | 2009234219 A | 10/2009 |
| JP | 2010005815 A | 1/2010 |
| JP | 2010054855 A | 3/2010 |
| JP | 2010510357 A | 4/2010 |
| JP | 2010105365 A | 5/2010 |
| JP | 2010173201 A | 8/2010 |
| JP | 2010184376 A | 8/2010 |
| JP | 2010214885 A | 9/2010 |
| JP | 2010228192 A | 10/2010 |
| JP | 2010228392 A | 10/2010 |
| JP | 2010234599 A | 10/2010 |
| JP | 2010234681 A | 10/2010 |
| JP | 2010241073 A | 10/2010 |
| JP | 2010247381 A | 11/2010 |
| JP | 2010247528 A | 11/2010 |
| JP | 2010258193 A | 11/2010 |
| JP | 2010260204 A | 11/2010 |
| JP | 2010260287 A | 11/2010 |
| JP | 2010260302 A | 11/2010 |
| JP | 2010286570 A | 12/2010 |
| JP | 2011002532 A | 1/2011 |
| JP | 2011025431 A | 2/2011 |
| JP | 2011037070 A | 2/2011 |
| JP | 2011067956 A | 4/2011 |
| JP | 2011126031 A | 6/2011 |
| JP | 2011133884 A | 7/2011 |
| JP | 2011144271 A | 7/2011 |
| JP | 2011523601 A | 8/2011 |
| JP | 2011173325 A | 9/2011 |
| JP | 2011173326 A | 9/2011 |
| JP | 2011186346 A | 9/2011 |
| JP | 2011189627 A | 9/2011 |
| JP | 2011201951 A | 10/2011 |
| JP | 2011224032 A | 11/2011 |
| JP | 2012042943 A | 3/2012 |
| JP | 2012086499 A | 5/2012 |
| JP | 2012111194 A | 6/2012 |
| JP | 2012196787 A | 10/2012 |
| JP | 2012201419 A | 10/2012 |
| JP | 2013001081 A | 1/2013 |
| JP | 2013060299 A | 4/2013 |
| JP | 2013103474 A | 5/2013 |
| JP | 2013121671 A | 6/2013 |
| JP | 2013129158 A | 7/2013 |
| JP | 2014047005 A | 3/2014 |
| JP | 2014094827 A | 5/2014 |
| JP | 2016185688 A | 10/2016 |
| RU | 2180675 C2 | 3/2002 |
| RU | 2282643 C1 | 8/2006 |
| WO | WO-8600327 A1 | 1/1986 |
| WO | WO-9307000 A1 | 4/1993 |
| WO | WO-9604339 A1 | 2/1996 |
| WO | WO-9631809 A1 | 10/1996 |
| WO | WO-9736210 A1 | 10/1997 |
| WO | WO-9821251 A1 | 5/1998 |
| WO | WO-9855901 A1 | 12/1998 |
| WO | WO-9912633 A1 | 3/1999 |
| WO | WO-9942509 A1 | 8/1999 |
| WO | WO-9943502 A2 | 9/1999 |
| WO | WO-0154902 A1 | 8/2001 |
| WO | WO-0170512 A1 | 9/2001 |
| WO | WO-02068191 A1 | 9/2002 |
| WO | WO-02078868 A2 | 10/2002 |
| WO | WO-02094912 A1 | 11/2002 |
| WO | WO-2004113082 A1 | 12/2004 |
| WO | WO-2006051733 A1 | 5/2006 |
| WO | WO-2006069205 A1 | 6/2006 |
| WO | WO-2006073696 A1 | 7/2006 |
| WO | WO-2006091957 A2 | 8/2006 |
| WO | WO-2007009871 A2 | 1/2007 |
| WO | WO-2007145378 A1 | 12/2007 |
| WO | WO-2008078841 A1 | 7/2008 |
| WO | WO-2009025809 A1 | 2/2009 |
| WO | WO-2009134273 A1 | 11/2009 |
| WO | 2010073916 A1 | 7/2010 |
| WO | WO-2010042784 A3 | 7/2010 |
| WO | WO-2011142404 A1 | 11/2011 |
| WO | WO-2012014825 A1 | 2/2012 |
| WO | WO-2012148421 A1 | 11/2012 |
| WO | WO-2013060377 A1 | 5/2013 |
| WO | WO-2013087249 A1 | 6/2013 |
| WO | WO-2013132339 A1 | 9/2013 |
| WO | WO-2013132340 A1 | 9/2013 |
| WO | WO-2013132343 A1 | 9/2013 |
| WO | WO-2013132345 A1 | 9/2013 |
| WO | WO-2013132356 A1 | 9/2013 |
| WO | WO-2013132418 A2 | 9/2013 |
| WO | WO-2013132419 A1 | 9/2013 |
| WO | WO-2013132420 A1 | 9/2013 |
| WO | WO-2013132424 A1 | 9/2013 |
| WO | WO-2013132432 A1 | 9/2013 |
| WO | WO-2013132438 A2 | 9/2013 |
| WO | WO-2013132439 A1 | 9/2013 |
| WO | WO-2013136220 A1 | 9/2013 |
| WO | WO-2015036864 A1 | 3/2015 |
| WO | WO-2015036906 A1 | 3/2015 |
| WO | WO-2015036960 A1 | 3/2015 |
| WO | WO-2016166690 A1 | 10/2016 |
| WO | 2017208246 A1 | 12/2017 |

OTHER PUBLICATIONS

BASF, "JONCRYL 537", Datasheet, Retrieved from the internet : Mar. 23, 2007 p. 1.
Clariant, "Ultrafine Pigment Dispersion for Design and Creative Materials : Hostafine Pigment Preparation" Retrieved from the Internet : URL: http://www.clariant.com/C125720D002B963C/4352D0BC052E90CEC1257479002707D9/$FILE/DP6208E_0608_FL_Hostafinefordesignandcreativematerials.pdf Jun. 19, 2008.
CN102925002 Machine Translation (by EPO and Google)—published Feb. 13, 2013; Jiangnan University, Fu et al.
CN1200085A Machine Translation (by EPO and Google)—published Nov. 25, 1998; Avery Dennison Corp.
Epomin Polymet, product information from Nippon Shokubai, dated Feb. 28, 2014.
Handbook of Print Media, 2001, Springer Verlag, Berlin/Heidelberg/New York, pp. 127-136,748—With English Translation.
JP2000169772 Machine Translation (by EPO and Google)—published Jun. 20, 2000; Tokyo Ink MFG Co Ltd.
JP2000206801 Machine Translation (by PlatPat English machine translation); published on Jul. 28, 2000, Canon KK, Kobayashi et al.
JP2002234243 Machine Translation (by EPO and Google)—published Aug. 20, 2002; Hitachi Koki Co Ltd.
JP2002371208 Machine Translation (by EPO and Google)—published Dec. 26, 2002; Canon Inc.
JP2003246135 Machine Translation (by PlatPat English machine translation)—published Sep. 2, 2003 Ricoh KK, Morohoshi et al.

(56) References Cited

OTHER PUBLICATIONS

JP2003292855(A) Machine Translation (by EPO and Google)—published Oct. 15, 2003; Konishiroku Photo Ind.
JP2004009632(A) Machine Translation (by EPO and Google)—published Jan. 15, 2004; Konica Minolta Holdings Inc.
JP2004019022 Machine Translation (by EPO and Google)—published Jan. 22, 2004; Yamano et al.
JP2004025708(A) Machine Translation (by EPO and Google)—published Jan. 29, 2004; Konica Minolta Holdings Inc.
JP2004034441(A) Machine Translation (by EPO and Google)—published Feb. 5, 2004; Konica Minolta Holdings Inc.
JP2004114377(A) Machine Translation (by EPO and Google)—published Apr. 15, 2004; Konica Minolta Holdings Inc, et al.
JP2004114675 Machine Translation (by EPO and Google)—published Apr. 15, 2004; Canon Inc.
JP2004231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson Corp, Kataoka et al.
JP2005014255 Machine Translation (by EPO and Google)—published Jan. 20, 2005; Canon Inc.
JP2005-014256 Machine Translation (by EPO and Google)—published Jan. 20, 2005; Canon Inc.
JP2006095870(A) Machine Translation (by EPO and Google)—published Apr. 13, 2006; Fuji Photo Film Co Ltd.
JP2006-102975 Machine Translation (by EPO and Google)—published Apr. 20, 2006; Fuji Photo Film Co Ltd.
JP2006-143778 Machine Translation (by EPO, PlatPat and Google)—published Jun. 8, 2006 Sun Bijutsu Insatsu KK et al.
JP2006-152133 Machine Translation (by EPO, PlatPat and Google)—published Jun. 15, 2006 Seiko Epson Corp.
JP2006-263984 Machine Translation (by EPO, PlatPat and Google)—published Oct. 5, 2006 Fuji Photo Film Co Ltd.
JP2006-347081 Machine Translation (by EPO and Google)—published Dec. 28, 2006; Fuji Xerox Co Ltd.
JP2006-347085 Machine Translation (by EPO and Google)—published Dec. 28, 2006 Fuji Xerox Co Ltd.
JP2008-006816 Machine Translation (by EPO and Google)—published Jan. 17, 2008; Fujifilm Corp.
JP2008-018716 Machine Translation (by EPO and Google)—published Jan. 31, 2008; Canon Inc.
JP2008-142962 Machine Translation (by EPO and Google)—published Jun. 26, 2008; Fuji Xerox Co Ltd.
JP2008-255135 Machine Translation (by EPO and Google)—published Oct. 23, 2008; Fujifilm Corp.
JP2009-045794 Machine Translation (by EPO and Google)—published Mar. 5, 2009; Fujifilm Corp.
JP2009-083314 Machine Translation (by EPO, PlatPat and Google)—published Apr. 23, 2009 Fujifilm Corp.
JP2009-083317 Abstract; Machine Translation (by EPO and Google)—published Apr. 23, 2009; Fuji Film Corp.
JP2009096175 Machine Translation (EPO, PlatPat and Google) published on May. 7, 2009 Fujifilm Corp.
JP2009-154330 Machine Translation (by EPO and Google)—published Jul. 16, 2009; Seiko Epson Corp.
JP2009-190375 Machine Translation (by EPO and Google)—published Aug. 27, 2009; Fuji Xerox Co Ltd.
JP2009-202355 Machine Translation (by EPO and Google)—published Sep. 10, 2009; Fuji Xerox Co Ltd.
JP2009-214318 Machine Translation (by EPO and Google)—published Sep. 24, 2009 Fuji Xerox Co Ltd.
JP2009-226852 Machine Translation (by EPO and Google)—published Oct. 8, 2009; Hirato Katsuyuki, Fujifilm Corp.
JP2009-233977 Machine Translation (by EPO and Google)—published Oct. 15, 2009; Fuji Xerox Co Ltd.
JP2009-234219 Machine Translation (by EPO and Google)—published Oct. 15, 2009; Fujifilm Corp.
JP2010-105365 Machine Translation (by EPO and Google)—published May 13, 2010; Fuji Xerox Co Ltd.
JP2010-173201 Abstract; Machine Translation (by EPO and Google)—published Aug. 12, 2010; Richo Co Ltd.
JP2010-184376 Machine Translation (by EPO, PlatPat and Google)—published Aug. 26, 2010 Fujifilm Corp.
JP2010-241073 Machine Translation (by EPO and Google)—published Oct. 28, 2010; Canon Inc.
JP2011-025431 Machine Translation (by EPO and Google)—published Feb. 10, 2011; Fuji Xerox Co Ltd.
JP2011-144271 Machine Translation (by EPO and Google)—published Jun. 28, 2011 Toyo Ink SC Holdings Co Ltd.
JP2011-173325 Abstract; Machine Translation (by EPO and Google)—published Sep. 8, 2011; Canon Inc.
JP2011189627 Machine Translation (by Google Patents)—published Sep. 29, 2011; Canon KK.
JP2011201951(A) Machine Translation (by PlatPat English machine translation); published on Oct. 13, 2011, Shin-Etsu Chemical Co Ltd, Todoroki et al.
JP2012-086499 Machine Translation (by EPO and Google)—published May 10, 2012; Canon Inc.
JPH06100807 Machine Translation (by EPO and Google)—published Apr. 12, 1994; Seiko Instr Inc.
JPH07238243(A) Machine Translation (by EPO and Google)—published Sep. 12, 1995; Seiko Instr Inc.
JPH08112970 Machine Translation (by EPO and Google)—published May. 7, 1996; Fuji Photo Film Co Ltd.
JPH0862999(A) Machine Translation (by EPO & Google)—published Mar. 8, 1996 Toray Industries, Yoshida, Tomoyuki.
"Solubility of Alcohol", in http://www.solubilityofthings.com/water/alcohol; downloaded on Nov. 30, 2017.
Poly(vinyl acetate) data sheet. PolymerProcessing.com. Copyright 2010. http://polymerprocessing.com/polymers/PVAC.html.
JPS60199692A Machine Translation (by EPO and Google)—published Oct. 9, 1985; Suwa Seikosha KK.
CN1809460A Machine Translation (by EPO and Google)—published Jul. 26, 2006; Canon KK.
JP2529651(B2)Machine Translation (by EPO and Google)—issued Aug. 28, 1996; Osaka Sealing Insatsu KK.
Thomas E. F., "CRC Handbook of Food Additives, Second Edition, vol. 1" CRC Press LLC, 1972, p. 434.
Units of Viscosity' published by Hydramotion Ltd. 1 York Road Park, Malton, York Y017 6YA, England; downloaded from www.hydramotion.com website on Jun. 19, 2017.
CN101177057 Machine Translation (by EPO and Google)—published May 14, 2008—Hangzhou Yuanyang Industry Co.
CN101873982A Machine Translation (by EPO and Google)—published Oct. 27, 2010; Habasit AG, Delair et al.
CN102555450A Machine Translation (by EPO and Google)—published Jul. 11, 2012; Fuji Xerox Co., Ltd, Motoharu et al.
CN103991293A Machine Translation (by EPO and Google)—published Aug. 20, 2014; Miyakoshi Printing Machinery Co., Ltd, Junichi et al.
CN104618642 Machine Translation (by EPO and Google); published on May. 13, 2015, Yulong Comp Comm Tech Shenzhen.
CN1493514A Machine Translation (by EPO and Google)—published May 5, 2004; GD SPA, Boderi et al.
Co-pending U.S. Appl. No. 16/282,317, filed Feb. 22, 2019.
Co-pending U.S. Appl. No. 16/303,613, filed Nov. 20, 2018.
Co-pending U.S. Appl. No. 16/303,615, filed Nov. 20, 2018.
Co-pending U.S. Appl. No. 16/303,631, filed Nov. 20, 2018.
Co-pending U.S. Appl. No. 16/432,934, filed Jun. 6, 2019.
Co-pending U.S. Appl. No. 16/433,970, filed Jun. 6, 2019.
DE102010060999 Machine Translation (by EPO and Google)—published Jun. 6, 2012; Wolf, Roland, Dr.-Ing.
IP.com Search, 2018, 2 pages.
JP2000108320 Machine Translation (by PlatPat English machine translation)—published Apr. 18, 2000 Brother Ind. Ltd.
JP2001206522 Machine Translation (by EPO, PlatPat and Google)—published Jul. 31, 2001; Nitto Denko Corp, Kato et al.
JP2002169383 Machine Translation (by EPO, PlatPat and Google)—published Jun. 14, 2002 Richo KK.
JP2002278365 Machine Translation (by PlatPat English machine translation)—published Sep. 27, 2002 Katsuaki, Ricoh KK.

(56) References Cited

OTHER PUBLICATIONS

JP2002304066A Machine Translation (by EPO and Google)—published Oct. 18, 2002; PFU Ltd.
JP2002326733 Machine Translation (by EPO, PlatPat and Google)—published Nov. 12, 2002; Kyocera Mita Corp.
JP2003114558 Machine Translation (by EPO, PlatPat and Google)—published Apr. 18, 2003 Mitsubishi Chem Corp, Yuka Denshi Co Ltd, et al.
JP2003211770 Machine Translation (by EPO and Google)—published Jul. 29, 2003 Hitachi Printing Solutions.
JP2003219271 Machine Translation (by EPO and Google); published on Jul. 31, 2003, Japan Broadcasting.
JP2003246484 Machine Translation (English machine translation)—published Sep. 2, 2003 Kyocera Corp.
JP2004077669 Machine Translation (by PlatPat English machine translation)—published Mar. 11, 2004 Fuji Xerox Co Ltd.
JP2004148687A Machine Translation (by EPO and Google)—published May 27, 2014; Mitsubishi Heavy Ind Ltd.
JP2004325782A Machine Translation (by EPO and Google)—published Nov. 18, 2004; Canon KK.
JP2005114769 Machine Translation (by PlatPat English machine translation)—published Apr. 28, 2005 Ricoh KK.
JP2005215247A Machine Translation (by EPO and Google)—published Aug. 11, 2005; Toshiba Corp.
JP2005319593 Machine Translation (by EPO and Google)—published Nov. 17, 2005, Jujo Paper Co Ltd.
JP2006001688 Machine Translation (by PlatPat English machine translation)—published Jan. 5, 2006 Ricoh KK.
JP2006137127 Machine Translation (by EPO and Google)—published Jun. 1, 2006; Konica Minolta Med & Graphic.
JP2006243212 Machine Translation (by PlatPat English machine translation)—published Sep. 14, 2006 Fuji Xerox Co Ltd.
JP2007041530A Machine Translation (by EPO and Google)—published Feb. 15, 2007; Fuji Xerox Co Ltd.
JP2007069584 Machine Translation (by EPO and Google)—published Mar. 22, 2007 Fujifilm.
JP2007216673 Machine Translation (by EPO and Google)—published Aug. 30, 2007 Brother Ind.
JP2008201564 Machine Translation (English machine translation)—published Sep. 4, 2008 Fuji Xerox Co Ltd.
JP2008246990 Machine Translation (by EPO and Google)—published Oct. 16, 2008, Jujo Paper Co Ltd.
JP2009045885A Machine Translation (by EPO and Google)—published Mar. 5, 2009; Fuji Xerox Co Ltd.
JP2009083325 Abstract; Machine Translation (by EPO and Google)—published Apr. 23, 2009 Fujifilm.
JP2009148908A Machine Translation (by EPO and Google)—published Jul. 9, 2009; Fuji Xerox Co Ltd.
JP2009214439 Machine Translation (by PlatPat English machine translation)—published Sep. 24, 2009 Fujifilm Corp.
JP2010054855 Machine Translation (by PlatPat English machine translation)—published Mar. 11, 2010 Itatsu, Fuji Xerox Co.
JP2010214885A Machine Translation (by EPO and Google)—published Sep. 30, 2010; Mitsubishi Heavy Ind Ltd.
JP2010228192 Machine Translation (by PlatPat English machine translation)—published Oct. 14, 2010 Fuji Xerox.
JP2010258193 Machine Translation (by EPO and Google)—published Nov. 11, 2010; Seiko Epson Corp.
JP2010260204A Machine Translation (by EPO and Google)—published Nov. 18, 2010; Canon KK.
JP2010260287 Machine Translation (by EPO and Google)—published Nov. 18, 2010, Canon KK.
JP2011002532 Machine Translation (by PlatPat English machine translation)—published Jun. 1, 2011 Seiko Epson Corp.
JP2011173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011224032 Machine Translation (by EPO & Google)—published Jul. 5, 2012 Canon KK.
JP2012111194 Machine Translation (by EPO and Google)—published Jun. 14, 2012; Konica Minolta.
JP2013001081 Machine Translation (by EPO and Google)—published Jan. 7, 2013; Kao Corp.
JP2013060299 Machine Translation (by EPO and Google)—published Apr. 4, 2013; Ricoh Co Ltd.
JP2013103474 Machine Translation (by EPO and Google)—published May. 30, 2013; Ricoh Co Ltd.
JP2013121671 Machine Translation (by EPO and Google)—published Jun. 20, 2013; Fuji Xerox Co Ltd.
JP2013129158 Machine Translation (by EPO and Google)—published Jul. 4, 2013; Fuji Xerox Co Ltd.
JPH05147208 Machine Translation (by EPO and Google)—published Jun. 15, 1993—Mita Industrial Co Ltd.
JPH09123432 Machine Translation (by EPO and Google)—published May 13, 1997, Mita Industrial Co Ltd.
JPH09281851A Machine Translation (by EPO and Google)—published Oct. 31, 1997; Seiko Epson Corp.
JPH09314867A Machine Translation (by PlatPat English machine translation)—published Dec. 9, 1997, Toshiba Corp.
JPH11106081A Machine Translation (by EPO and Google)—published Apr. 20, 1999; Ricoh KK.
JPH5297737 Machine Translation (by EPO & Google machine translation)—published Nov. 12, 1993 Fuji Xerox Co Ltd.
JPS567968 Machine Translation (by PlatPat English machine translation); published on Jun. 28, 1979, Shigeyoshi et al.
JPS6076343A Machine Translation (by EPO and Google)—published Apr. 30, 1985; Toray Industries.
Machine Translation (by EPO and Google) of JPH07112841 published on May 2, 1995 Canon KK.
Marconi Studios, Virtual Set Real Time; http://www.marconistudios.il/pp./virtualset_en.php.
Royal Television Society, The Flight of the Phoenix; https://rts.org.uk/article/flight-phoenix, Jan. 27, 2011.
RU2180675 Machine Translation (by EPO and Google)—published Mar. 20, 2002; Zao Rezinotekhnika.
RU2282643 Machine Translation (by EPO and Google)—published Aug. 27, 2006; Balakovorezinotekhnika Aoot.
Flexicon., "Bulk Handling Equipment and Systems: Carbon Black," 2018, 2 pages.
JP2004524190A Machine Translation (by EPO and Google)—published Aug. 12, 2004; Avery Dennison Corp.
JP2010234681A Machine Translation (by EPO and Google)—published Oct. 21, 2010; Riso Kagaku Corp.
JP2010260302A Machine Translation (by EPO and Google)—published Nov. 18, 2010; Riso Kagaku Corp.
JPH06171076A Machine Translation (by PlatPat English machine translation)—published Jun. 21, 1994, Seiko Epson Corp.
Montuori G.M., et al., "Geometrical Patterns for Diagrid Buildings: Exploring Alternative Design Strategies From the Structural Point of View," Engineering Structures, Jul. 2014, vol. 71, pp. 112-127.
The Engineering Toolbox., "Dynamic Viscosity of Common Liquids," 2018, 4 pages.
WO2006051733A1 Machine Translation (by EPO and Google)—published May. 18, 2006; Konica Minolta Med & Graphic.
JP2007253347A Machine Translation (by EPO and Google)—published Oct. 4, 2007; Ricoh KK, Matsuo et al.
WO2013087249 Machine Translation (by EPO and Google)—published Jun. 20, 2013; Koenig & Bauer AG.
CN101073937A Machine Translation (by EPO and Google)—published Nov. 21, 2007; Werner Kaman Maschinen GMBH & [DE].
CN101344746A Machine Translation (by EPO and Google)—published Jan. 14, 2009; Ricoh KK [JP].
CN102648095A Machine Translation (by EPO and Google)—published Aug. 22, 2012; Mars Inc.
CN1121033A Machine Translation (by EPO and Google)—published Apr. 24, 1996; Kuehnle Manfred R [US].
CN1212229A Machine Translation (by EPO and Google)—published Mar. 31, 1999; Honta Industry Corp [JP].

(56) References Cited

OTHER PUBLICATIONS

CN201410787Y Machine Translation (by EPO and Google)—published Feb. 24, 2010; Zhejiang Chanx Wood Co Ltd.
Co-pending U.S. Appl. No. 16/512,915, filed Jul. 16, 2019.
co-pending U.S. Appl. No. 16/542,362, filed Aug. 16, 2019.
Co-pending U.S. Appl. No. 16/590,397, filed Oct. 2, 2019.
Co-pending U.S. Appl. No. 16/677,732, filed Nov. 8, 2019.
IP.com Search, 2019, 1 page.
JP2000108334A Machine Translation (by EPO and Google)—published Apr. 18, 2000; Brother Ind Ltd.
JP2002103598A Machine Translation (by EPO and Google)—published Apr. 9, 2002; Olympus Optical Co.
JP2006224583A Machine Translation (by EPO and Google)—published Aug. 31, 2006; Konica Minolta Holdings Inc.
JP2006231666A Machine Translation (by EPO and Google)—published Sep. 7, 2006; Seiko Epson Corp.
JP2007025246A Machine Translation (by EPO and Google)—published Feb. 1, 2007; Seiko Epson Corp.
JP2008137239A Machine Translation (by EPO and Google); published on Jun. 19, 2008, Kyocera Mita Corp.
JP2008139877A Machine Translation (by EPO and Google)—published Jun. 19, 2008; Xerox Corp.
JP2008194997A Machine Translation (by EPO and Google)—published Aug. 28, 2008; Fuji Xerox Co Ltd.
JP2008238674A Machine Translation (by EPO and Google)—published Oct. 9, 2008; Brother Ind Ltd.
JP2009045851A Machine Translation (by EPO and Google); published on Mar. 5, 2009, Fujifilm Corp.
JP2010234599A Machine Translation (by EPO and Google)—published Oct. 21, 2010; Duplo Seiko Corp et al.
JP2010247381A Machine Translation (by EPO and Google); published on Nov. 4, 2010, Ricoh Co Ltd.
JP2011037070A Machine Translation (by EPO and Google)—published Feb. 24, 2011; Riso Kagaku Corp.
JP2011126031A Machine Translation (by EPO and Google); published on Jun. 30, 2011, Kao Corp.
JP2012196787A Machine Translation (by EPO and Google)—published Oct. 18, 2012; Seiko Epson Corp.
JP2014047005A Machine Translation (by EPO and Google)—published Mar. 17, 2014; Ricoh Co Ltd.
JP2014094827A Machine Translation (by EPO and Google)—published May 22, 2014; Panasonic Corp.
JP2016185688A Machine Translation (by EPO and Google)—published Oct. 27, 2016; Hitachi Industry Equipment Systems Co Ltd.
JPH03248170A Machine Translation (by EPO & Google)—published Nov. 6, 1991; Fujitsu Ltd.
JPH05192871A Machine Translation (by EPO and Google)—published Aug. 3, 1993; Minnesota Mining & MFG.
JPH06345284A Machine Translation (by EPO and Google); published on Dec. 20, 1994, Seiko Epson Corp.
JPH07186453A Machine Translation (by EPO and Google)—published Jul. 25, 1995; Toshiba Corp.
JPS5578904A Machine Translation (by EPO and Google)—published Jun. 14, 1980; Yokoyama Haruo.
Technical Information Lupasol Types, Sep. 2010, 10 pages.
WO2010073916A1 Machine Translation (by EPO and Google)—published Jul. 1, 2010; Nihon Parkerizing [JP] et al.
CN101524916A Machine Translation (by EPO and Google)—published Sep. 9, 2009; Fuji Xerox Co Ltd.
CN101544100A Machine Translation (by EPO and Google)—published Sep. 30, 2009; Fuji Xerox Co Ltd.
Co-pending U.S. Appl. No. 16/629,020, filed Jan. 6, 2020.
Co-pending U.S. Appl. No. 16/714,756, filed Dec. 15, 2019.
Co-pending U.S. Appl. No. 16/737,859, filed Jan. 8, 2020.
Co-pending U.S. Appl. No. 16/784,208, filed Feb. 6, 2020.
JP2001088430A Machine Translation (by EPO and Google)—published Apr. 3, 2001; Kimoto KK.
JP2001098201A Machine Translation (by EPO and Google)—published Apr. 10, 2001; Eastman Kodak Co.
JP2001139865A Machine Translation (by EPO and Google)—published May 22, 2001; Sharp KK.
JP2001164165A Machine Translation (by EPO and Google)—published Jun. 19, 2001; Dainippon Ink & Chemicals.
JP2001199150A Machine Translation (by EPO and Google)—published Jul. 24, 2001; Canon KK.
JP2002069346A Machine Translation (by EPO and Google)—published Mar. 8, 2002; Dainippon Ink & Chemicals.
JP2003145914A Machine Translation (by EPO and Google)—published May 21, 2003; Konishiroku Photo Ind.
JP2003313466A Machine Translation (by EPO and Google)—published Nov. 6, 2003; Ricoh KK.
JP2008183744A Machine Translation (by EPO and Google)—published Aug. 14, 2008, Fuji Xerox Co Ltd.
JP2010228392A Machine Translation (by EPO and Google)—published Oct. 14, 2010; Jujo Paper Co Ltd.
JP2011067956A Machine Translation (by EPO and Google)—published Apr. 7, 2011; Fuji Xerox Co Ltd.
JP2012201419A Machine Translation (by EPO and Google)—published Oct. 22, 2012, Seiko Epson Corp.
JPH06954A Machine Translation (by EPO and Google)—published Jan. 11, 1994; Seiko Epson Corp.
JPH09157559A Machine Translation (by EPO and Google)—published Jun. 17, 1997; Toyo Ink MFG Co.
JPS6223783A Machine Translation (by EPO and Google)—published Jan. 31, 1987; Canon KK.

* cited by examiner

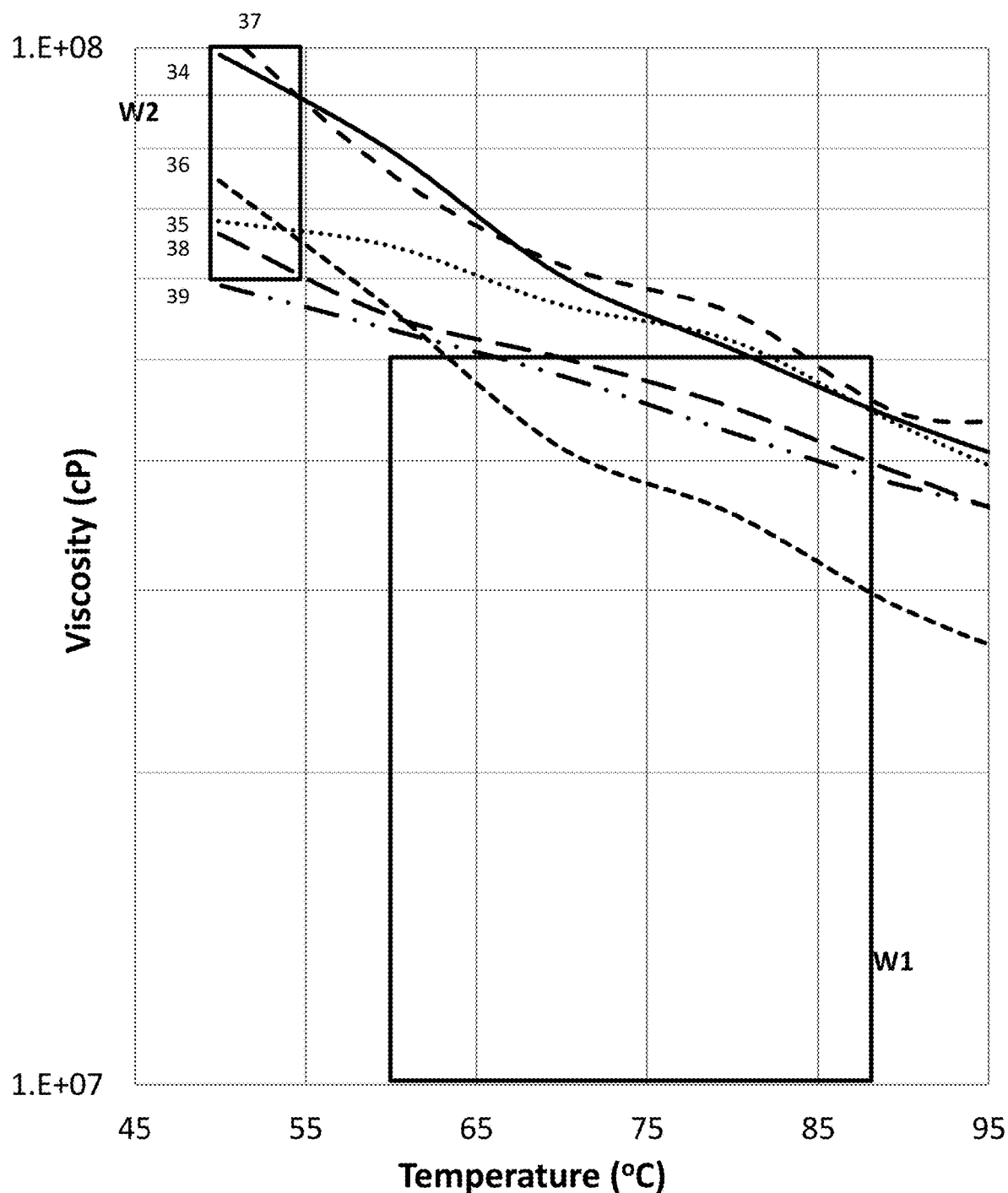

COATED SUBSTRATE

2D

3D

UNCOATED SUBSTRATE

2D

3D

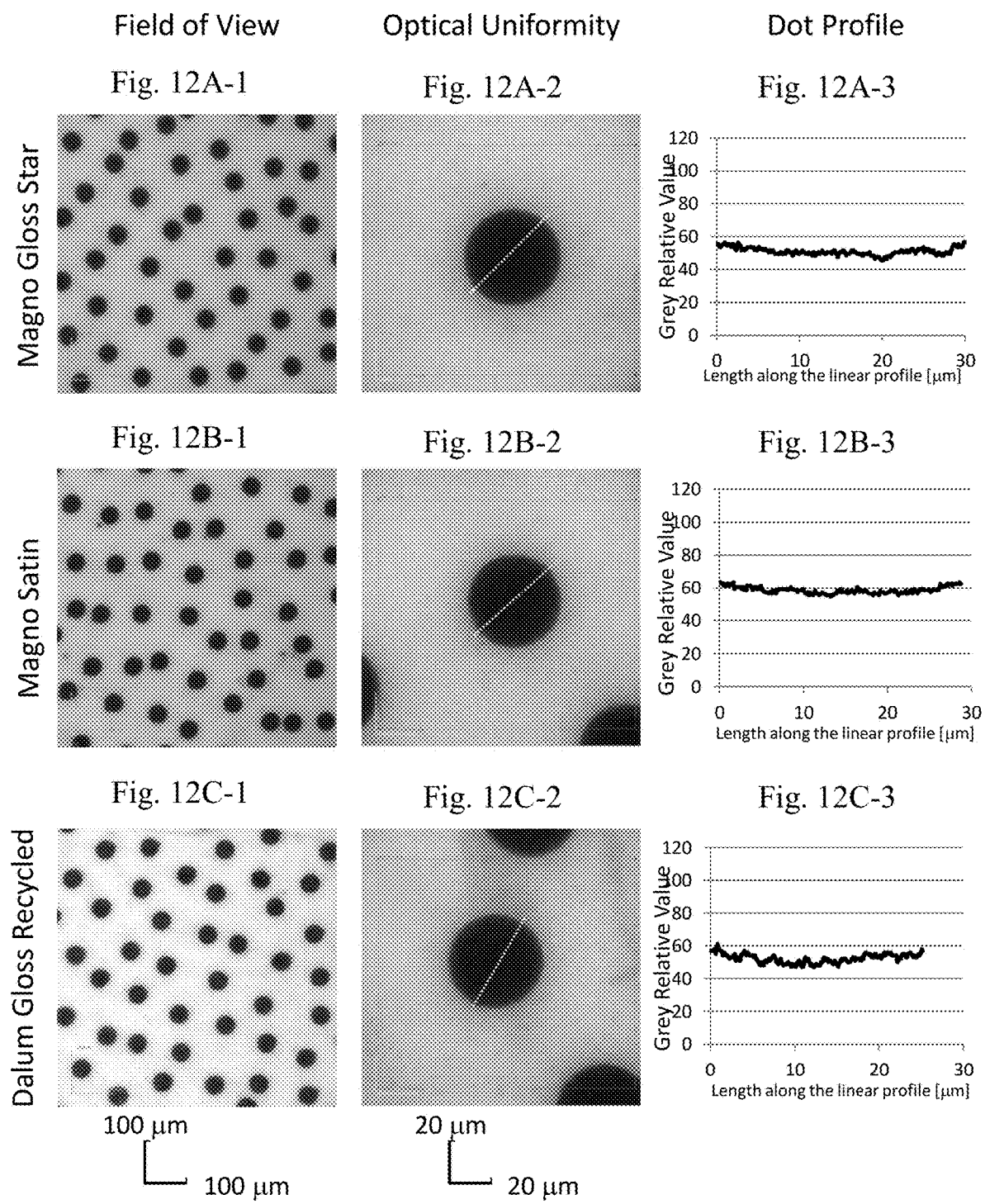

Convexity
Coated Substrates  Uncoated Substrates
Fig. 12A-4  Fig. 12D-4
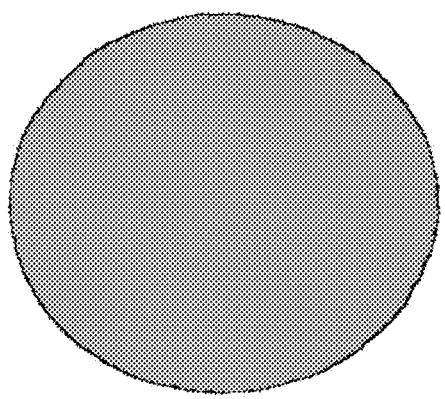 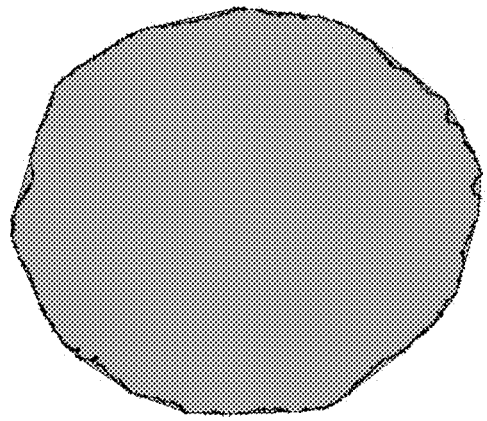
Fig. 12B-4  Fig. 12E-4
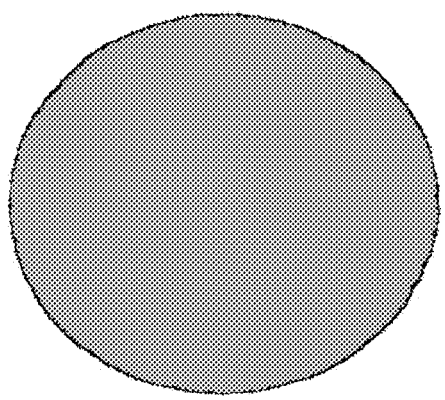 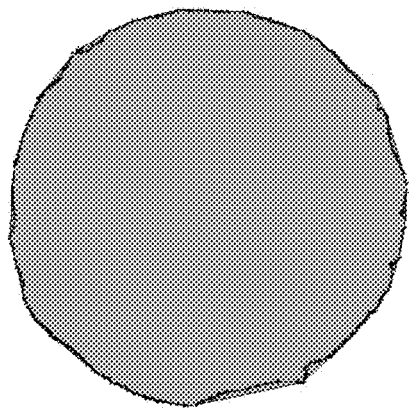
Fig. 12C-4
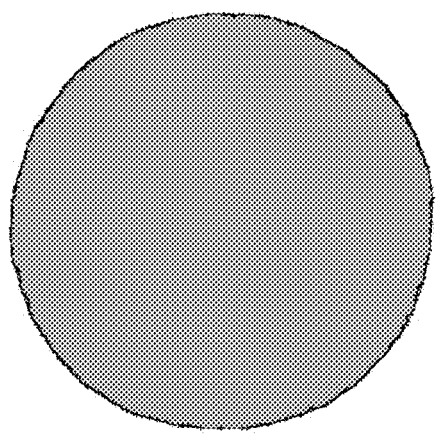

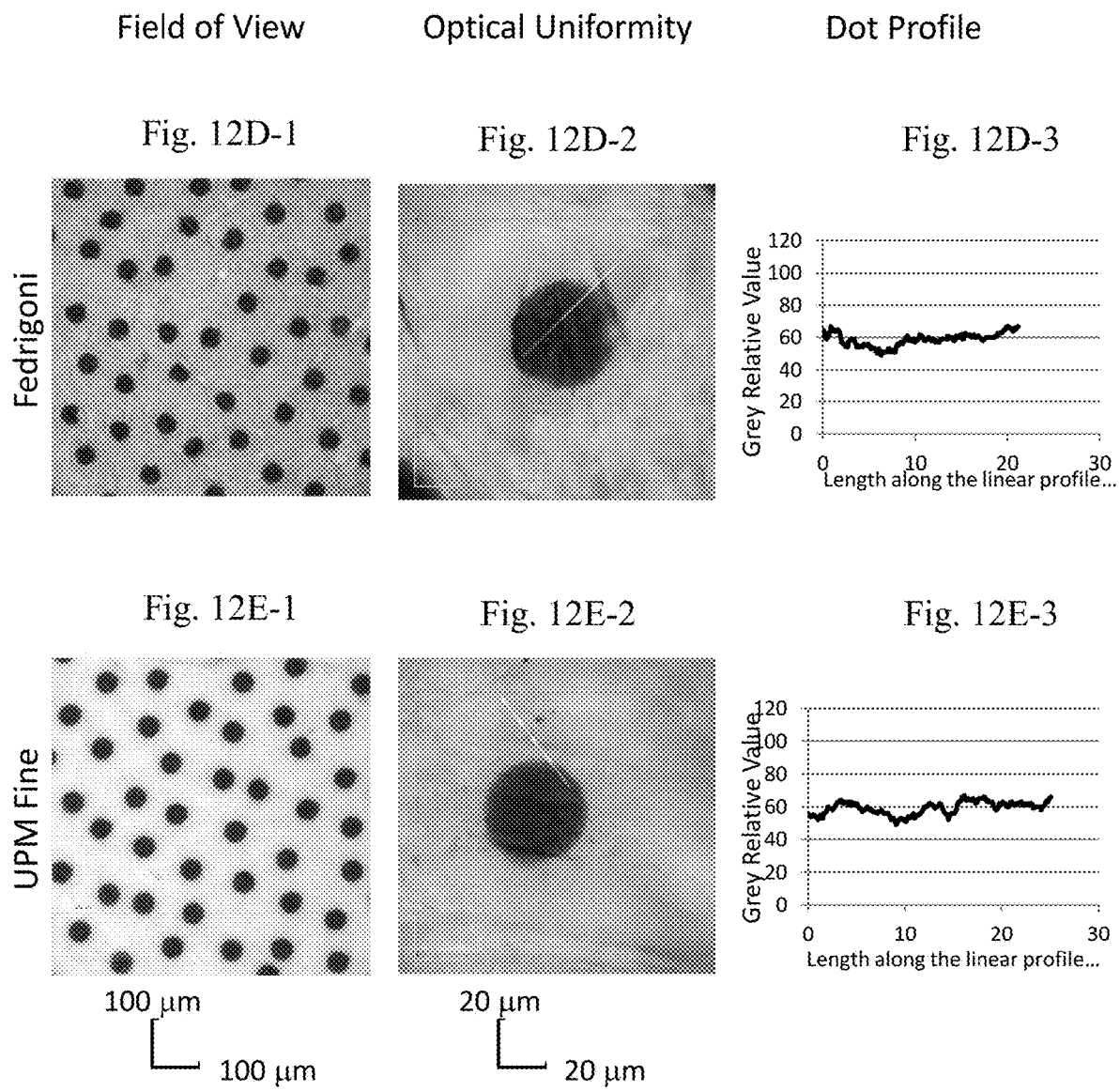

Field of View – Prior Art

Prior Art - Uncoated Substrate

Direct Inkjet (HP Deskjet 9000)

LEP (HP Indigo 7500)

Offset (Ryobi 755)

Prior Art - Coated Substrate

Direct Inkjet (HP Deskjet 9000)

LEP (HP Indigo 7500)

Offset (Ryobi 755)

Convexity

Uncoated Substrates

Coated Substrates

INK FORMULATIONS AND FILM CONSTRUCTIONS THEREOF

RELATED APPLICATION INFORMATION

The present application is a continuation of U.S. patent application Ser. No. 14/917,461, which is a 371 national stage entry of PCT/IB2014/002395 filed on Sep. 11, 2014, which claims the benefit of U.S. provisional application No. 61/876,727 filed on Sep. 11, 2013 and claims priority from GB 1401173.8 filed on Jan. 23, 2014. The contents of the aforesaid applications are incorporated herein by reference as if fully set forth herein.

FIELD AND BACKGROUND OF THE DISCLOSURE

The present invention relates to ink formulations suitable for ink jet printing systems, and more particularly for indirect printing systems. Ink film constructions produced using such inks including ink dots, and more particularly continuous ink dots, adhered to printing substrates are also disclosed.

Currently, lithographic printing is the process in most common use for producing newspapers and magazines. Lithographic printing involves the preparation of plates bearing the image to be printed, which plates are mounted on a plate cylinder. An ink image produced on the plate cylinder is transferred to an offset cylinder that carries a rubber blanket. From the blanket, the image is applied to paper, card or another printing medium, termed the substrate, which is fed between the offset cylinder and an impression cylinder. For a wide variety of well-known reasons, offset litho printing is suitable, and economically viable, only for long print runs.

More recently, digital printing techniques have been developed that allow a printing device to receive instructions directly from a computer without the need to prepare printing plates. Amongst these are color laser printers that use the xerographic process. Color laser printers using dry toners are suitable for certain applications, but they do not produce images of a quality acceptable for publications such as magazines.

A process that is better suited for short run high quality digital printing is used in the HP-Indigo digital printing press. In this process, an electrostatic image is produced on an electrically charged image-bearing cylinder by exposure to laser light. The electrostatic charge attracts oil-based inks to form a color ink image on the image-bearing cylinder. The ink image is then transferred by way of a blanket cylinder onto the substrate. Though such systems are better suited for high quality digital printing, the use of oil-based inks has raised environmental concerns.

Various printing devices have also previously been proposed that use an indirect inkjet printing process, this being a process in which an inkjet print head is used to print an image onto the surface an intermediate transfer member, which is then used to transfer the image onto a substrate. The intermediate transfer member (also called an image transfer member or an ITM) may be a rigid drum or a flexible belt, also herein termed a blanket, guided over rollers.

Using an indirect printing technique overcomes many problems associated with inkjet printing directly onto the substrate. For example, inkjet printing directly onto porous paper, or other fibrous material, results in poor image quality because of variation of the distance between the print head and the surface of the substrate, and because of the substrate acting as a wick. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications. Furthermore, the use of coated substrates creates its own problems in that the surface of the substrate remains wet and additional costly steps are needed to dry the ink so that it is not later smeared as the substrate is being handled, for example stacked or wound into a roll. Furthermore, excessive wetting of the substrate causes cockling and makes printing on both sides of the substrate (also termed perfecting or duplex printing) difficult, if not impossible.

The use of an indirect technique, on the other hand, allows the distance between the image transfer surface and the inkjet print head to be maintained constant, reduces wetting of the substrate as the ink can be dried on the image transfer surface (also termed the release layer) before being applied to the substrate. Consequently, the final image quality of the ink film on the substrate is less affected by the physical properties of the substrate.

Such complex indirect printing systems may operate under numerous sets of inter-related variables, including, among others, the formulation of the inks, the composition of the release layer interfacing therewith, the temperatures at which the inks are deposited, dried and transferred, and the pressure applied on the dried ink image to enable transfer.

While ink formulations have been proposed, and notwithstanding their respective quality in the printing systems they have been adapted to, there remains a need for further improvements in ink formulations suitable for ink jetting, and in particular, ink formulations suitable for ink jetting on the intermediate transfer member of an indirect printing system. Quality ink film constructions are also desired.

SUMMARY OF THE INVENTION

According to some teachings of the present invention there is provided an ink product comprising (a) at least one colorant; and (b) at least one organic polymeric resin; the ink product exhibiting, as a substantially dry residue: (i) a dynamic viscosity being within a range of $10^6$ cP to $5 \cdot 10^7$ cP over at least a part of a first temperature range of 60° C. to 87.5° C.; and (ii) the dynamic viscosity being at least $6 \cdot 10^7$ cP, over at least a part of a second temperature range of 50° C. to 55° C.

According to an aspect of the present invention there is provided an ink product comprising (a) at least one colorant; and (b) at least one organic polymeric resin; the ink product exhibiting, as a substantially dry residue: (i) a dynamic viscosity being within a range of $10^6$ cP to $5 \cdot 10^7$ cP, $8 \cdot 10^7$ cP, $1 \cdot 10^8$ cP, $2 \cdot 10^8$ cP, or $3 \cdot 10^8$ cP, over at least a part of a first temperature range of 60° C. to 87.5° C., 60° C. to 100° C., 60° C. to 105° C., or 60° C. to 110° C.; and (ii) the dynamic viscosity being at least $6 \cdot 10^7$ cP, over at least a part of a second temperature range of 50° C. to 55° C.

According to another aspect of the present invention there is provided an ink film construction comprising the ink product and a printing substrate; the ink product disposed as at least one substantially dry ink film fixedly adhered to a surface of said printing substrate.

According to another aspect of the present invention, the ink product is an ink formulation comprising the ink product and a solvent containing water, said at least one colorant dispersed or at least partly dissolved within the solvent, said at least one organic polymeric resin dispersed within the solvent.

According to further features in the described preferred embodiments, the ink formulation is an aqueous inkjet ink, typically having at least one of (i) a viscosity of 2 to 25 cP at at least one particular temperature in a jetting temperature range of 20-60° C.; and (ii) a surface tension of at most 50 milliNewton/m at at least one particular temperature within said jetting temperature range.

According to another aspect of the present invention there is provided a water-based inkjet ink formulation including: (a) a solvent containing water; (b) at least one colorant dispersed or at least partly dissolved within the solvent; and (c) at least one organic polymeric resin, dispersed within the solvent; the ink formulation forming, when dried, a substantially dry ink residue having: (i) a dynamic viscosity within a viscosity range of $10^6$ cP to $5 \cdot 10^7$ cP over at least part of a first temperature range of 60° C. to 87.5° C.; and (ii) a dynamic viscosity of at least $6 \cdot 10^7$ cP, over at least a part of a second temperature range of 50° C. to 55° C.

According to another aspect of the present invention there is provided an ink film construction including: (a) a printing substrate; and (b) at least one substantially dry ink film, fixedly adhered to a surface of the printing substrate, the ink film containing at least one colorant dispersed in an organic polymeric resin; a dynamic viscosity of the ink film being within a range of $10^6$ cP to $5 \cdot 10^7$ cP over at least part of a first temperature range of 60° C. to 87.5° C., and being at least $6 \cdot 10^7$ cP over at least a part of a second temperature range of 50° C. to 55° C.

According to another aspect of the present invention there is provided a water-based inkjet ink formulation including: (a) a solvent containing water; (b) at least one colorant dispersed or at least partly dissolved within the solvent; and (c) at least one organic polymeric resin, dispersed within the solvent; the ink formulation forming, when dried, a substantially dry ink residue having: (i) a first dynamic viscosity within a range of $10^6$ cP to $3 \cdot 10^8$ cP over at least part of a first temperature range of 60° C. to 100° C., 60° C. to 105° C., or 60° C. to 110° C.; and (ii) a second dynamic viscosity of at least $6 \cdot 10^7$ cP, over at least a part of a second temperature range of 50° C. to 55° C.; the second dynamic viscosity at 55° C. exceeding the first dynamic viscosity at 85° C.; the ink formulation fulfilling at least one of the following structural properties: (A) at least one particular resin of the organic polymeric resin has an elevated glass transition temperature ($T_g$) of at least 52° C., at least 54° C., at least 56° C., at least 58° C., at least 60° C., at least 65° C., at least 70° C., at least 75° C., at least 80° C., at least 85° C., at least 90° C., or at least 95° C.; (B) the substantially dry ink residue has, at at least one of 100° C., 90° C., 85° C., 80° C., 75° C., and 70° C., an overall transferability rating of at least 0.90; (C) the at least one particular resin has a minimum film-forming temperature (MFFT) of at least 48° C., at least 50° C., at least 52° C., at least 54° C., at least 56° C., at least 58° C., at least 60° C., at least 65° C., at least 70° C., or at least 75° C.; (D) the formulation includes a softening agent having a vapor pressure of at most 0.40 kPa, at most 0.35 kPa, at most 0.25 kPa, at most 0.20 kPa, at most 0.15 kPa, at most 0.12 kPa, at most 0.10 kPa, at most 0.08 kPa, at most 0.06 kPa, or at most 0.05 kPa, at 150° C.; and (E) the formulation includes a softening agent selected to reduce said elevated glass transition temperature by at least 5° C., at least 7° C., at least 10° C., at least 15° C., at least 20° C., at least 25° C., at least 30° C., at least 40° C., or at least 50° C.

According to another aspect of the present invention there is provided an ink film construction including: (a) a printing substrate; and (b) at least one substantially dry ink film, fixedly adhered to a surface of the printing substrate, the ink film containing at least one colorant dispersed in an organic polymeric resin; the ink film fulfilling at least one of the following structural properties: (A) at least one particular resin of the organic polymeric resin has an elevated glass transition temperature ($T_g$) of at least 52° C., at least 54° C., at least 56° C., at least 58° C., at least 60° C., at least 65° C., at least 70° C., at least 75° C., at least 80° C., at least 85° C., at least 90° C., or at least 95° C.; (B) the substantially dry ink residue has, at at least one of 100° C., 90° C., 85° C., 80° C., 75° C., and 70° C., a transferability rating of at least 0.90; (C) the at least one particular resin has a minimum film-forming temperature (MFFT) of at least 48° C., at least 50° C., at least 52° C., at least 54° C., at least 56° C., at least 58° C., at least 60° C., at least 65° C., at least 70° C., or at least 75° C.; (D) the formulation includes a softening agent having a vapor pressure of at most 0.40 kPa, at most 0.35 kPa, at most 0.25 kPa, at most 0.20 kPa, at most 0.15 kPa, at most 0.12 kPa, at most 0.10 kPa, at most 0.08 kPa, at most 0.06 kPa, or at most 0.05 kPa, at 150° C.; and (E) the formulation includes a softening agent selected to reduce said elevated glass transition temperature by at least 5° C., at least 7° C., at least 10° C., at least 15° C., at least 20° C., at least 25° C., at least 30° C., at least 40° C., or at least 50° C.; the ink film exhibiting at least one of the following structural properties: (I) a first dynamic viscosity within a range of $10^6$ cP to $3 \cdot 10^8$ cP over at least part of a first temperature range of 60° C. to 100° C., 60° C. to 105° C., or 60° C. to 110° C.; and a second dynamic viscosity of at least $6 \cdot 10^7$ cP, over at least a part of a second temperature range of 50° C. to 55° C., the second dynamic viscosity at 55° C. exceeding the first dynamic viscosity at 85° C.; (II) the ink film includes a single ink dot covering an area of the surface; the ink dot fulfilling a structural condition wherein, with respect to a direction normal to the surface over all of the area, the single ink dot is disposed entirely above the area; an average or characteristic thickness of the single ink dot being at most 1,800 nm; (III) the ink film includes an ink dot set or field contained within a square geometric projection projecting on the printing substrate, the ink dot set containing at least 10 distinct ink dots, fixedly adhered to a surface of the printing substrate, all the ink dots within the square geometric projection being counted as individual members of the set, each of the dots having an average thickness of less than 2,000 nm, and a diameter of 5 to 300 micrometers; each of the ink dots having a generally convex shape in which a deviation from convexity, ($DC_{dot}$), is defined by:

$$DC_{dot} = 1 - AA/CSA,$$

AA being a calculated projected area of the dot, the area disposed generally parallel to the first fibrous printing substrate; and CSA being a surface area of a convex shape that minimally bounds a contour of the projected area; a mean deviation from convexity ($DC_{dot\ mean}$) of the ink dot set being at most 0.085; and (IV) the above-described ink dot set, each of the dots having an average thickness of less than 2,000 nm, and a diameter of 5 to 300 micrometers; each of the ink dots having a deviation from a smooth circular shape, ($DR_{dot}$), represented by:

$$DR_{dot} = [P^2/(4\pi \cdot A)] - 1,$$

P being a measured or calculated perimeter of the ink dot; A being a maximal measured or calculated area contained by the perimeter; a mean deviation ($DR_{dot\ mean}$) of the ink dot set being at most 0.85.

According to further features in the described preferred embodiments, the dynamic viscosity within the first temperature range is at most $2 \cdot 10^8$ cP, $1 \cdot 10^8$ cP, or $8 \cdot 10^7$ cP.

According to still further features in the described preferred embodiments, the ratio of the second dynamic viscosity, at 55° C., to the first dynamic viscosity, at 85° C., is at least 1.7, at least 2, at least 2.5, at least 3, at least 4, at least 4.5, at least 5, at least 6, at least 7, at least 8, or at least 10.

According to still further features in the described preferred embodiments, this viscosity ratio is at most 30, at most 25, at most 20, at most 15, or at most 12.

According to still further features in the described preferred embodiments, the colorant includes at least one pigment.

According to still further features in the described preferred embodiments, the total concentration of the colorant and the resin within the ink dot is at least 7%, at least 10%, at least 15%, at least 20%, at least 30%, at least 40%, at least 50%, at least 60%, at least 70%, or at least 85%.

According to still further features in the described preferred embodiments, the weight ratio of the resin to the colorant within the plurality of ink films is at least 1:1, at least 1.25:1, at least 1.5:1, at least 1.75:1, at least 2:1, at least 2.5:1, at least 3:1, at least 3.5:1, at least 4:1, at least 5:1, at least 7:1, or at least 10:1.

According to still further features in the described preferred embodiments, the ink dot contains less than 2%, less than 1%, less than 0.5%, or less than 0.1% of one or more charge directors, or is substantially devoid of charge directors.

According to still further features in the described preferred embodiments, the ink films contain at most 5%, at most 3%, at most 2%, at most 1%, or at most 0.5% inorganic filler particles (such as silica or titania), by weight.

According to still further features in the described preferred embodiments, the formulation contains at most 20%, at most 16%, at most 13%, at most 10%, at most 8%, at most 6%, at most 4%, at most 3%, at most 2%, at most 1%, or at most 0.2% glycerol, by weight.

According to still further features in the described preferred embodiments, the ink dot contains less than 5%, less than 3%, less than 2%, or less than 0.5% of one or more hydrocarbons or oils, or is substantially devoid of such hydrocarbons or oils.

According to still further features in the described preferred embodiments, the ink films are disposed as laminates onto the surface of the printing substrate.

According to still further features in the described preferred embodiments, fibers of the fibrous printing substrate directly contact the ink dot.

According to still further features in the described preferred embodiments, the commodity coated fibrous printing substrate contains a coating having less than 10%, less than 5%, less than 3%, or less than 1%, by weight, of a water-absorbent polymer.

According to still further features in the described preferred embodiments, the fibrous printing substrate is a paper, optionally selected from the group of papers consisting of bond paper, uncoated offset paper, coated offset paper, copy paper, groundwood paper, coated groundwood paper, freesheet paper, coated freesheet paper, and laser paper.

According to still further features in the described preferred embodiments, the average (total) thickness of the ink film is within a range of 100-1,200 nm, 200-1,200 nm, 200-1,000 nm, 100-800 nm, 100-600 nm, 100-500 nm, 100-450 nm, 100-400 nm, 100-350 nm, 100-300 nm, 200-450 nm, 200-400 nm, or 200-350 nm.

According to still further features in the described preferred embodiments, the average (total) ink film thickness or single ink-dot thickness is at least 150 nm, at least 200 nm, at least 250 nm, at least 300 nm, or at least 350 nm.

According to still further features in the described preferred embodiments, the average single ink-dot thickness is within a range of 100-800 nm, 100-600 nm, 100-500 nm, 100-450 nm, 100-400 nm, 100-350 nm, 100-300 nm, 200-450 nm, 200-400 nm, or 200-350 nm.

According to still further features in the described preferred embodiments, the ink film has an average thickness or height of at most 5,000 nm, at most 4,000 nm, at most 3,500 nm, at most 3,000 nm, at most 2,500 nm, or at most 2,000 nm.

According to still further features in the described preferred embodiments, the ink film has an average thickness or height of at most 1,800 nm, at most 1,500 nm, at most 1,200 nm, at most 1,000 nm, at most 800 nm, at most 650 nm, at most 500 nm, at most 450 nm, or at most 400 nm.

According to still further features in the described preferred embodiments, the square geometric projection has a side length within a range of 0.5 mm to 15 mm, or about 10 mm, 5 mm, 2 mm, 1 mm, 0.8 mm, or 0.6 mm.

According to still further features in the described preferred embodiments, the diameter of the inkjet dot is at least 7, at least 10, at least 12, at least 15, at least 18, or at least 20 micrometers.

According to further features in the described preferred embodiments, the first dynamic viscosity is at most $4 \cdot 10^7$ cP, at most $3 \cdot 10^7$ cP, at most $2.5 \cdot 10^7$ cP, at most $2 \cdot 10^7$ cP, at most $1.5 \cdot 10^7$ cP, or at most $1 \cdot 10^7$ cP.

According to still further features in the described preferred embodiments, the first dynamic viscosity is at least $2 \cdot 10^6$ cP, at least $4 \cdot 10^6$ cP, at least $6 \cdot 10^6$ cP, at least $7 \cdot 10^6$ cP, at least $8 \cdot 10^6$ cP, or at least $9 \cdot 10^6$ cP.

According to still further features in the described preferred embodiments, the first dynamic viscosity is within a range of $10^6$ cP to $4 \cdot 10^7$ cP, $10^6$ cP to $3 \cdot 10^7$ cP, $10^6$ cP to $2 \cdot 10^7$ cP, $3 \cdot 10^6$ cP to $4 \cdot 10^7$ cP, $3 \cdot 10^6$ cP to $3 \cdot 10^7$ cP, $5 \cdot 10^6$ cP to $3 \cdot 10^7$ cP, $7 \cdot 10^6$ cP to $3 \cdot 10^7$ cP, $8 \cdot 10^6$ cP to $3 \cdot 10^7$ cP, $9 \cdot 10^6$ cP to $3 \cdot 10^7$ cP, $10^7$ cP to $5 \cdot 10^7$ cP, $10^7$ cP to $5 \cdot 10^7$ cP, $10^7$ cP to $4 \cdot 10^7$ cP, $10^7$ cP to $3 \cdot 10^7$ cP, $1.5 \cdot 10^7$ cP to $3 \cdot 10^7$ cP, or $10^7$ cP to $3 \cdot 10^7$ cP.

According to still further features in the described preferred embodiments, the second dynamic viscosity within the second temperature range is at least $8 \cdot 10^7$ cP, at least $9 \cdot 10^7$ cP, at least $10^8$ cP, at least $1.2 \cdot 10^8$ cP, at least $1.5 \cdot 10^8$ cP, at least $2.0 \cdot 10^8$ cP, at least $2.5 \cdot 10^8$ cP, at least $3.0 \cdot 10^8$ cP, at least $3.5 \cdot 10^8$ cP, at least $4.0 \cdot 10^8$ cP, at least $5.0 \cdot 10^8$ cP, or at least $7.5 \cdot 10^8$ cP.

According to still further features in the described preferred embodiments, this second dynamic viscosity is at most $6 \cdot 10^9$ cP, at most $4 \cdot 10^9$ cP, at most $3 \cdot 10^9$ cP, at most $2 \cdot 10^9$ cP, at most $1.5 \cdot 10^9$ cP, or at most $10^9$ cP.

According to still further features in the described preferred embodiments, this second dynamic viscosity is within a range of $7 \cdot 10^7$ cP to $5 \cdot 10^9$ cP, $7 \cdot 10^7$ cP to $3 \cdot 10^9$ cP, $7 \cdot 10^7$ cP to $2 \cdot 10^9$ cP, $7 \cdot 10^7$ cP to $1 \cdot 10^9$ cP, $8 \cdot 10^7$ cP to $5 \cdot 10^9$ cP, $9 \cdot 10^7$ cP to $5 \cdot 10^9$ cP, $9 \cdot 10^7$ cP to $3 \cdot 10^9$ cP, $9 \cdot 10^7$ cP to $2 \cdot 10^9$ cP, $9 \cdot 10^7$ cP to $1.5 \cdot 10^9$ cP, $1 \cdot 10^8$ cP to $5 \cdot 10^9$ cP, $1 \cdot 10^8$ cP to $3 \cdot 10^9$ cP, $1 \cdot 10^8$ cP to $2 \cdot 10^9$ cP, or $1.5 \cdot 10^8$ cP to $1.5 \cdot 10^9$ cP.

According to still further features in the described preferred embodiments, the upper temperature limit of the first temperature range is 87° C., 86° C., 85° C., 84° C., 82° C., 80° C., 78° C., 76° C., 74° C., 72° C., 70° C., or 68° C.

According to still further features in the described preferred embodiments, the lower temperature limit of this range is 61° C., 62° C., 63° C., 64° C., or 65° C.

According to still further features in the described preferred embodiments, the ink films or dried ink residue have a glass transition temperature ($T_g$) of at least 52° C., at least 54° C., at least 56° C., at least 58° C., at least 60° C., at least 65° C., at least 70° C., at least 75° C., at least 80° C., at least 85° C., at least 90° C., or at least 95° C.

According to still further features in the described preferred embodiments, the plurality of ink films or dried ink residue contain at least one water-soluble material or at least one water-dispersible material, optionally including an aqueous dispersant.

According to still further features in the described preferred embodiments, the ink films or dried ink residue contain at least 2%, at least 3%, at least 5%, or at least 8%, by weight, of the water-soluble material.

According to still further features in the described preferred embodiments, the ink films or dried ink residue contain at least 1.2%, at least 1.5%, at least 2%, at least 3%, at least 4%, at least 6%, at least 8%, at least 10%, at least 12%, at least 15%, or at least 20% of the colorant, by weight.

According to still further features in the described preferred embodiments, the ink films or dried ink residue contain at least 20%, at least 30%, at least 40%, at least 50%, at least 60%, or at least 70% of the resin, by weight.

According to still further features in the described preferred embodiments, AT defines a temperature differential between a temperature ($T_F$) at which the ink films or dried ink residue begin to exhibit a particular degree of flowability, and a baseline temperature ($T_B$):

$$\Delta T = T_F - T_B$$

the degree of flowability being defined by a critical viscosity ($\mu_{CR}$) at which the degree of flowability is achieved, and wherein, when the baseline temperature equals 50° C., and the critical viscosity equals $10^8$ cP, the temperature differential is at least 3° C., at least 4° C., at least 5° C., at least 7° C., at least 12° C., at least 15° C., at least 18° C., at least 20° C., or at least 25° C.

According to still further features in the described preferred embodiments, the printing substrate is a fibrous printing substrate, a commodity coated printing substrate, an uncoated printing substrate, or a coated or uncoated offset substrate.

According to still further features in the described preferred embodiments, the continuous ink film of the continuous ink films is defined as an ink dot, a dimensionless aspect ratio ($R_{aspect}$) is defined by:

$$R_{aspect} = D_{dot}/H_{dot}$$

wherein: $D_{dot}$ is an average diameter of the dot; $H_{dot}$ is an average thickness of the dot; the dimensionless aspect ratio being at least 15, at least 20, at least 25, or at least 30, at least 40, at least 50, at least 60, at least 75, at least 85, at least 95, at least 110, or at least 120.

According to still further features in the described preferred embodiments, the dimensionless aspect ratio is at most 200 or at most 175.

According to still further features in the described preferred embodiments, the plurality of continuous ink films are fixedly adhered directly on the surface of the printing substrate.

According to still further features in the described preferred embodiments, the colorant constitutes at least 0.3%, at least 0.5%, at least 0.7%, at least 0.85%, at least 1%, at least 1.2%, at least 1.4%, at least 1.6%, at least 1.8%, or at least 2%, by weight, of the formulation.

According to still further features in the described preferred embodiments, the formulation further includes a softening agent optionally having a vapor pressure of at most 0.40 kPa, at most 0.35 kPa, at most 0.25 kPa, at most 0.20 kPa, at most 0.15 kPa, at most 0.12 kPa, at most 0.10 kPa, at most 0.08 kPa, at most 0.06 kPa, or at most 0.05 kPa, at 150° C.

According to still further features in the described preferred embodiments, the softening agent is chemically stable up to a temperature of at least 170° C., at least 185° C., at least 200° C., or at least 220° C.

According to still further features in the described preferred embodiments, the formulation or the at least one organic polymeric resin further includes an aqueous dispersant, the dispersant optionally constituting at most 5%, at most 4.5%, at most 4%, at most 3.5 wt. %, at most 3 wt. %, at most 2.5 wt. %, at most 2 wt. %, at most 1.5 wt. %, at most 1 wt. % or at most 0.5 wt. % of the formulation.

According to still further features in the described preferred embodiments, the dispersant is selected from the group consisting of high molecular weight polyurethanes or aminourethanes, styrene-acrylic copolymers, modified polyacrylate polymers, acrylic block copolymer made by controlled free radical polymerization, sulfosuccinates, acetylenic diols, ammonium salts of carboxylic acid, alkylol ammonium salts of carboxylic acid, aliphatic polyethers with acidic groups, and ethoxylated non-ionic fatty alcohols.

According to still further features in the described preferred embodiments, the polymeric resin includes, or mainly includes, an acrylic-based polymer selected from the group consisting of an acrylic polymer and an acrylic-styrene copolymer; or includes or mainly includes linear or branched resins of polyester or co-polyester.

According to still further features in the described preferred embodiments, the ink formulation is formulated such that when diluted by at least 50%, at least 100%, at least 150%, at least 200%, at least 250%, at least 300%, at least 350%, or at least 400%, on a weight/weight basis by a diluting solvent or water, a resultant mixture is an aqueous inkjet ink having: (i) a viscosity of 2 to 25 cP at at least one particular temperature in a range of 20-60° C.; and (ii) a surface tension of at most 50 milliNewton/m at at least one particular temperature within the range.

BRIEF DESCRIPTION OF THE DRAWINGS

The invention will now be described further, by way of example, with reference to the accompanying drawings, in which:

FIG. 4B provides temperature sweep plots of dynamic viscosity as a function of temperature, for dried ink residues of inventive ink formulations containing various polyester resins;

FIGS. 10A-F display two-dimensional (FIGS. 10A-C) and three-dimensional (FIGS. 10D-F) laser-microscope acquired magnified images of ink films on coated paper substrates, obtained using various printing technologies, wherein: FIGS. 10A and 10D are magnified images of a liquid electro-photography film (LEP); FIGS. 10B and 10E are magnified images of an offset splotch; and FIGS. 10C and 10F are magnified images of an inkjet ink film construction according to the present invention;

FIGS. 11A-F display two-dimensional (FIGS. 11A-C) and three-dimensional (FIGS. 11D-F) laser-microscope acquired magnified images of ink films on uncoated paper substrates, obtained using various printing technologies, wherein: FIGS. 11A and 11D are magnified images of a liquid electro-photography film (LEP); FIGS. 11B and 11E are magnified images of an offset splotch; and FIGS. 11C and 11F are magnified images of an inkjet ink film construction according to the present invention;

FIGS. 12A-1, 12B-1, 12C-1, 12D-1 and 12E-1 provide magnified views of respective fields of ink dots or films on respective samples of commodity-coated fibrous substrates (FIGS. 12A-1, 12B-1 and 12C-1) and uncoated fibrous substrates (FIGS. 12D-1 and 12E-1), each of the fields of ink dots or films being produced using an ink formulation of the present invention, and each of the five figures relating to a different fibrous substrate;

FIGS. 12A-2, 12B-2, 12C-2, 12D-2 and 12E-2 provide a further magnified view of a portion of each of the corresponding frames of FIGS. 12A-1, 12B-1, 12C-1, 12D-1 and 12E-1, respectively;

FIGS. 12A-3, 12B-3, 12C-3, 12D-3 and 12D-E provide corresponding optical uniformity profiles for each of the respective samples of FIGS. 12A-2, 12B-2, 12C-2, 12D-2 and 12E-2;

FIGS. 12A-4, 12B-4, 12C-4, 12D-4 and 12E-4 provide corresponding image-processor computed contours and convexity projections for each of the respective samples of FIGS. 12A-2, 12B-2, 12C-2, 12D-2 and 12E-1;

FIGS. 14A-1, 14B-1, 14C-1, 14D-1, 14E-1 and 14F-1 provide optical uniformity profiles of respective images of ink splotches or films obtained using various prior-art printing technologies on uncoated (FIGS. 14A-1, 14B-1 and 14C-1) and coated (FIGS. 14D-1, 14E-1 and 14F-1) paper; corresponding FIGS. 14A-2, 14B-2, 14C-2, 14D-2, 14E-2 and 14F-2 show said respective images.

FIGS. 14A-3, 14B-3, 14C-3, 14D-3, 14E-3 and 14F-3 provide corresponding analyses of the ink splotches or films provided in FIGS. 14A-1, 14B-1, 14C-1, 14D-1, 14E-1 and 14F-1, respectively;

DETAILED DESCRIPTION OF THE ILLUSTRATED EMBODIMENTS

Figure 1:
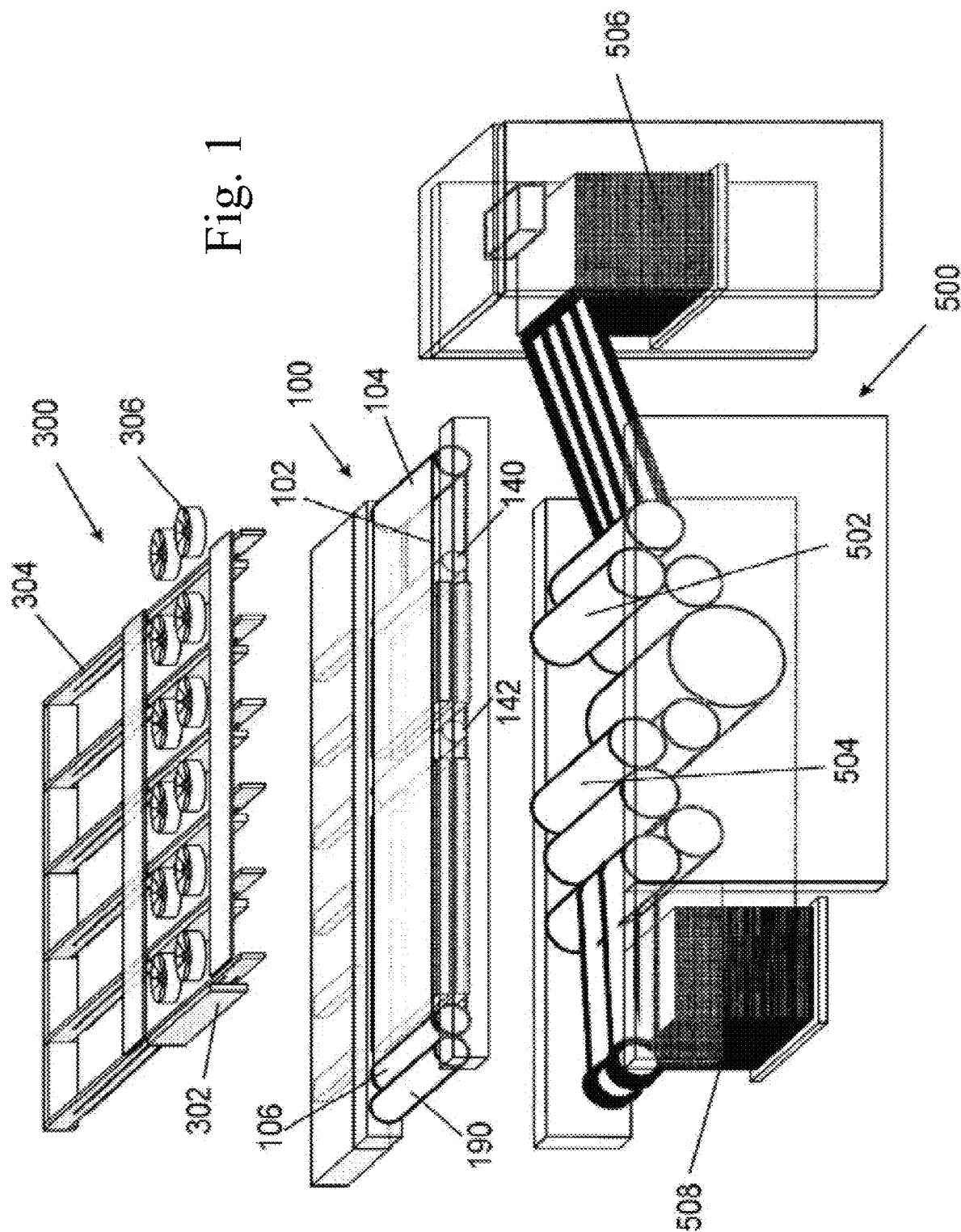
FIG. 1 is an exploded schematic perspective view of a printing system in accordance with which an embodiment of the invention may be used.

The ink formulations and ink film constructions according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The inventive ink formulations may be used, and the ink film constructions may be obtained, in particular by the following printing process or by using any printing system implementing such process. A printing process suitable for use of the ink formulations herein disclosed and for the preparation of the ink films according to the invention includes directing droplets of an ink onto an intermediate transfer member to form an ink image, the ink including an organic polymeric resin and a colorant (e.g., a pigment or dye) in an aqueous carrier, and the transfer member having a hydrophobic outer surface, each ink droplet in the ink image spreading on impinging upon the intermediate transfer member to form a wet ink film (e.g., a thin film preserving a major part of the flattening and horizontal extension of the droplet present on impact or covering an area dependent upon the mass of ink in the droplet). The ink is dried while the ink image is being transported by the intermediate transfer member by evaporating the aqueous carrier from the ink image to leave a dry or substantially dry residue film including resin and colorant. The residue film is then transferred to a substrate (e.g., by pressing the intermediate transfer member against the substrate to impress the residue film thereupon). The chemical compositions of the ink and of the surface of the intermediate transfer member are selected such that attractive intermolecular forces between molecules in the outer skin of each droplet and on the surface of the intermediate transfer member counteract the tendency of the ink film produced by each droplet to bead under the action of the surface tension of the aqueous carrier, without causing each droplet to spread by wetting the surface of the intermediate transfer member. Further details on such printing process and exemplary printing systems suitable for use with the ink formulations of the present invention and enabling the ink film constructions thereof are disclosed in PCT Publications Nos. WO 2013/132418, WO 2013/132419 and WO 2013/132420.

The printing process sets out to preserve, or freeze, the thin pancake disc shape of each aqueous ink droplet, that is caused by the flattening of the ink droplet on impacting the surface of the intermediate transfer member (also termed the release layer), despite the low surface energy and hydrophobicity of this layer. To achieve this objective, this novel process relies on electrostatic interactions between molecules in the ink and in the outer surface of the transfer member, the molecules being either charged in their respective medium or being mutually chargeable, becoming oppositely charged upon interaction between the ink and the release layer. Further details on the printing process are provided hereinbelow.

General Overview of the Printing Process and System

The printing system shown in FIGS. 1 and 2 essentially includes three separate and mutually interacting systems, namely a blanket system 100, an image forming system 300 above the blanket system 100, and a substrate transport system 500 below the blanket system 100. While circulating in a loop, the blanket passes through various stations. Though the below description is provided in the context of the intermediate transfer member being an endless belt, the ink formulations according to the invention are equally applicable to printing systems wherein the intermediate transfer member is a drum, the specific designs of the various stations being accordingly adapted.

The blanket system 100 includes an endless belt or blanket 102 that acts as an intermediate transfer member and is guided over two rollers 104, 106. An image made up of dots of an aqueous ink is applied by image forming system 300 to an upper run of blanket 102 at a location referred herein as the image forming station. A lower run selectively interacts at two impression stations with two impression cylinders 502 and 504 of the substrate transport system 500 to impress an image onto a substrate compressed between the blanket 102 and the respective impression cylinder 502, 504. As will be explained below, the purpose of there being two impression cylinders 502, 504 is to permit duplex printing. Though not illustrated, duplex printing can also be achieved with a single impression station using an adapted perfecting system able to refeed to the impression station on the reverse side a substrate already printed on its first side. In the case of a simplex printer, only one impression station would be needed.

In operation, ink images, each of which is a mirror image of an image to be impressed on a final substrate, are printed by the image forming system 300 onto an upper run of blanket 102. In this context, the term "run" is used to mean a length or segment of the blanket between any two given rollers over which the blanket is guided. While being transported by the blanket 102, the ink is heated to dry it by evaporation of most, if not all, of the liquid carrier. The ink image is furthermore heated to render tacky the film of ink solids remaining after evaporation of the liquid carrier, this film being referred to as a residue film, to distinguish it from the liquid film formed by flattening of each ink droplet. At the impression cylinders 502, 504 the image is impressed onto individual sheets 501 of a substrate which are conveyed by the substrate transport system 500 from an input stack 506 to an output stack 508 via the impression cylinders 502, 504. Though not shown in the figures, the substrate may be a continuous web, in which case the input and output stacks may be replaced by a supply roller and a delivery roller. The substrate transport system needs to be adapted accordingly, for instance by using guide rollers and dancers taking slacks of web to properly align it with the impression station.

Image Forming System

The image forming system 300 includes print bars 302 which may each be slidably mounted on a frame positioned at a fixed height above the surface of the blanket 102. Each print bar 302 may include a strip of print heads as wide as the printing area on the blanket 102 and includes individually controllable print nozzles. The image forming system can have any number of bars 302, each of which may contain an aqueous ink of a different or of the same color, typically each jetting Cyan (C), Magenta (M), Yellow (Y) or Black (K) inks. It is possible for the print bars to deposit different shades of the same color (e.g., various shades of gray, including black) or for two print bars or more to deposit the same color (e.g., black). Additionally, the print bar can be used for pigmentless liquids (e.g., decorative or protective varnishes) and/or for specialty colors (e.g., achieving visual effect, such as metallic, sparkling, glowing or glittering look, or even scented effect).

As some print bars may not be required during a particular printing job, the heads can be moved between an operative position (at which the bar remains stationary), in which they overlie blanket 102 and an inoperative position (at which the bar can be accessed for maintenance).

Within each print bar, the ink may be constantly recirculated, filtered, degassed and maintained at a desired temperature and pressure, as known to the person skilled in the art without the need for more detailed description.

As different print bars 302 are spaced from one another along the length of the blanket, it is of course essential for their operation to be correctly synchronized with the movement of blanket 102.

If desired, it is possible to provide a blower following each print bar 302 to blow a slow stream of a hot gas, preferably air, over the intermediate transfer member to commence the drying of the ink droplets deposited by the print bar 302. This assists in fixing the droplets deposited by each print bar 302, that is to say resisting their contraction and preventing their movement on the intermediate transfer member, and also in preventing them from merging into droplets deposited subsequently by other print bars 302. Such post jetting treatment of the just deposited ink droplets, need not substantially dry them, but only enable the formation of a skin on their outer surface.

Blanket and Blanket Support System

The blanket 102, in one variation, is seamed. In particular, the blanket can be formed of an initially flat strip of which the ends are fastened to one another, releasably or permanently, to form a continuous loop often referred to as a belt. A releasable fastening may be a zip fastener or a hook and loop fastener that lies substantially parallel to the axes of rollers 104 and 106 over which the blanket is guided. A permanent fastening may be achieved by the use of an adhesive or a tape. The continuous belt may be formed by more than one elongated blanket strip and may therefore include more than one seam. Alternatively, the belt may be seamless.

In order to avoid a sudden change in the tension of the blanket as the seam passes over rollers or other parts of the support system, it is desirable to make the seam, as nearly as possible, of the same thickness as the remainder of the blanket.

The primary purpose of the blanket is to receive an ink image from the image forming system and to transfer that image dried but undisturbed to the impression stations. To allow easy transfer of the ink image at each impression station, the blanket has a thin upper release layer that may be highly hydrophobic. Under suitable conditions, a silanol-, sylyl- or silane-modified or terminated polydialkylsiloxane silicone material and amino silicones have been found to work well in the composition of the release layer. However the exact formulation of the silicone being cured is not critical as long as the selected material allows for release of the image from the transfer member to a final substrate.

The strength of the blanket can be derived from a support or reinforcement layer. In one instance, the reinforcement layer is formed of a fabric. If the fabric is woven, the warp and weft threads of the fabric may have a same or different composition or physical structure so that the blanket may have, for reasons to be discussed below, greater elasticity in its widthways direction (parallel to the axes of the rollers 104 and 106) than in its lengthways direction.

The blanket may include additional layers between the reinforcement layer and the release layer, for example to provide conformability and compressibility of the release layer to the surface of the substrate. Other layers may be further included to act as a thermal reservoir or a thermal barrier. An inner layer may further be provided to control the frictional drag on the blanket as it is rotated over its support structure. Other layers may be included to adhere or connect the aforementioned layers one with another or to prevent migration of molecules therebetween.

The blanket support system may include thermally conductive support plates 130 forming a continuous flat support surface both on the top side and the bottom side of the support frame. Electrical heating elements can be inserted into transverse holes of the plates to apply heat to the plates 130 and through plates 130 to the blanket 102. Other means for heating the blanket will occur to the person of skill in the art and may include heating from below, above, or within the blanket itself.

Also mounted on the blanket support frame are two pressure or nip rollers 140, 142, which can be raised and lowered from the lower run of the blanket. The pressure rollers are located on the underside of the support frame in gaps between the support plates 130 covering the underside of the frame. The pressure rollers 140, 142 are aligned respectively with the impression cylinders 502, 504 of the substrate transport system. Each impression roller and corresponding pressure roller, when both are engaged with the blanket passing therebetween, form an impression station.

In some instances, the blanket support system further includes a continuous track that can engage formations on the side edges of the blanket to maintain the blanket taut in its width ways direction. The formations may be spaced projections, such as the teeth of one half of a zip fastener sewn or otherwise attached to the side edge of the blanket. Alternatively, the formations may be a continuous flexible bead of greater thickness than the blanket. The lateral formations may be directly attached to the edges of the blanket or through an intermediate strip that can optionally provide suitable elasticity to engage the formations in their respective guiding track, while maintaining the blanket flat in particular at the image forming station. The lateral track guide channel may have any cross-section suitable to receive and retain the blanket lateral formations and maintain it taut. To reduce friction, the guide channel may have rolling bearing elements to retain the projections or the beads within the channel. Further details on exemplary blanket lateral formations or seams that may be suitable for intermediate transfer members appropriate for use with the ink formulations of the present invention are disclosed in PCT Publication No. WO 2013/136220.

In order for the image to be properly formed on the blanket and transferred to the final substrate and for the alignment of the front and back images in duplex printing to be achieved, a number of different elements of the system must be properly synchronized. In order to position the images on the blanket properly, the position and speed of the blanket must be both known and controlled. For this purpose, the blanket can be marked at or near its edge with one or more markings spaced in the direction of motion of the blanket. One or more sensors 107 sense the timing of these markings as they pass the sensor. The speed of the blanket and the speed of the surface of the impression rollers should be the same, for proper transfer of the images to the substrate from the transfer blanket. Signals from the sensor(s) 107 are sent to a controller 109 which also receives an indication of the speed of rotation and angular position of the impression rollers, for example from encoders on the axis of one or both of the impression rollers (not shown). Sensor 107, or another sensor (not shown), also determines the time at which the seam of the blanket passes the sensor. For maximum utility of the usable length of the blanket, it is desirable that the images on the blanket start as close to the seam as feasible. Further details on exemplary control systems that may be suitable for printing systems appropriate for use with the ink formulations of the present invention are disclosed in PCT Publication No. WO 2013/132424.

Blanket Pre-Treatment

FIG. 1 shows schematically a roller 190 positioned on the external side of the blanket immediately before roller 106. Such a roller 190 may be used optionally to apply a thin film of pre-treatment solution containing a conditioning chemical agent.

While a roller can be used to apply an even film, the pre-treatment or conditioning material can alternatively be sprayed onto the surface of the blanket and optionally spread more evenly, for example by the application of a jet from an air knife. Alternatively, the optional conditioning solution may be applied by passing the blanket over a thin film of conditioning solution seeping through a cloth having no direct contact with the surface of the release layer. Independently of the method used to apply the optional conditioning solution, if needed, the location at which such pre-print treatment can be performed may be referred herein as the conditioning station. The alternative printing system illustrated in FIG. 3 may also include a conditioning station.

As noted, when the ink droplet impinges on the transfer member, the momentum in the droplet causes it to spread into a relatively flat volume. In the prior art, this flattening of the droplet is almost immediately counteracted by the combination of surface tension of the droplet and the hydrophobic nature of the surface of the transfer member.

In some instances, the shape of the ink droplet is "frozen" such that at least some and preferably a major part of the flattening and horizontal extension of the droplet present on impact is preserved. It should be understood that since the recovery of the droplet shape after impact is very fast, the methods of the prior art would not effect phase change by agglomeration and/or coagulation and/or migration.

Without wishing to be bound by theory, it is believed that, on impact, the positive charges which have been placed on the surface of the transfer member attract the negatively charged polymer resin particles of the ink droplet that are immediately adjacent to the surface of the member. It is believed that, as the droplet spreads, this effect takes place along a sufficient area of the interface between the spread droplet and the transfer member to retard or prevent the beading of the droplet, at least on the time scale of the printing process, which is generally on the order of seconds.

As the amount of charge is too small to attract more than a small number of charged resin particles in the ink, it is believed that the concentration and distribution of the charged resin particles in the drop is not substantially changed as a result of contact with the chemical agent on the release layer. Furthermore, since the ink is aqueous, the effects of the positive charge are very local, especially in the very short time span needed for freezing the shape of the droplets.

Without wishing to be bound by theory, it is believed that in applying a conditioning agent or solution to the surface of the intermediate transfer member, at least one type of positively-charged functional group of the conditioning agent is adsorbed onto, or otherwise attached to, the surface of the release layer. On the opposite side of the release layer, facing the jetted ink drops, at least one type of positively-charged functional group of the conditioning agent is available and positioned to interact with the negatively charged species in the ink (e.g., in the resin).

Intermediate transfer members amenable to such treatment may include in their release layer, by way of example, silanol-, sylyl- or silane-modified or terminated polydialkylsiloxane silicones, or combinations thereof. Further details on exemplary release layers that may be suitable for use with the ink formulations of the present invention are disclosed in PCT Publication No. WO 2013/132432.

Chemical agents suitable for the preparation of such conditioning solutions, if required, have relatively high charge density and can be polymers containing amine nitrogen atoms in a plurality of functional groups, which need not be the same, and can be combined (e.g., primary, secondary, tertiary amines or quaternary ammonium salts). Though macromolecules having a molecular weight from several hundred to several thousand may be suitable conditioning agents, the inventors believe that polymers having a high molecular weight of 10,000 g/mole or more are preferable. Suitable conditioning agents include cationic guar, guar-based polymers, cationic methacrylamide, methacrylamide-based polymers, and linear, branched or modified polyethylene imines (PEI). Further details on exemplary conditioning agents, and solutions therefrom, that may be suitable in printing systems appropriate for use with the ink formulations of the present invention are disclosed in PCT Publication No. WO 2013/132339.

The efficacy of this method and of the water-based treating solutions associated therewith, also termed "conditioning solutions", was established in laboratory experimental setups and in preliminary pilot printing experiments. As disclosed in the above-mentioned application the use of such solutions was highly beneficial, as assessed by the print quality of the image following its transfer from the intermediate transfer member to the printing substrate. The optical density of the printed matter was considered of particular relevance and the use of such method of blanket treatment prior to ink jetting clearly improved the measured outcome on the printing substrate.

According to the method originally developed by the Applicant, a very thin coating of conditioning solution was applied to the transfer member, immediately removed and evaporated, leaving no more than a few molecular layers of the suitable chemical agent. Ink droplets were jetted on such pre-treated blanket, dried and transferred to the printing substrate. Typically, the ink film image so printed could be identified by the presence on their outer surface of the conditioning agent. In other words, the dried ink droplet upon transfer peeled away the underlayer of conditioning agent, which was then impressed on the final substrate in inversed orientation.

Exemplary conditioning solutions include Conditioning Solution A, provided below, and its plain counterpart, in which the conditioning agent is diluted in distilled water (1:99), without additives.

| Conditioning Solution A | |
|---|---|
| PEI Lupasol ® PS (BASF) | 1 |
| Sucrose | 4 |
| Water | 95 |

Ink Image Heating

The heaters, either inserted into the support plates 130 or positioned above the blanket as intermediate drying system 224 and drying station 214, are used to heat the blanket to a temperature that is appropriate for the rapid evaporation of the ink carrier and compatible with the composition of the blanket. For blankets including, for instance, silanol-modified or terminated polydialkylsiloxane silicones in the release layer, the temperature of heating may vary within a range from 70° C. to 180° C., depending on various factors such as the composition of the inks and/or of the conditioning solutions if needed. Blankets including amino silicones may generally be heated to temperatures between 70° C. and 130° C. Exemplary blankets comprising cured amino-functionalized silicones in their release layer are disclosed in PCT Publication No. WO 2013/132438.

In some printing systems, the temperature of the blanket may remain relatively similar along the loop followed by the blanket, with optional localized transient change in temperature (e.g., to facilitate transfer of the dried ink image from the transfer member to the printing substrate). In other printing systems, the temperature of the blanket may vary as desired among the stations it passes. For example, the ink formulations may be jetted at the image forming station upon a blanket at a relatively low temperature below the evaporation temperature of the ink carrier (e.g., between 60° C. and 100° C., typically between 70° C. and 90° C.). The deposited ink droplets may thereafter be dried upon the blanket having then a higher temperature to facilitate the evaporation of the ink carrier (e.g., up to 200° C.). The blanket temperature may be further modified so that its temperature is sufficient to enable transfer of the dried ink image at the impression station. In high temperature transfer processes, in which the blanket is further heated at the nip of the impression station (e.g., via 231), the surface temperature could be transiently raised up to 170° C. In low temperature transfer processes, in which the blanket is not further heated following ink drying, the surface temperature at the impression station can be below 140° C., typically below 120° C. Following the impression station, the blanket temperature may be additionally changed to suit the optimal operating condition of any station the printing system may include. For example, the blanket may be further heated or cooled to suit a coating station at which a varnish may be optionally applied on the printed ink image. Finally, the blanket temperature may be further modified to allow it to re-enter the image forming station at a desired temperature. For this purpose, a printing system suitable for use with the ink formulations according to the invention may include a blanket cooling station.

When using beneath heating of the transfer member, it may be desirable for the blanket to have relatively high thermal capacity and low thermal conductivity, so that the temperature of the body of the blanket 102 will not change significantly as it moves between the optional pre-treatment or conditioning station, the image forming station and the impression station(s). When using top heating of the transfer member, the blanket would preferably include a thermally insulating layer to prevent undue dissipation of the applied heat. To apply heat at different rates to the ink image carried by the transfer surface, independently of the architecture of a particular printing system, additional external heaters or energy sources (not shown) may be used to apply energy locally, for example prior to reaching the impression stations to render the ink residue tacky (see 231 in FIG. 3), prior to the image forming station to dry the conditioning agent if necessary and at the ink jetting station to start evaporating the carrier from the ink droplets as soon as possible after they impact the surface of the blanket. Conversely, the printing system may include cooling stations to locally remove excess heat.

The external heaters may be, for example, hot gas or air blowers 306 (as represented schematically in FIG. 1) or radiant heaters focusing, for example, infrared radiation onto the surface of the blanket, which may attain temperatures in excess of 50° C., 75° C., 100° C., 125° C., 150° C., 175° C., 190° C., 200° C., 210° C., or even 220° C.

After evaporating the aqueous carrier, including any liquid humectant, from the ink image, a dry or substantially dry residue film including resin and colorant is obtained. The dried residue film left behind may have an average single drop ink film thickness below 1,500 nm (nm), below 1,200 nm, below 1,000 nm, below 800 nm, below 600 nm, below 500 nm, below 400 nm, or below 300 nm.

For multiple drop ink films, the average thickness may be below 2,500 nm, below 2,000 nm, below 1,600 nm, below 1,400 nm, below 1,200 nm, below 1,000 nm, below 800 nm, or below 600 nm.

As explained above, temperature control is of paramount importance to the printing system if printed images of high quality are to be achieved. This is considerably simplified in the embodiment of FIG. 3 in that the thermal capacity of the belt is much lower than that of the blanket 102 in the embodiments of FIGS. 1 and 2. The exemplary printing system schematically illustrated in FIG. 3 has an endless belt 210 that cycles through an image forming station 212, a drying station 214, and an impression station 216, each of these stations acting as previously described. For instance, the image forming station 212 of FIG. 3 is similar to the previously described image forming system 300, illustrated for example in FIG. 1. Following each print bar 222 in the image forming station, an intermediate drying system 224 is provided to blow hot gas (usually air) onto the surface of the belt 210 to dry the ink droplets partially. This hot gas flow assists in preventing blockage of the inkjet nozzles and also prevents the droplets of different color inks on the belt 210 from merging into one another. In the drying station 214, the ink droplets on the belt 210 are exposed to radiation and/or hot gas in order to dry the ink more thoroughly, driving off most, if not all, of the liquid carrier and leaving behind only a layer of resin and coloring agent which is heated to the point of being rendered tacky.

In the impression station 216, the belt 210 passes between an impression cylinder 220 and a pressure cylinder 218 that carries a compressible blanket 219. The length of the blanket 219 is equal to or greater than the maximum length of a sheet 226 of substrate on which printing is to take place. The impression cylinder 220 has twice the diameter of the pressure cylinder 218 and can support two sheets 226 of substrate at the same time. Sheets 226 of substrate are carried by a suitable transport mechanism (not shown in FIG. 3) from a supply stack 228 and passed through the nip between the impression cylinder 220 and the pressure cylinder 218. Within the nip, the surface of the belt 220 carrying the ink image is pressed firmly by the blanket 219 of the pressure cylinder 218 against the substrate so that the ink image is impressed onto the substrate and separated neatly from the surface of the belt. The substrate is then transported to an output stack 230.

In some printing systems, a heater 231 may be provided shortly prior to the nip between the two cylinders 218 and 220 of the image impression station to assist in rendering the ink film tacky, so as to facilitate transfer to the substrate.

In order for the ink to separate neatly from the surface of the belt 210 it is necessary for the latter surface to have a hydrophobic release layer. In the embodiment of FIG. 1, this hydrophobic release layer is formed as part of a thick blanket that also includes a compressible conformability layer which is necessary to ensure proper contact between the release layer and the substrate at the impression station. The resulting blanket is a very heavy and costly item that needs to be replaced in the event a failure of any of the many functions that it fulfills.

In the embodiment of FIG. 3, the hydrophobic release layer forms part of a separate element from the thick blanket 219 that is needed to press it against the substrate sheets 226. In FIG. 3, the release layer is formed on the flexible thin inextensible belt 210 that is preferably fiber reinforced for increased tensile strength in its lengthwise dimension.

It will be appreciated that the description of a printing system as illustrated in FIG. 3 has been provided with a level of detail sufficient for those of ordinary skill in the art, to understand and carry out the present invention.

It has also been proposed above in relation to the embodiment using a thick blanket 102 to include additional layers affecting the thermal capacity of the blanket in view of the blanket being heated from beneath. The separation of the belt 210 from the blanket 219 in the embodiment of FIG. 3 allows the temperature of the ink droplets to be dried and heated to the softening temperature of the resin using much less energy in the drying section 214. Furthermore, the belt may cool down before it returns to the image forming station which reduces or avoids problems caused by trying to spray ink droplets on a hot surface running very close to the inkjet nozzles. Alternatively and additionally, a cooling station may be added to the printing system to reduce the temperature of the belt to a desired value before the belt enters the image forming station. Cooling may be effected by passing the belt 210 over a roller of which the lower half is immersed in a coolant, which may be water or a cleaning/treatment solution, by spraying a coolant onto the belt of by passing the belt 210 over a coolant fountain.

For illustration, a conventional hydrophobic surface, such as a silicone coated surface, will yield electrons readily and is regarded as negatively charged. Polymeric resins in an aqueous carrier are likewise generally negatively charged. Therefore, in the absence of additional steps being taken the net intermolecular forces will cause the intermediate transfer member to repel the ink and the droplets will tend to bead into spherical globules.

In the novel printing process suitable for the preparation of ink film constructions according to the invention, the chemical composition of the surface of the intermediate transfer member is modified to provide a positive charge. This may be achieved, for example, by including in the surface of the intermediate transfer member (e.g., embedded in the release layer) molecules having one or more Brønsted base functional groups and in particular nitrogen including molecules. Suitable positively charged or chargeable groups include primary amines, secondary amines, and tertiary amines. Such groups can be covalently bound to polymeric backbones and, for example, the outer surface of the intermediate transfer member may include amino silicones.

Such positively chargeable functional groups of the molecules of the release layer may interact with Brønsted acid functional groups of molecules of the ink. Suitable negatively charged or chargeable groups include carboxylated acids such as having carboxylic acid groups (—COOH), acrylic acid groups (—CH$_2$=CH—COOH), methacrylic acid groups (—CH$_2$=C(CH$_3$)—COOH) and sulfonates such as having sulfonic acid groups (—SO$_3$H). Such groups can be covalently bound to polymeric backbones and preferably be water soluble or dispersible. Suitable ink molecules may for example include acrylic-based resins such as an acrylic polymer and an acrylic-styrene copolymer having carboxylic acid functional groups.

Inks

Inks in accordance with embodiments of the presently claimed invention, which are suitable for use in the process and in conjunction with the systems described herein are, for example, aqueous inkjet inks that contain (i) a solvent including water and optionally a co-solvent, (ii) a negatively chargeable polymeric resin (the ink may include a small amount of a pH-raising substance to ensure that the polymer is negatively charged), and (iii) at least one colorant.

Prior to jetting, the ink typically has (i) a viscosity of 2 to 25 centiPoise (cP) at at least one temperature in the range of 20-60° C.; and (ii) a surface tension of not more than 50 milliNewton/m at at least one temperature in the range of 20-60° C. The colorant may contain a pigment, preferably a nanopigment, for example having an average particle size ($d_{50}$) of not more than 120 nm.

In some embodiments, the polymeric resin includes primarily or exclusively one or more negatively chargeable polymers, such as polyanionic polymers. By a "negatively chargeable polymer" or "negatively chargeable polymer resin" is meant a polymer or polymeric resin which has at least one proton which can easily be removed to yield a negative charge; as used herein, the term refers to an inherent property of the polymer, and thus may encompass polymers which are in an environment in which such protons are removed, as well as polymers in an environment in which such protons are not removed.

In contrast, the term "a negatively charged polymer resin" refers to a resin in an environment in which one or more such protons have been removed.

Examples of negatively chargeable groups are carboxylic acid groups (—COOH), including acrylic acid groups (—CH$_2$=CH—COOH) and methacrylic acid groups (—CH$_2$=C(CH$_3$)—COOH), and sulfonic acid groups (—SO$_3$H). Such groups can be covalently bound to polymeric backbones; for example styrene-acrylic copolymer resins have carboxylic acid functional groups which readily lose protons to yield negatively-charged moieties. Many polymers suitable for use in embodiments of the invention, when dissolved in water, will be negatively charged; others may require the presence of a pH raising compound to be negatively charged. Commonly, polymers will have many such negatively chargeable groups on a single polymer molecule, and thus are referred to as polyanionic polymers.

Examples of polyanionic polymers include, for instance, polysulfonates such as polyvinylsulfonates, poly(styrenesulfonates) such as poly(sodium styrenesulfonate) (PSS), sulfonated poly(tetrafluoroethylene), polysulfates such as polyvinylsulfates, polycarboxylates such as acrylic acid polymers and salts thereof (e.g., ammonium, potassium, sodium, etc.), for instance, those available from BASF and DSM Resins, methacrylic acid polymers and salts thereof (e.g., EUDRAGIT®, a methacrylic acid and ethyl acrylate copolymer), carboxymethylcellulose, carboxymethylamylose and carboxylic acid derivatives of various other polymers, polyanionic peptides and proteins such as homopolymers and copolymers of acidic amino acids such as glutamic acid, aspartic acid or combinations thereof, homopolymers and copolymers of uronic acids such as mannuronic acid, galacturonic acid and guluronic acid, and their salts, alginic acid and its salts, hyaluronic acid and its salts, gelatin, carrageenan, polyphosphates such as phosphoric acid derivatives of various polymers, polyphosphonates such as polyvinylphosphonates, as well as copolymers, salts, derivatives, and combinations of the preceding, among various others. In some embodiments, the polymeric resin includes an acrylic-based polymer, viz. a polymer or copolymer made from acrylic acid or an acrylic acid derivative (e.g., methacrylic acid or an acrylic acid ester), such as polyacrylic acid or an acrylic acid-styrene copolymer. Nominally, the polymeric resin may be, or include, an acrylic styrene co-polymer. In some embodiments the polymeric resin includes primarily or exclusively an acrylic-based polymer selected from an acrylic polymer and an acrylic-styrene copolymer. In some instances, the polymeric resin is at least partly water soluble; in some instances, the polymeric resin is water dispersible, and may be provided as an emulsion or a colloid.

Numerous organic polymeric resins exist and many recognized to serve for the preparation of ink compositions are commercially available and known to persons skilled in this industry. Generally such polymers, whether well established ink resins or less typical to this field, serve to entrap (e.g., encapsulate) or otherwise immobilize or associate with the coloring agent of relevance through physical, covalent or ionic interactions, ultimately also enabling the ink image to attach to the printed substrate. Such polymeric resins are therefore often referred to as binders. Some polymers may alternatively or additionally serve as dispersants, maintaining the ink formulations in desired suspension or emulsion form. Though the exact function of an organic polymeric resin may vary in the context of a specific formulation or may include more than one function, it is used herein to refer to the predominant binder function which typically account for most of such polymers presence in a final ink composition.

Water dispersible thermoplastic resins include, but are not limited to linear and branched acrylic polymers, acrylic styrene copolymers, styrene polymers, polyesters, co-polyesters, polyethers, polyamides or polyester amides, polyurethanes and polyamines Such polymers are typically supplied with basic data on their average molecular weight (MW), their glass transition ($T_g$) or softening temperature, their minimal film forming temperature (MFFT), their hardness, their ability to contribute to the gloss of the final printed inks, or to their adherence to the printed substrate, or to their resistance to abrasion. Some polymers may be defined by their reactivity or by the density of their functional groups, the acid number or the hydroxyl number being but examples of such qualifications.

Ink formulators are familiar with such parameters and will readily appreciate that the selection of a suitable organic polymeric resin may depend on the intended purpose. For instance, binders need not provide high gloss if the printed image is intended to be matte or if the ink image is to be further laminated or coated with a varnish that would independently provide the desired optical effect. Such gloss-related information is generally provided by the supplier, but can be independently measured, for example, by using a gloss meter at a fixed angle of incidence. Using a Micro-gloss (BYK-Gardner, Germany) single-angle gloss meter at 75°, prints displaying a gloss above 65-70 are regarded as glossy, whereas prints having a gloss below 65 are regarded as matte.

Similarly, the presence of a laminate or varnish may reduce the need to select polymers providing good to excellent abrasion resistance. Each supplier may use variations of the standard resistance test ASTM D5264 to assess this property. In absence of coating protection and if the printed product is intended or may be subjected to scrub, then polymers having higher abrasion resistance should be preferred. It can be appreciated that the hardness of the polymer can correlate with its ability to form ink film images that may have the desired resistance to abrasion, if needed. Therefore, for certain purposes, resins having a good to high hardness are preferred.

Such a coating may also improve the adhesion of the ink image to certain substrates. Understandingly, the degree of adherence a polymer would need to have would depend on the intended substrate. Some organic resins provide good adherence to coated or synthetic substrates typically having a relatively low surface roughness. Other resins have superior abilities and can additionally or alternatively adhere to substrates having a higher surface roughness, such as most of the uncoated printing substrates. The resins may also be selected to suit cellulose-based, cellulose-free, plastic-based or metal-based printing substrates, as commonly used in the field of commercial printing. Advantageously, though not necessarily, a suitable organic polymeric resin shall be appropriate for a broad range of possible substrates. This capability to adhere to the substrate of choice, if not provided by the resin manufacturer, can be readily assessed using a tape adherence test on the intended printing substrate.

The acid number, also termed the acid value or neutralization number, relates to the mass of potassium hydroxide (KOH) in milligrams that is required to neutralize one gram of a chemical substance. The acid number is usually provided by the manufacturer, but readily measurable as per its definition. Resins having a high acid number are expected to yield ink films less stable when exposed to water (water fastness) and should therefore be avoided when the intended use of the printed matter may expose it to conditions that would be deleterious to films comprising such resins. Resins suitable for the present invention generally have an acid number below 220, below 180, below 150, below 120, below 100, or below 90. In some embodiments, the organic polymeric resins have an acid number between 20 and 220, between 60 and 100, and in particular, between 70 and 90.

In some embodiments, and in particular, for various embodiments employing a polyester or polyester-based resin, the acid number may be below 15, below 12, below 10, below 7, below 5, or below 2.5. Such polymeric resins may have an acid number between 0 and 15, between 0 and 10, and in particular, between 0 and 5 or between 1 and 5.

The polymer resins, such as acrylic-based polymers, may be negatively charged at alkaline pH. Consequently, in some embodiments, the polymeric resin has a negative charge at a pH above 7.5, above 8 or above 9. Furthermore, the solubility or the dispersability of the polymeric resin in water may be affected by pH. Thus, in some embodiments, the formulation comprises a pH-raising compound. Examples of such are diethyl amine, monoethanol amine, and 2-amino-2-methyl propanol. Such pH-raising compounds, when included in the ink, are generally included in small amounts, e.g., about 1 wt. % of the formulation and usually not more than about 2 wt. % of the formulation.

Some resins are characterized by a hydroxyl number, also termed the hydroxyl value, which is a measure of the content of free hydroxyl groups in a compound, hence typically used in connection with esters. This value, if not provided, can be determined by acetylation of the free hydroxyl groups of the compound of interest and standard titrations and calculations known in the art. As other functional groups, such as primary or secondary amines, may take part in the chemical reactions used to assess this number, they can also be reported as hydroxyl. Hence the hydroxyl number may serve to assess the more general reactivity/functionality of the resin. It is expressed as the mass of potassium hydroxide (KOH) in milligrams equivalent to the hydroxyl content of one gram of the chemical substance, corrected for carboxyl hydroxyl groups by titration of an unacetylated sample of the same material. Some suitable resins, e.g., polyester or polyester-based resins, including co-polyester resins, linear and branched polyester or co-polyester resins, can have a hydroxyl value between 15 and 60, between 25 and 55, or between 35 and 50.

Additionally, a suitable resin would preferably satisfy the thermo-rheological conditions to be described in more detail in the following sections. Again, such rheological patterns can be adapted to the intended purpose. For instance, for use with printing substrates having low surface roughness, the viscosity of the dried ink film at a high temperature may be higher than the viscosity of the dried ink film intended to adhere on a substrate having a higher surface roughness. In other words, the ink composition to be suited for uncoated substrates would require a relatively lower viscosity of the dried film that would allow the image to better follow the contour of the surface topography, hence increasing area of contact for better adherence. Generally stated, for use in the printing process herein described, the selection of the organic polymeric (binder) resin to be included in the ink formulations of the present disclosure may further take into account the temperature at which the ink is jetted at the image forming station, the type of inkjet head (such as continuous ink jet (CIJ) or drop-on-demand (DOD)), the temperature at which it contacts the intermediate transfer member, the temperature at which it is dried upon the transfer member and the temperature at which it is transferred from the transfer member to the intended printing substrate at the impression station.

In some embodiments, suitable organic polymeric resins include acrylic polymers, acrylic styrene copolymers, styrene polymers, polyesters. In additional embodiments, the resins are one or more polymers selected from the group comprising Joncryl® 90, Joncryl® 530, Joncryl® 537E, Joncryl® 538, Joncryl® 631, Joncryl® 1158, Joncryl® 1180, Joncryl® 1680E, Joncryl® 1908, Joncryl® 1925, Joncryl® 2038, Joncryl® 2157, Joncryl® Eco 2189, Joncryl® LMV 7051, Joncryl® 8055, Joncryl® 8060, Joncryl® 8064, Joncryl® 8067, all acrylic-based polymers available from BASF; Dynacoll® 7150, Desmophen® XP2607 and Hoopol® F-37070, all polyester-based polymers respectively available from Evonik, Bayer and Synthesia International, and any other commercially available chemical equivalents thereof. For convenience, the data concerning these materials as provided by their respective suppliers is reproduced below. The dispersant Joncryl HPD 296 is included for comparative purposes.

| Material | MW | $T_g$ | MFFT | Acid No. | OH No. |
|---|---|---|---|---|---|
| Joncryl ® 90 | >200,000 | 110° C. | >85° C. | 76 | |
| Joncryl ® 530 | | 75° C. | 95° C. | 50 | |
| Joncryl ® 537E | >200,000 | 50° C. | 43° C. | 52 | |
| Joncryl ® 538 | >200,000 | 64° C. | 60° C. | 70 | |
| Joncryl ® 631 | >200,000 | 107° C. | >85° C. | 70 | |
| Joncryl ® 1158 | | 103° C. | | | |
| Joncryl ® 1180 | >200,000 | 107° C. | >85° C. | | |
| Joncryl ® 1680 E | >200,000 | 56° C. | 49° C. | 28 | |
| Joncryl ® 1908 | | 98° C. | >70° C. | 55 | |
| Joncryl ® 1925 | | 75° C. | >70° C. | 50 | |
| Joncryl ® 2038 | >200,000 | >85° C. | >85° C. | 76 | |
| Joncryl ® 2157 | >200,000 | 105° C. | >85° C. | 36 | |
| Joncryl ® Eco 2189 | >200,000 | 98° C. | >85° C. | 65 | |
| Joncryl ® LMV 7051 | >200,000 | 98° C. | 56° C. | 115 | |
| Joncryl ® 8055 | >200,000 | 110° C. | >85° C. | | |
| Joncryl ® 8060 | >200,000 | 110° C. | 84° C. | 150 | |
| Joncryl ® 8064 | >200,000 | 97° C. | 58° C. | 158 | |
| Joncryl ® 8067 | >200,000 | 110° C. | >90° C. | 78 | |
| Joncryl ® HPD 296 | 11,500 | 15° C. | | 141 | |
| Dynacoll ® 7150 | 2600 | 50° C. | | <2 | 38-46 |
| Desmophen ® XP2607 | 2670 | ~50° C. | | <2 | 42 |
| Hoopol ® F-37070 | 2650 | 51° C. | | <2 | 38-46 |

The molecular weight of the resin need not be limited. In some embodiments, the resin has an average molecular weight of at least 1,200, at least 1,500, at least 2,000, or at least 5,000, at least 25,000, at least 50,000, at least 100,000, at least 150,000, or at least 200,000. In some embodiments, suitable organic polymeric resins, and particularly polyester or polyester-based resins, including co-polyester resins, linear and branched polyester or co-polyester resins, may have an average molecular weight of at most 12,000, at most 10,000, at most 8,000, at most 6,000, at most 5,000, at most 4,000, at most 3,500, or at most 3,000.

EXAMPLES

The following examples illustrate inkjet ink formulations according to the teachings of the present disclosure.

Materials and chemicals were purchased from various manufacturers, including:

| Air Products | Air Products and Chemicals Inc., USA |
|---|---|
| BASF | BASF Schweiz AG, Basel, Switzerland |
| BYK | BYK-Chemie GmbH, Wesel, Germany |
| Cabot | Cabot Corporation, Billerica MA, USA |
| Clariant | Clariant International Ltd, Muttenz, Switzerland |
| Dupont | DuPont de Nemours, France |
| Dow | Dow Chemical Company, Midland MI, USA |
| Evonik | Evonik Industries AG, Essen, Germany |
| Huntsman | Huntsman, TX, USA |
| Sigma-Aldrich | Sigma-Aldrich Corporation, St. Louis MO, USA |
| SKC | SKC, Seoul, Korea. |

Though the below formulations were prepared using materials supplied under the indicated trademarks of their respective manufacturer, such ingredients can be replaced by other commercially available compounds having similar chemical formulas.

For brevity, the below formulations are presented using Carbon Black as pigment to serve for black (K) color inks. Some of the below formulations were prepared with cyan pigments (e.g., PV Fast Blue BG), magenta pigments (e.g., Cromophtal® Jet Magenta DMQ) or yellow pigments (e.g., Hansa Brilliant Yellow 5GX03) at the same concentrations as indicated for the black pigment, to yield respectively cyan (C), magenta (M) and yellow (Y) inks. Results obtained with black inks will be referred to by their appropriate example number. If such results are displayed or discussed with reference to colors other than black, the one letter code of the specific color is indicated. For instance, 'Ex. 4 C' will correspond to the Cyan version of the formulation disclosed in Example 4 Similarly, some of the below formulations were prepared with dyes instead of pigments. Tested dyes in conjunction with the inventive ink formulations included Basonyl® Red 485 and Basonyl® Blue 636. Alternative coloring agents (whether pigments or dyes) that may be suitable for such formulations are readily known to persons skilled in the art of formulating printing inks.

Polymeric binder resins are commercially available in many forms, including various solid forms, such as amorphous or crystalline structures. The resins may be available as free-flowing powders, and pellets. The resins may be available in liquid form, as emulsions or dispersions, typically blended with suitable additives. Additionally, each such commercially available resins may have a particular, characteristic particle size distribution.

As known, the viscosity of a composition can be affected by the type of ingredients it contains, their respective inherent rheological properties and their concentration. As appreciated by persons skilled in the art of ink formulation, the particle size may also affect the viscosity, to some degree, since the same amount of a material having a lower particle size, provides a higher surface area available for interactions capable of modifying some of its original physico-chemical properties. The particle size is, however, but one parameter, and need therefore not be limited.

In some embodiments, the resins have an average particle size $d_{50}$ of 3 micrometer (μm) or less, or of less than 1 μm, or of less than 0.5 μm, or of less than 400 nm, or of less than 300 nm, or of less than 200 nm, or of less than 100 nm.

A general procedure for preparing inks in accordance with embodiments of the invention for resins available in liquid form is as follows: first, a pigment or dye concentrate is prepared by mixing distilled water, at least a portion (typically about 20%) of the polymeric resin or dispersant, if used, and colorant, and milling by procedure known in the art using any appropriate apparatus until a suitable particle size is reached. If a dispersant was used in this step, it was typically at a 1:1 ratio with the colorant. Alternatively, commercially available nano-pigments (e.g., having a $d_{50}$ below 1 μm) or sub-micron to low micronic range resins (e.g., having a $d_{50}$ below 5 μm) may be readily used in the preparation of the ink formulations of the present disclosure. If a pH-raising compound is used it may be included in this step. The milling process was monitored on the basis of particle size measurements using a dynamic light scattering particle size analyzer (e.g., ZETASIZER™ Nano-S, ZEN1600 of Malvern Instruments, England), using standard practice. Unless otherwise stated, the process was stopped when the average particle size ($d_{50}$) reached about 70 nm.

The remaining materials were then added to the pigment concentrate and mixed. After mixing, the ink was filtered through a 0.5 μm filter. The viscosity of the inks thus obtained was measured at 25° C. using viscometer (DV II+Pro by Brookfield) and was typically in the range of about 2 cP to 25 cP. The surface tension was measured using a standard liquid tensiometer (EasyDyne by Krüss) and was generally in the range of approximately 20 to 30 mN/m. The resulting pH was usually in the range of 6.5 to 10.5 range, and more typically, in the range of 7.0 to 9.0.

In other embodiments, when the polymeric resin is available in solid form, an alternative procedure can be used. Typically, the resin is thoroughly milled with a dispersant, before being admixed with the coloring agent and any other ingredient of the ink formulation. For the preparation of some formulations herein-disclosed, a slurry consisting of 37.5 g Dynacoll® 7150 (Evonik, flakes), 93.75 g Dispex Ultra PX 4575 (BASF, also known as EFKA® 4575), and 131.25 ml of distilled water was milled at 5° C. for 48 hours in a ball mill (Atrittor 0S, Union Process, USA), having a ceramic inner surface and 0.8 mm Zirconia beads. The ground slurry was then mixed at desired ratio with a concentrate of coloring agent (e.g., a black pigment dispersed in a standard milling apparatus with a dispersant). In the present examples, the pigment was dispersed with the same Dispex Ultra PX 4575 so that the final ratio of resin to dispersant was 1:0.35. As desired, a softening agent was added to the resin—pigment mix, and water was added if needed to achieve the final formulation. The fully formulated ink was then mixed and filtered through a 0.5 μm filter. Viscosity, surface tension and pH were measured as mentioned hereinabove.

A partial list of the ink formulations prepared by these exemplary methods is presented below, the content of each ingredient being indicated in weight percent (wt. %) of the stock material, whether a liquid or solid chemical or a diluted solution, dispersion or emulsion comprising the material of interest, the weight percent being relative to the total weight of the final formulation. Concentrated versions having a solid content of at least 45% (see Example 42) and of about 80% are also provided (see Examples 40 and 41). Persons skilled in the art to which this invention pertains will readily appreciate that other methods of preparation may be equally suitable.

Example 1

| Type of Material | Name | Wt. % |
| --- | --- | --- |
| Pigment | Carbon Black, Monarch ® 700 | 2.0 |
| Resin | Joncryl ® 1680E, 43.5% emulsion in water | 18.4 |
| Softening Agent | PEG 8,000 | 8.0 |
| Humectant | Propylene glycol | 30.0 |
| Dispersant | Joncryl ® HPD 296, 35.5% solution in water | 5.6 |
| Wetting Agent | BYK ® 348 | 0.2 |
| Carrier | Water | 35.8 |

Example 2

| Type of Material | Name | Wt. % |
| --- | --- | --- |
| Pigment | Carbon Black, Monarch ® 700 | 1.2 |
| Resin | Joncryl ® 1680E, 43.5% emulsion in water | 11.0 |
| Softening Agent | PEG 8,000 | 9.6 |
| Humectant | Ethylene glycol | 20.0 |
| Dispersant | Joncryl ® HPD 296, 35.5% solution in water | 3.4 |
| Wetting Agent | BYK ® 345 | 0.2 |
| Carrier | Water | 54.6 |

Example 3

| Type of Material | Name | Wt. % |
| --- | --- | --- |
| Pigment | Carbon Black, Monarch ® 700 | 2.0 |
| Resin | Joncryl ® 1680E, 43.5% emulsion in water | 13.8 |
| Softening Agent | PEG 8,000 | 6.0 |
| Humectant | Ethylene glycol | 30.0 |
| Dispersant | Joncryl ® HPD 296, 35.5% solution in water | 5.6 |
| Wetting Agent | BYK ® 345 | 0.2 |
| Carrier | Water | 42.4 |

Example 4

| Type of Material | Name | Wt. % |
| --- | --- | --- |
| Pigment | Carbon Black, Monarch ® 700 | 1.3 |
| Resin | Joncryl ® 1680E, 43.5% emulsion in water | 9.0 |
| Softening Agent | PEG 8,000 | 7.8 |
| Humectant | Propylene glycol | 20.0 |

| Type of Material | Name | Wt. % |
|---|---|---|
| Dispersant | Joncryl ® HPD 296, 35.5% solution in water | 3.7 |
| Wetting Agent | BYK ® 345 | 0.2 |
| Carrier | Water | 58.1 |

Example 5

| Type of Material | Name | Wt. % |
|---|---|---|
| Pigment | Carbon Black, Monarch ® 700 | 1.0 |
| Resin | Joncryl ® 1680E, 43.5% emulsion in water | 9.2 |
| Softening Agent | PEG 20,000 | 4.0 |
| Humectant | Propylene glycol | 30.0 |
| Dispersant | Joncryl ® HPD 296, 35.5% solution in water | 2.8 |
| Wetting Agent | BYK ® 348 | 0.2 |
| Carrier | Water | 52.8 |

Example 6

| Type of Material | Name | Wt. % |
|---|---|---|
| Pigment | Carbon Black, Monarch ® 700 | 1.8 |
| Resin | Joncryl ® 1680E, 43.5% emulsion in water | 12.4 |
| Softening Agent | PEG 20,000 | 5.4 |
| Humectant | Ethylene glycol | 20.0 |
| Dispersant | Joncryl ® HPD 296, 35.5% solution in water | 5.1 |
| Wetting Agent | BYK ® 345 | 0.2 |
| Carrier | Water | 55.1 |

Example 7

| Type of Material | Name | Wt. % |
|---|---|---|
| Pigment | Carbon Black, Monarch ® 700 | 0.8 |
| Resin | Joncryl ® 1680E, 43.5% emulsion in water | 18.4 |
| Softening Agent | PEG 20,000 | 8.0 |
| Humectant | Ethylene glycol | 15.0 |
| Dispersant | Joncryl ® HPD 296, 35.5% solution in water | 2.3 |
| Wetting Agent | BYK ® 345 | 0.2 |
| Carrier | Water | 55.4 |

Example 8

| Type of Material | Name | Wt. % |
|---|---|---|
| Pigment | Carbon Black, Monarch ® 700 | 0.7 |
| Resin | Joncryl ® 2038, 43.5% emulsion in water | 6.4 |
| Softening Agent | PEG 8,000 | 5.6 |
| Humectant | Propylene glycol | 25.0 |
| Dispersant | Joncryl ® HPD 296, 35.5% solution in water | 2.0 |
| Wetting Agent | BYK 345 | 0.2 |
| Carrier | Water | 60.1 |

Example 9

| Type of Material | Name | Wt. % |
|---|---|---|
| Pigment | Carbon Black, Monarch ® 700 | 2.0 |
| Resin | Joncryl ® 2038, 43.5% emulsion in water | 18.4 |
| Softening Agent | Tween ® 60 | 8.0 |
| Humectant | Propylene glycol | 22.0 |
| Dispersant | Joncryl ® HPD 296, 35.5% solution in water | 5.6 |
| Wetting Agent | Capstone ® FS-65 | 0.01 |
| Carrier | Water | 43.97 |

Example 10

| Type of Material | Name | Wt. % |
|---|---|---|
| Pigment | Carbon Black, Monarch ® 700 | 0.9 |
| Resin | Joncryl 2038, 43.5% emulsion in water | 8.3 |
| Softening Agent | Tween ® 60 | 7.2 |
| Humectant | Propylene glycol | 17.0 |
| Dispersant | Joncryl ® HPD 296, 35.5% solution in water | 2.5 |
| Wetting Agent | BYK ® 345 | 0.2 |
| Carrier | Water | 63.9 |

Example 11

| Type of Material | Name | Wt. % |
|---|---|---|
| Pigment | Carbon Black, Monarch ® 700 | 2.4 |
| Resin | Joncryl ® 8064, 43.5% emulsion in water | 22.1 |
| Softening Agent | Span ® 20 | 2.4 |
| Humectant | Propylene glycol | 15.0 |
| Dispersant | Joncryl ® HPD 296, 35.5% solution in water | 6.8 |
| Wetting Agent | BYK ® 345 | 0.2 |
| Carrier | Water | 51.2 |

Example 12

| Type of Material | Name | Wt. % |
| --- | --- | --- |
| Pigment | Carbon Black, Monarch ® 700 | 1.5 |
| Resin | Joncryl ® 8064, 43.5% emulsion in water | 13.8 |
| Softening Agent | Span ® 20 | 3.0 |
| Humectant | Ethylene glycol | 15.0 |
| Dispersant | Joncryl ® HPD 296, 35.5% solution in water | 4.2 |
| Wetting Agent | BYK ® 345 | 0.2 |
| Carrier | Water | 62.3 |

Example 13

| Type of Material | Name | Wt. % |
| --- | --- | --- |
| Pigment | Carbon Black, Monarch ® 700 | 2.0 |
| Resin | Joncryl ® 8064, 43.5% emulsion in water | 18.4 |
| Softening Agent | PEG 8,000 | 8.0 |
| Humectant | Propylene glycol | 25.0 |
| Dispersant | Joncryl ® HPD 296, 35.5% solution in water | 5.6 |
| Wetting Agent | BYK ® 348 | 0.2 |
| Carrier | Water | 40.8 |

Example 14

| Type of Material | Name | Wt. % |
| --- | --- | --- |
| Pigment | Carbon Black, Monarch ® 700 | 1.0 |
| Resin | Joncryl ® 8064, 43.5% emulsion in water | 9.2 |
| Softening Agent | PEG 8,000 | 8.0 |
| Humectant | Ethylene glycol | 25.0 |
| Dispersant | Joncryl ® HPD 296, 35.5% solution in water | 2.8 |
| Wetting Agent | BYK ® 345 | 0.2 |
| Carrier | Water | 53.8 |

Example 15

| Type of Material | Name | Wt. % |
| --- | --- | --- |
| Pigment | Carbon Black, Monarch ® 700 | 0.8 |
| Resin | Joncryl ® 1680E, 43.5% emulsion in water | 18.4 |
| Softening Agent | PEG 8,000 | 16.0 |
| Humectant | Ethylene glycol | 5.0 |
| Dispersant | Joncryl ® HPD 296, 35.5% solution in water | 2.3 |
| Wetting Agent | BYK ® 345 | 0.2 |
| Carrier | Water | 57.4 |

Example 16

| Type of Material | Name | Wt. % |
| --- | --- | --- |
| Pigment | Carbon Black, Monarch ® 700 | 2.0 |
| Resin | Joncryl ® 8060, 45% emulsion in water | 17.8 |
| Softening Agent | PEG 8,000 | 8.0 |
| Humectant | Propylene glycol | 25.0 |
| Dispersant | Joncryl ® HPD 296, 35.5% solution in water | 5.6 |
| Wetting Agent | BYK ® 348 | 0.2 |
| Carrier | Water | 41.4 |

Example 17

| Type of Material | Name | Wt. % |
| --- | --- | --- |
| Pigment | Carbon Black, Monarch ® 700 | 1.0 |
| Resin | Joncryl ® 8060, 45% emulsion in water | 8.9 |
| Softening Agent | PEG 8,000 | 8.0 |
| Humectant | Ethylene glycol | 25.0 |
| Dispersant | Joncryl ® HPD 296, 35.5% solution in water | 2.8 |
| Wetting Agent | BYK ® 345 | 0.2 |
| Carrier | Water | 54.1 |

Example 18

| Type of Material | Name | Wt. % |
| --- | --- | --- |
| Pigment | Carbon Black, Monarch ® 700 | 1.3 |
| Resin | Joncryl ® 1680E, 43.5% emulsion in water | 29.9 |
| Softening Agent | PEG 8,000 | 13.0 |
| Humectant | Ethylene glycol | 10.0 |
| Dispersant | Joncryl ® HPD 296, 35.5% solution in water | 3.7 |
| Wetting Agent | BYK ® 345 | 0.2 |
| Carrier | Water | 42.0 |

Example 19

| Type of Material | Name | Wt. % |
| --- | --- | --- |
| Pigment | Carbon Black, Monarch ® 700 | 2.0 |
| Resin | Joncryl ® 2038, 43.5% emulsion in water | 18.4 |
| Softening Agent | Span ® 20 | 8.0 |
| Humectant | Propylene glycol | 22.0 |
| Dispersant | Joncryl ® HPD 296, 35.5% solution in water | 5.6 |
| Wetting Agent | Capstone ® FS-65 | 0.01 |
| Carrier | Water | 43.97 |

Example 20

| Type of Material | Name | Wt. % |
|---|---|---|
| Pigment | Carbon Black, Monarch ® 700 | 0.9 |
| Resin | Joncryl ® 2038, 43.5% emulsion in water | 8.3 |
| Softening Agent | Span ® 20 | 7.2 |
| Humectant | Propylene glycol | 17.0 |
| Dispersant | Joncryl ® HPD 296, 35.5% solution in water | 2.5 |
| Wetting Agent | BYK ® 345 | 0.2 |
| Carrier | Water | 63.9 |

Example 21

| Type of Material | Name | Wt. % |
|---|---|---|
| Pigment | Carbon Black, Monarch ® 700 | 1.0 |
| Resin | Joncryl ® 8060, 45% emulsion in water | 8.9 |
| Softening Agent | PEG 8,000 | 10.0 |
| Humectant | Ethylene glycol | 25.0 |
| Dispersant | Joncryl ® HPD 296, 35.5% solution in water | 2.8 |
| Wetting Agent | BYK ® 345 | 0.2 |
| Carrier | Water | 52.1 |

Example 22

| Type of Material | Name | Wt. % |
|---|---|---|
| Pigment | Carbon Black, Monarch ® 700 | 0.9 |
| Resin | Joncryl ® 8060, 45% emulsion in water | 8.0 |
| Softening Agent | PEG 8,000 | 9.9 |
| Humectant | Propylene Glycol | 25.0 |
| Dispersant | Joncryl ® HPD 296, 35.5% solution in water | 2.5 |
| Wetting Agent | BYK ® 348 | 0.2 |
| Carrier | Water | 53.5 |

Example 23

| Type of Material | Name | Wt. % |
|---|---|---|
| Pigment | Carbon Black, Monarch ® 700 | 1.2 |
| Resin | Joncryl ® 8060, 45% emulsion in water | 10.7 |
| Softening Agent | PEG 8,000 | 14.4 |
| Humectant | Propylene Glycol | 25.0 |
| Dispersant | Joncryl ® HPD 296, 35.5% solution in water | 3.4 |
| Wetting Agent | BYK ® 345 | 0.2 |
| Carrier | Water | 45.2 |

Example 24

| Type of Material | Name | Wt. % |
|---|---|---|
| Dye | Basonyl Red 485 (BASF) | 1.2 |
| Resin | Joncryl ® 2038, 43.5% emulsion in water | 11.0 |
| Softening Agent | PEG 8,000 | 9.9 |
| Humectant | Ethylene Glycol | 25.0 |
| Dispersant | Joncryl ® HPD 296, 35.5% solution in water | 3.4 |
| Wetting Agent | BYK ® 345 | 0.2 |
| Carrier | Water | 49.3 |

Example 25

| Type of Material | Name | Wt. % |
|---|---|---|
| Pigment | Carbon Black, Monarch ® 700 | 0.8 |
| Resin | Joncryl ® 1680E, 43.5% emulsion in water | 4.6 |
| Softening Agent | PEG 20,000 | 2.0 |
| Humectant | Ethylene glycol | 15.0 |
| Dispersant | Joncryl ® HPD 296, 35.5% solution in water | 2.3 |
| Wetting Agent | BYK ® 345 | 0.2 |
| Carrier | Water | 75.1 |

Example 26

| Type of Material | Name | Wt. % |
|---|---|---|
| Pigment | Carbon Black, Monarch ® 700 | 1.0 |
| Resin | Joncryl ® 1680E, 43.5% emulsion in water | 11.5 |
| Softening Agent | PEG 20,000 | 5.0 |
| Humectant | Propylene Glycol | 15.0 |
| Dispersant | Joncryl ® HPD 296, 35.5% solution in water | 2.8 |
| Wetting Agent | BYK ® 348 | 0.2 |
| Carrier | Water | 64.5 |

Example 27

| Type of Material | Name | Wt. % |
|---|---|---|
| Pigment | Carbon Black, Monarch ® 700 | 2.0 |
| Resin | Joncryl ® 2038, 43.5% emulsion in water | 18.4 |
| Softening Agent | Tween ® 20 | 8.0 |
| Humectant | Propylene Glycol | 15.0 |
| Dispersant | Joncryl ® HPD 296, 35.5% solution in water | 5.6 |
| Wetting Agent | Capstone ® FS-65 | 0.01 |
| Carrier | Water | 50.97 |

Example 28

| Type of Material | Name | Wt. % |
|---|---|---|
| Pigment | Carbon Black, Monarch ® 700 | 2.0 |
| Resin | Joncryl ® 2038, 43.5% emulsion in water | 18.4 |
| Softening Agent | Tween ® 20 | 16.0 |
| Humectant | Ethylene Glycol | 20.0 |
| Dispersant | Joncryl ® HPD 296, 35.5% solution in water | 5.6 |
| Wetting Agent | BYK ® 345 | 0.5 |
| Carrier | Water | 37.48 |

Example 29

| Type of Material | Name | Wt. % |
|---|---|---|
| Pigment | Carbon Black, Monarch ® 700 | 1.5 |
| Resin | Joncryl ® 2038, 43.5% emulsion in water | 13.8 |
| Softening Agent | Tween ® 40 | 3.0 |
| Humectant | Ethylene Glycol | 15.0 |
| Dispersant | Joncryl ® HPD 296, 35.5% solution in water | 4.2 |
| Wetting Agent | Capstone ® FS-65 | 0.01 |
| Carrier | Water | 62.47 |

Example 30

| Type of Material | Name | Wt. % |
|---|---|---|
| Pigment | Carbon Black, Monarch ® 700 | 0.8 |
| Resin | Joncryl ® 2038, 43.5% emulsion in water | 7.4 |
| Softening Agent | Tween ® 40 | 3.2 |
| Humectant | Propylene Glycol | 18.0 |
| Dispersant | Joncryl ® HPD 296, 35.5% solution in water | 2.3 |
| Wetting Agent | BYK ® 348 | 0.30 |
| Carrier | Water | 68.1 |

Example 31

| Type of Material | Name | Wt. % |
|---|---|---|
| Pigment | Carbon Black, Monarch ® 700 | 0.9 |
| Resin | Joncryl ® 2038, 43.5% emulsion in water | 8.3 |
| Softening Agent | Tween ® 40 | 7.2 |
| Humectant | Propylene Glycol | 15.0 |
| Dispersant | Joncryl ® HPD 296, 35.5% solution in water | 2.5 |
| Wetting Agent | BYK ® 345 | 0.20 |
| Carrier | Water | 65.9 |

Example 32

| Type of Material | Name | Wt. % |
|---|---|---|
| Pigment | Carbon Black, Monarch ® 700 | 0.7 |
| Resin | Joncryl ® 2038, 43.5% emulsion in water | 6.4 |
| Softening Agent | Tween ® 80 | 1.4 |
| Humectant | Ethylene Glycol | 15.0 |
| Dispersant | Joncryl ® HPD 296, 35.5% solution in water | 2.0 |
| Wetting Agent | Capstone ® FS-65 | 0.01 |
| Carrier | Water | 74.48 |

Example 33

| Type of Material | Name | Wt. % |
|---|---|---|
| Pigment | Carbon Black, Monarch ® 700 | 1.2 |
| Resin | Joncryl ® 2038, 43.5% emulsion in water | 11.0 |
| Softening Agent | Tween ® 80 | 9.6 |
| Humectant | Ethylene Glycol | 15.0 |
| Dispersant | Joncryl ® HPD 296, 35.5% solution in water | 3.4 |
| Wetting Agent | BYK ® 345 | 0.20 |
| Carrier | Water | 59.6 |

Example 34

| Type of Material | Name | Wt. % |
|---|---|---|
| Pigment | Carbon Black, Monarch ® 700 | 1.0 |
| Resin | Dynacoll ® 7150 milled with EFKA ® 4575 1:1 (14.38% total solids) | 18.5 |
| Humectant | Ethylene Glycol | 15.0 |
| Dispersant | EFKA ® 4575 | 1.7 |
| Wetting Agent | BYK ® 345 | 0.70 |
| Carrier | Water | 63.0 |

Example 35

| Type of Material | Name | Wt. % |
|---|---|---|
| Pigment | Carbon Black, Monarch ® 700 | 1.1 |
| Resin | Dynacoll ® 7150 milled with EFKA ® 4575 1:1 (14.38% total solids) | 43.7 |
| Softening Agent | Tween ® 20 | 12.6 |
| Humectant | Propylene Glycol | 15.0 |
| Dispersant | EFKA ® 4575 | 1.9 |
| Wetting Agent | BYK ® 348 | 0.70 |
| Carrier | Water | 25.0 |

Example 36

| Type of Material | Name | Wt. % |
|---|---|---|
| Pigment | Carbon Black, Monarch ® 700 | 1.5 |
| Resin | Dynacoll ® 7150 milled with EFKA ® 4575 1:1 (14.38% total solids) | 59.6 |
| Softening Agent | Tween ® 20 | 12.9 |
| Humectant | Propylene Glycol | 15.0 |
| Dispersant | EFKA ® 4575 | 2.6 |
| Wetting Agent | BYK ® 345 | 0.70 |
| Carrier | Water | 7.8 |

Example 37

| Type of Material | Name | Wt. % |
|---|---|---|
| Pigment | Carbon Black, Monarch ® 700 | 1.2 |
| Resin | Dynacoll ® 7150 milled with EFKA ® 4575 1:1 (14.38% total solids) | 47.7 |
| Softening Agent | Tween ® 20 | 6.9 |
| Humectant | Ethylene Glycol | 20.0 |
| Dispersant | EFKA ® 4575 | 2.1 |
| Wetting Agent | BYK ® 348 | 0.50 |
| Carrier | Water | 21.7 |

Example 38

| Type of Material | Name | Wt. % |
|---|---|---|
| Pigment | Carbon Black, Monarch ® 700 | 1.0 |
| Resin | Dynacoll ® 7150 milled with EFKA ® 4575 1:1 (14.38% total solids) | 39.7 |
| Softening Agent | PEG 8,000 | 11.4 |
| Humectant | Propylene Glycol | 15.0 |
| Dispersant | EFKA ® 4575 | 1.7 |
| Wetting Agent | BYK ® 348 | 0.70 |
| Carrier | Water | 30.4 |

Example 39

| Type of Material | Name | Wt. % |
|---|---|---|
| Pigment | Carbon Black, Monarch ® 700 | 1.3 |
| Resin | Dynacoll ® 7150 milled with EFKA ® 4575 1:1 (14.38% total solids) | 51.7 |
| Softening Agent | PEG 8,000 | 7.4 |
| Humectant | Ethylene Glycol | 20.0 |
| Dispersant | EFKA ® 4575 | 2.2 |
| Wetting Agent | BYK ® 348 | 0.50 |
| Carrier | Water | 16.9 |

Example 40

| Type of Material | Name | Wt. % |
|---|---|---|
| Pigment | Heliogen ® Blue D7092 milled with EFKA ® 4575 1:0.6 (30% total solids) | 8.0 |
| Resin | Joncryl ® ECO 2189 (48% nvs) as is | 27.0 |
| Softening Agent | Tween ® 80 | 64.8 |
| Wetting Agent | BYK ® 345 | 0.20 |

Example 41

| Type of Material | Name | Wt. % |
|---|---|---|
| Pigment | Carbon Black, Monarch ® 700 milled with EFKA ® 4575 1:0.6 (30% total solids) | 10.0 |
| Resin | Joncryl ® ECO 2189 (48% nvs) as is | 26.2 |
| Softening Agent | Span ® 20 | 62.8 |
| Wetting Agent | BYK ® 348 | 1.00 |

Example 42

| Type of Material | Name | Wt. % |
|---|---|---|
| Pigment | Heliogen ® Blue D7092 milled with EFKA ® 4575 1:0.6 (30% total solids) | 30.0 |
| Resin | Joncry ®l ECO 2189 (48% nvs) as is | 41.0 |
| Softening Agent | Tween ® 20 | 19.6 |
| Wetting Agent | BYK ® 348 | 1.00 |
| Carrier | Water | 8.40 |

Various commercially available nano-pigments may be used in the inventive ink formulations. These include pigment preparations such as CAB-O-JET® 352K by Cabot, Hostajet Magenta E5B-PT and Hostajet Black O-PT, both by Clariant as well as pigments demanding post-dispersion processes, such as Cromophtal Jet Magenta DMQ and Irgalite Blue GLO, both by BASF.

One of ordinary skill in the art may readily recognize that various known colorants and colorant formulations may be used in the inventive ink or inkjet ink formulations. In one embodiment, such pigments and pigment formulations may include, or consist essentially of, inkjet colorants and inkjet colorant formulations.

Alternatively or additionally, the colorant may be a dye. Examples of dyes suitable for use in the ink formulations of the present invention include: Duasyn Yellow 3GF-SF liquid, Duasyn Acid Yellow XX-SF, Duasyn Red 3B-SF liquid, Duasynjet Cyan FRL-SF liquid (all manufactured by Clariant International Ltd.); Basovit Yellow 133, Fastusol Yellow 30 L, Basacid Red 495, Basacid Red 510 Liquid, Basacid Blue 762 Liquid, Basacid Black X34 Liquid, Basacid Black X38 Liquid, Basacid Black X40 Liquid (all manufactured by BASF).

Various suitable dispersants may be selected by those of skill in the art, including commercially available products.

Such dispersants may include high molecular weight polyurethane or aminourethane (e.g., Disperbyk® 198), a styrene-acrylic copolymer (e.g., Joncryl® HPD 296), a modified polyacrylate polymer (e.g., EFKA® 4560, EFKA® 4580), an acrylic block copolymer made by controlled free radical polymerization (e.g., EFKA® 4585, EFKA® 7702), a sulfosuccinate (e.g., Triton GR, Empimin OT), an acetylenic diol (e.g., Surfynol CT), an ammonium salt of carboxylic acid (e.g., EFKA® 7571), an alkylol ammonium salt of carboxylic acid (e.g., EFKA® 5071), an aliphatic polyether with acidic groups (e.g., EFKA 6230), or an ethoxylated non-ionic fatty alcohol (e.g., Lumiten® N-OC 30).

In some embodiments, it may be desirable to include, in addition to the polymeric resin, colorant, water and optional co-solvent, a small amount of a surfactant, e.g., 0.5-1.5 wt. % of the ink. Such surfactants may serve as wetting agents and/or as leveling agents. In some embodiments, the surfactant is a non-ionic surfactant. Exemplary types of wetting agents and/or leveling agents include silicones, modified organic polysiloxanes and polyether modified siloxanes (e.g., BYK®-307, BYK®-333, BYK®-345, BYK®-346, BYK®-347, BYK®-348, or BYK®-349, from BYK, or Hydropalat WE 3240 from BASF). Fluorosurfactants such as Capstone FS-10, Capstone FS-22, Capstone FS-31, Capstone FS-65 (DuPont), Hydropalat WE 3370, and Hydropalat WE 3500, may also be suitable. Hydrocarbon surfactants such as block copolymers (e.g., Hydropalat WE 3110, WE 3130), sulfosuccinates (e.g., Hydropalat WE 3475), and acetylene diol derivatives (e.g., Hydropalat WE 3240) can be used as wetting and/or leveling agents.

In some embodiments, it may be desirable to include at least one humectant. Examples of humectants that are miscible with water are glycols such as ethylene glycol, diethylene glycol, propylene glycol, dipropylene glycol, oligo or polyethylene glycol, oligo or polypropylene glycol, glycerol, and glycol ethers; nitrogen containing solvents such as N-methyl pyrrolidone and 2-pyrrolidone; and sulfur containing solvents such as dimethyl sulfoxide (DMSO), and mixtures thereof.

Various other, or additional, dispersants, humectants, and wetting and leveling agents, which may be suitable for use in the ink formulations of the present invention, will be apparent to those of ordinary skill in the art.

Thermo-Rheological Properties

The inventive process in which the ink formulations can be used may include the heating of the ink film or image, during transport on the surface of the image transfer member, to evaporate the aqueous carrier from the ink image. The heating may also facilitate the reduction of the ink viscosity to enable the transfer conditions from the ITM to the substrate. The ink image may be heated to a temperature at which the residue film of organic polymeric resin and colorant that remains after evaporation of the aqueous carrier is rendered tacky (e.g., by softening of the resin).

Immediately prior to the transfer to the printing substrate, the residue ink film on the surface of the image transfer member may be dry or substantially dry. The film includes the resin and the colorant from the ink formulation. The residue film may further include small amounts of one or more surfactants or dispersants, which are typically water soluble at the pH of the ink (i.e., prior to jetting).

The ink residue film may be rendered tacky before it reaches the impression cylinder. In this case, the film may cool at the impression station, by its contact with the substrate and exposure to the environment. The already tacky ink film may adhere immediately to the substrate onto which it is impressed under pressure, and the cooling of the film may be sufficient to reduce film adhesion to the image transfer surface to the point that the film peels away neatly from the image transfer member, without compromising adhesion to the substrate.

Tack (or tackiness) may be defined as the property of a material that enables it to bond with a surface on immediate contact under light pressure. Tack performance may be highly related to various viscoelastic properties of the material (polymeric resin, or ink solids). Both the viscous and the elastic properties would appear to be of importance: the viscous properties at least partially characterize the ability of a material to spread over a surface and form intimate contact, while the elastic properties at least partially characterize the bond strength of the material. These and other thermo-rheological properties are rate and temperature dependent.

Some of the significant difficulties associated with low-temperature operation of the Image Forming Station have been described hereinabove. Briefly, though a lower temperature at the image forming station may reduce nozzle clogging resulting from ink carrier evaporation and prolong the lifespan of the blanket subjected then to less stringent operating conditions, lowering the temperature of the blanket section underneath this station to be below the temperature of evaporation of the carrier creates its own problems. While the inks need to retain jettability from the print head nozzles, the deposited droplets need to readily adhere to the outer surface of the ITM at a viscosity that would be lower than the one obtainable with the same formulation at a higher temperature, largely due to the much reduced rate of evaporation. Such ink droplets need to be able to form instantaneously, once on the ITM surface, a skin preventing disturbance of droplet position and shape on the blanket, as long as the ink carrier is not fully evaporated. If the adhesion needs to be facilitated by the treatment of the blanket with a conditioning solution prior to ink jetting and image formation, the type of interaction with the optional conditioning agents may also be affected by temperature.

The resultant ink drops subsequently undergo heating, drying, and transfer to the printing substrate, to produce the residue ink films. These residue films, which are obtained from the ink formulations of the present invention, and may be processed substantially as described herein, may have several salient features, including:

ultra-thin film thickness (typically about 0.5 µm for a single-layer film);
  temperature gradients: temperature variations as a function of position along the Z-axis (thickness direction) of the film;
  substantially or completely dry films, including the interface between the ITM and the film surface proximal thereto; and
  an inventive conditioning layer that may advantageously peel off the ITM to form an integral part of the residue film.

Moreover, the process may require the inventive residue films to have sufficient flowability to readily transfer from the ITM to the printing substrate at low temperatures (e.g., below 140° C., below 120° C., below 100° C. or below 90° C.). The process may also require the inventive residue films to have sufficiently low flowability at lower temperatures (e.g., below 55° C.) such that the residue films "permanently" adhere to the printing substrate at such temperatures, without developing a tendency to adhere to other surfaces.

By suitable selection of the thermo-rheological characteristics of the residue film, the effect of the cooling may be to increase the cohesion of the residue film, whereby its cohesion exceeds its adhesion to the transfer member so that all or substantially all of the residue film is separated from the image transfer member and impressed as a film onto the substrate. In this way, it is possible to ensure that the residue film is impressed on the substrate without significant modification to the area covered by the film nor to its thickness.

The inventors have found that the dried or substantially dried ink residue or ink residue film may advantageously have a first dynamic viscosity within a range of $10^6$ cP to $5 \cdot 10^7$ cP for at least a first temperature within a first range of 60° C. to 87.5° C. The inventors have found that such a first dynamic viscosity may be correlated with efficacious low-temperature transfer of the dried ink film from the ITM to various fibrous (e.g., coated and uncoated papers and cardboards) and non-fibrous (e.g., various types of plastic) substrates, at extremely low transfer pressures.

The inventors have further found that the ink residue film may advantageously have a second dynamic viscosity of at least $7 \cdot 10^7$ cP, for at least a second temperature within a second temperature range of 50° C. to 55° C. At such viscosities and temperatures, the residue films may display sufficient flowability so as to make good contact with the surface of the printing substrate, while the surface tack, upon cooling of the ink film, is sufficiently low to discourage adhesion to other surfaces.

Thermo-Rheological Measurements

Viscosity temperature step sweeps were performed using a Thermo Scientific HAAKE Mars III rheometer having a TM-PE-P Peltier plate temperature module and a P20 Ti L measuring geometry or PP20 disposable (spindle).

Samples of substantially dry ink residue having a 1 mm depth in a 2 cm diameter module were tested. Prior to thermo-rheological evaluation, the samples were dried in an oven at an operating temperature of 100° C. to 110° C., until the weight of the sample remained substantially constant, typically reaching the weight expected on the basis of the non-volatile materials. Typically, the samples were dried overnight (i.e., at least 12, and up to 18 hours) at 10 mbar vacuum (absolute), and were found to be visibly and tactilely dry before being introduced to the rheometer module.

A volume of sample (pellet) was inserted into the 2 cm diameter module and softened by gentle heating (typically at 80° C. for less than one minute) to ensure adequate contact between the surface of the sample and the spindle. The sample volume was then reduced to the desired size by lowering the spindle to reduce the sample volume to the desired depth of 1 mm.

In temperature ramp mode, the sample temperature was allowed to stabilize for 120 seconds at low temperature (typically 45° C. to 55° C., in particular circa 50° C.) before being ramped up to a high temperature (typically 150° C. to 190° C., in particular circa 180° C.).

The measurements were performed under two regimens, termed, respectively, the "long method" and "short method". In the long method, the temperature was set to increase at a rate of approximately 0.08° C. per second up to about 110° C. and at a rate of approximately 0.04° C. per second at higher temperature (above 110° C.). Viscosity measurements were taken at intervals of approximately 10° C., 20 repeat measurements being carried out at each time point. The sample temperature was then allowed to stabilize at high temperature for 120 seconds before being ramped down to low temperature, at the same rates. Oscillation temperature sweeps were performed at a frequency of 1 Hz ($\Omega$=6.2832 rad/sec) under a stress of 1-500 Pa up to 110° C. and at 5 Pa between 110° C. and 180° C.

In the short method, the temperature was set to increase at a rate of approximately 0.11° C. per second up to about 110° C. and at a rate of approximately 0.07° C. per second at higher temperature. In the range of up to about 110° C., viscosity measurements were taken at intervals of approximately 90 seconds, ten repeat measurements being carried out at each time point. The sample temperature was then allowed to increase to the target high temperature during 940 seconds, at which time the viscosity was last measured without ramping down back to lower temperature. The spindle was set to oscillate at a frequency of 1 Hz.

The rheometer used in the present experimental setup provided up to ten repeat measurements for a given temperature and for temperatures of up to 100° C., the rheometer ranked the quality of each of the measurements, allowing trained operators to manually select, if needed, the most representative values in the linear viscous elastic range (typically at least the last three measurements in a series performed at a given temperature). Above 110° C., the samples were generally viscous and generally had a sufficient linear viscous elastic range to permit automatic measurement.

For samples in which repeatability proves to be an issue, the sample "memory" may be reduced or substantially erased by effecting oscillation at 120° C. with 10 Pa shear force (0.5 Hz) frequency for 60 sec, taking 20 points; effecting oscillation between 120° C. and 50° C. under the same conditions, for 600 sec; effecting oscillation at 120° C. with 10 Pa shear force (0.5 Hz) for 60 sec, taking 20 points It will be appreciated by those of skill in the art that a sample material in which adhesion to the spindle and/or stage is insufficient, may display results that do not reflect, or fully reflect, the intrinsic thermo-rheological properties of the sample material. It will be readily appreciated by those of skill in the art that in such a case, the viscosity must be evaluated by other available means that are suitable to the properties of the sample material.

For instance, a melt flow indexer may be used to determine the melt flow index (MFI) of the dried ink formulations. Such apparatus monitors the mass, in grams, flowing per preset period of times (e.g., in ten minutes) through a capillary of a specific diameter and length as a result of pressure being applied via prescribed alternative gravimetric weights for alternative prescribed temperatures. Broadly speaking, the melt flow rate as measured by such method is inversely proportional to the viscosity of the melt at the conditions of the test. Standards exist for such measurements. Such an apparatus may be used to characterize the flowability of a material as a function of several discrete temperatures.

In the specification and in the claims section that follows, values for dynamic viscosity are quantitatively determined by the "short method" described hereinabove.

Various experiments were performed in which the frequency of oscillation was reduced from 1.0 Hz to 0.1 Hz, and/or in which the rate of increase of temperature was raised from about 2° C. per minute, to about 10° C. per minute. Such modifications did not appreciably affect the observed thermo-rheological behavior of the samples.

Thermo-Rheological Results

Figure 4A:
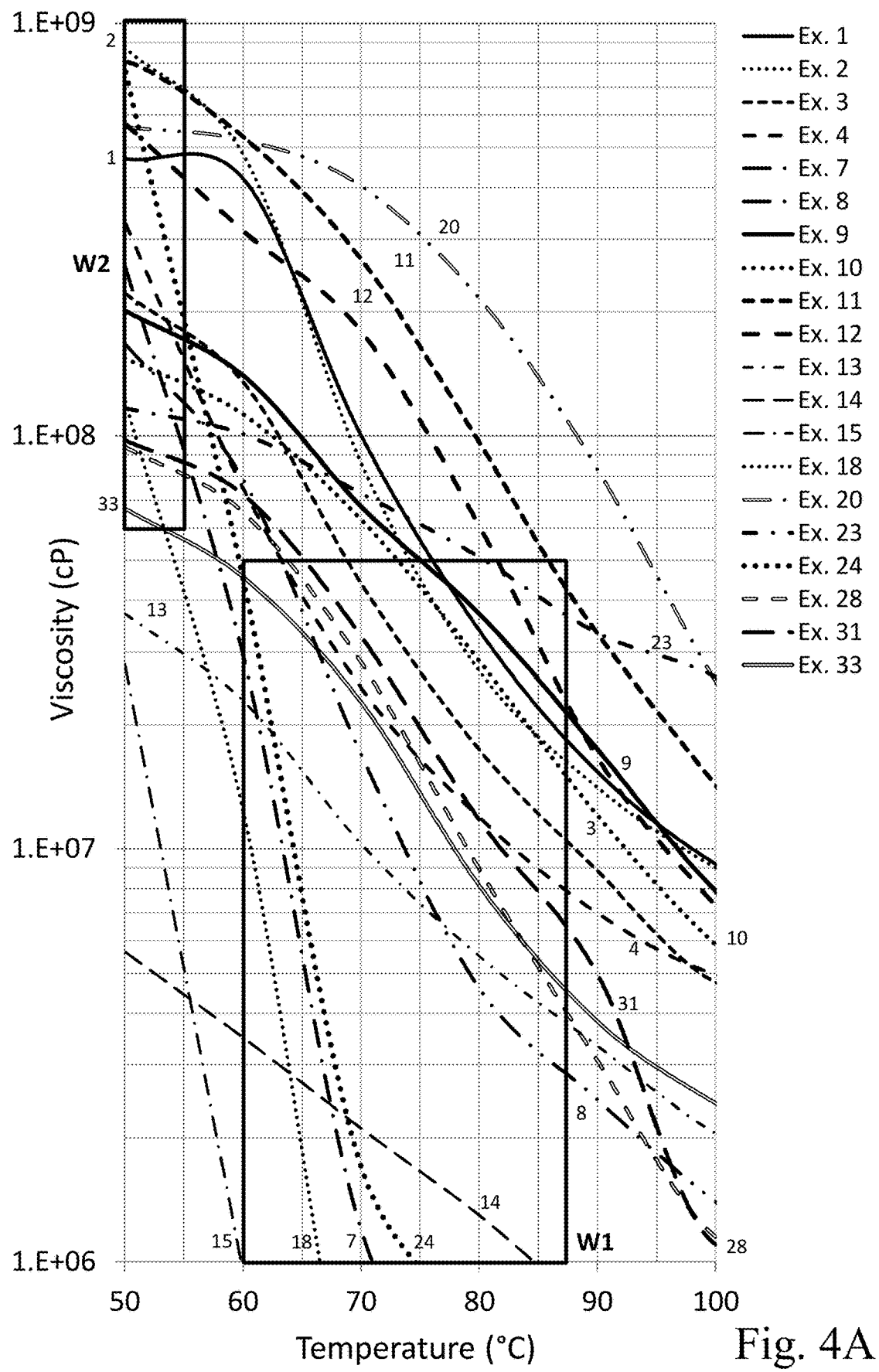
FIG. 4A provides temperature sweep plots of dynamic viscosity as a function of temperature, for dried ink residues of various ink formulations, including ink formulations according to the present invention.

FIG. 4A provides a temperature sweep plot of dynamic viscosity as a function of temperature, for residue films of various ink formulations, including ink formulations of the present invention. The twenty plots provided correspond to dried ink residues of the ink formulations of Example Nos. 1-4, 7-15, 18, 20, 23, 24, 28, 31 and 33, and the viscosity axis spans from $1 \cdot 10^6$ cP to $1 \cdot 10^9$ cP. The dried ink residues were obtained using the drying procedure provided hereinbelow.

As described above, it may be advantageous for the dried ink residues to exhibit a dynamic viscosity of at least $7 \cdot 10^7$ cP, within a temperature range of 50° C. to 55° C. The dried ink residues may advantageously exhibit a dynamic viscosity of at least $8 \cdot 10^7$ cP, at least $9 \cdot 10^7$ cP, at least $1 \cdot 10^8$ cP, or at least $1.5 \cdot 10^8$ cP. At such viscosities and temperatures, the residue films may display good adhesion to the printing substrate, while surface tack is sufficiently low to discourage adhesion to other surfaces.

A first rectangular window (W1), plotted in FIG. 4A, shows suitable viscosities for dried ink residues at 60° C. to about 87.5° C., within the temperature sweep. The inventors have found that residue films exhibiting good transfer properties at low temperature generally display temperature sweep viscosity curves that fall within this window.

A rectangular window (W2), also plotted in FIG. 4A, shows suitable viscosities for dried ink residues at 50° C. to 55° C., within the temperature sweep. Of course, the dried ink residues may advantageously have a viscosity in excess of the upper bound of the plot, i.e., $1 \cdot 10^9$ cP.

In the ink film constructions of the present invention, and in the ink formulations of the present invention, the temperature sweep plot of dynamic viscosity as a function of temperature, for residue films, may fall within both windows (W1, W2).

FIG. 4B provides temperature sweep plots of dynamic viscosity as a function of temperature, for dried ink residues of inventive ink formulations containing various polyester resins. The plots provided correspond to dried ink residues of the ink formulations of Example Nos. 34-39 and the viscosity axis spans from $1 \cdot 10^7$ cP to $1 \cdot 10^8$ cP to magnify the area of interest. The dried ink residues were obtained using the drying procedure provided hereinbelow.

In the ink film constructions of the present invention, and in the ink formulations of the present invention, the temperature sweep plot of dynamic viscosity as a function of temperature, for residue films containing polyester based resins, may fall within both windows (W1, W2), both shown in truncated form in FIG. 4B.

Figure 5:
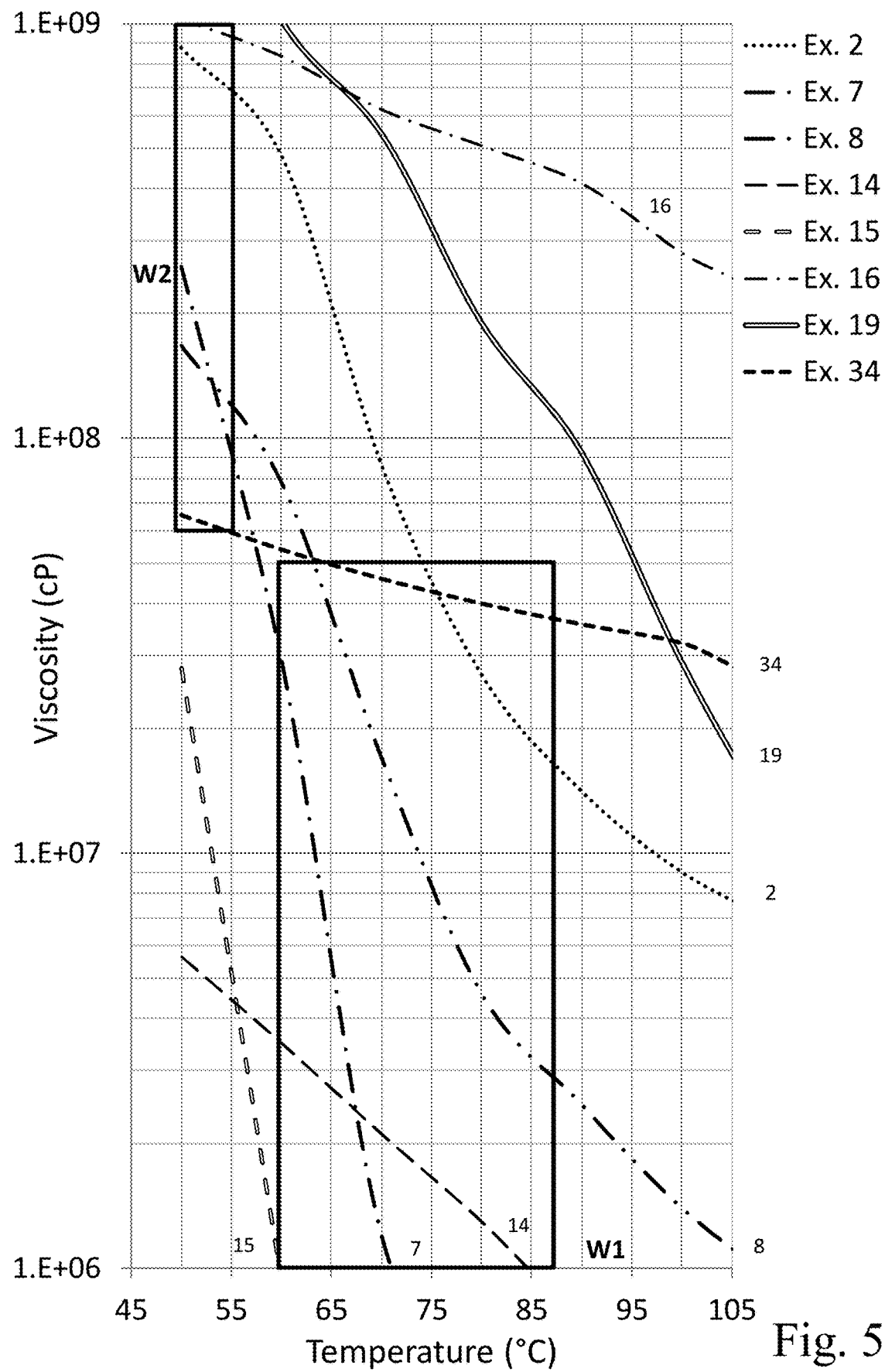
FIG. 5 provides temperature sweep plots of dynamic viscosity as a function of temperature, for representative dried ink dried residues of various ink formulations provided in FIGS. 4A and 4B.

This may be more clearly demonstrated using FIG. 5, which provides temperature sweep plots of dynamic viscosity as a function of temperature, for representative dried ink residues of various ink formulations, some of which were provided in FIGS. 4A and 4B. Near the top left-hand corner of the graph, the temperature sweep of residue #16 (of formulation #16 from Example 16) passes through W2 at a viscosity of approximately $1 \cdot 10^9$ cP. At temperatures above 55° C., the viscosity of residue #16 drops monotonically. However, the slope (or negative slope) is far from sufficient for the thermo-rheological plot of residue #16 to pass through W1 Similarly, the temperature sweep of residue #19 (from Example 19) appears to pass through W2 at a viscosity above $1 \cdot 10^9$ cP. At temperatures above 55° C., the viscosity of residue #19 drops more steeply than the viscosity of residue #16. However, the slope is still insufficient for the thermo-rheological plot of residue #19 to pass through W1. However, both residue #16 and residue #19 pass through W' (not shown) a broadened, enlarged version of W1, in which the window extends to 100° C., 105° C., or 110° C., and upward to $7 \cdot 10^7$ cP, $1 \cdot 10^8$ cP, $2 \cdot 10^8$ cP, or $3 \cdot 10^8$ cP. This area of W' is of interest, and may be utilized by means of the system, process, and ink formulations disclosed herein.

The temperature sweep of residue #2 (from the inventive ink formulation provided in Example 2) passes through W2 at a viscosity of close to $1 \cdot 10^9$ cP, and at temperatures above 55° C., the viscosity drops monotonically. However, in contrast to the thermo-rheological behavior exhibited by the previous examples, the slope is easily sufficient for the thermo-rheological plot of residue #2 to pass through W1.

The temperature sweep of residue #34 (from the inventive ink formulation provided in Example 34) passes through W2 at a viscosity of about $7 \cdot 10^7$ cP, and at temperatures above 55° C., the viscosity drops monotonically. However, the slope is low with respect to residue #2 and residue #19.

With reference now to residue #8 (from the inventive ink formulation provided in Example 8), the temperature sweep passes through W2 at a viscosity approaching $2 \cdot 10^8$ cP. At temperatures above 55° C., the viscosity drops monotonically, the slope being comparable to that of residue #2. The temperature sweep passes through a central area of W2.

Like residue #8, the temperature sweep of residue #7 (from the inventive ink formulation provided in Example 7) passes through W2 at a viscosity of around $2 \cdot 10^8$ cP. At temperatures above 55° C., the viscosity drops sharply, such that the sweep passes through W1 near the bottom, left-hand corner, attaining a viscosity of $1 \cdot 10^6$ cP at around 70° C.

The temperature sweep of residue #15 (from the ink formulation provided in Example 15) has a slope that is similar to that of residue #7, however, the residue has sufficiently-high flowability at low temperatures such that the temperature sweep falls outside the bounds of both W1 and W2.

The temperature sweep of residue #14 (from the ink formulation provided in Example 14) passes through W1, but at lower temperatures of 50° C. to 55° C., fails to develop the requisite viscosity for dry ink residues according to the present invention.

Figure 6:
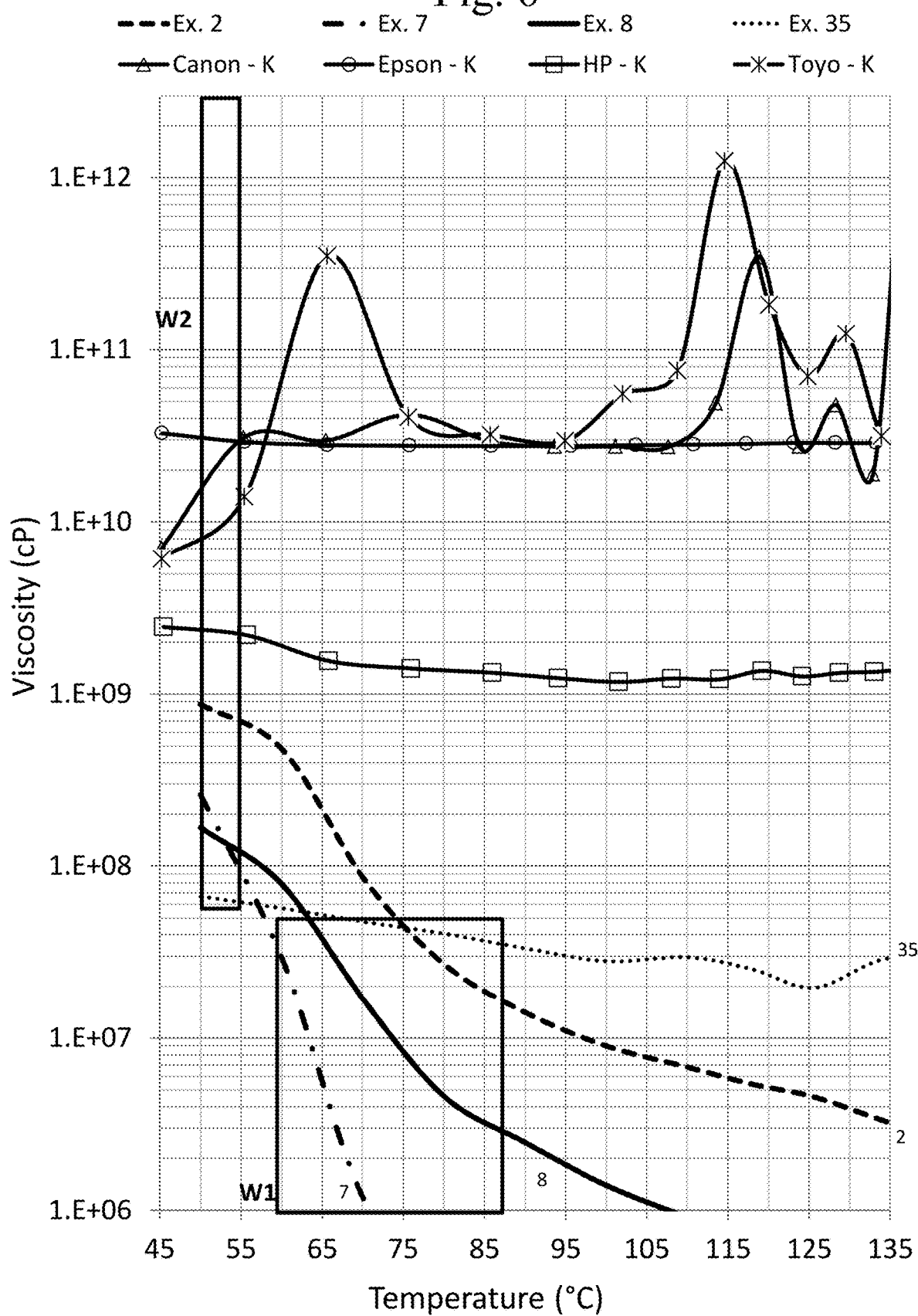
FIG. 6 provides temperature sweep plots of dynamic viscosity as a function of temperature, for representative dried ink residues of ink formulations of the present invention, vs. dried ink residues of several commercially available inkjet inks.

FIG. 6 provides temperature sweep plots of dynamic viscosity as a function of temperature, for representative dried ink residues of ink formulations of the present invention, vs. dried ink residues of several commercially available inkjet inks. The dried ink residues of inventive ink formulations 2, 7 and 8 are those described hereinabove with reference to FIG. 5; residue #35 was obtained by drying the inventive ink formulation provided in Example 35. The commercially available inkjet inks are black inks of Canon, Epson, HP, and Toyo, and are labeled accordingly.

It is evident from the plots, and from the magnitude of the viscosities, that the dried ink residues of the various prior art ink formulations exhibit no or substantially no flow behavior over the entire measured range of temperatures. The peaks observed at extremely high viscosities in some plots of the prior-art formulations would appear to have no physical meaning. Significantly, within the temperature range of 60° C. to 87.5° C., all of the prior art residue films exhibit a minimum viscosity exceeding $1 \cdot 10^{10}$ cP, two and a half orders of magnitude above the top boundary of $5 \cdot 10^7$ cP for W2.

In practice, the inventors of the present invention successfully transferred all of the inventive ink residues to a printing substrate, but failed to transfer any of the prior-art ink films to a printing substrate, even after heating to over 160° C.

The transferability to printing substrates of ink formulations prepared as described in previous examples was assessed as follows: the formulations being tested were applied to the outer surface of a printing blanket of approximately 20 cm×30 cm size on a hot plate pre-heated to a predetermined surface temperature, typically between 70° C. and 130° C., the range between 70° C. and 90° C. being of particular interest. Unless otherwise stated, this surface comprised a silanol-terminated polydimethyl-siloxane silicone (PDMS) release layer. A conditioning solution, generally comprising 0.3 wt. % of polyethylenimine (1:100 water diluted Lupasol® PS; PEI) in water, was manually applied to the release layer surface by moistening a Statitech 100% polyester cleanroom wiper with the solution and wiping the release layer surface. The conditioning solution was then allowed to dry spontaneously on the heated blanket and the temperature of the release layer was monitored using an IR Thermometer Dual Laser by Extech Instruments. Unless otherwise stated, standard transferability experiments were performed at 90° C.

Thereafter, the ink formulation (e.g., about 1-2 ml) was applied and evened on the surface of the heated and optionally pre-conditioned blanket using a coating rod (e.g., Mayer rod) yielding a wet layer having a characteristic thickness of approximately 24 micrometers. The ink film so formed was dried with hot air (at ~200° C.) until visually dry. The dried film, while still hot, was transferred to the desired printing substrate, such as Condat Gloss® 135 gsm coated paper, plain office printer uncoated paper and plastic foils of polyester. The substrate was placed on the surface of a metal roller weighing 1.5 kg and rolled over the dried ink, the transfer being performed while applying manual pressure equivalent to 10 kg force. The cylinder was rolled at a pace such that 1 cm of dried ink was contacted by the printing substrate within about 1 second.

The quality of the transferred image was visually assessed and assigned a score or rating of 0 to 5. A score of 0 indicated that less than 20% of the area of the dried ink film was transferred to the printing substrate, a grade of 1 indicated that between 20% and 40% of the dried ink area was transferred, a grade of 2 indicated that between 40% and 60% of the dried ink area was transferred, a grade of 3 indicated that between 60% and 80% of the dried ink area was transferred, a grade of 4 indicated that between 80% and 95% and a grade of 5 indicated that more than 95% of the are of the dried ink area was transferred to the printing substrate. The surface of the release layer was also observed, especially in the event of incomplete transfer. Two main types of incomplete transfer can be observed: (a) a partial transfer, in which only a portion of the image transfers to the printing substrate, whereas the complementary portion remains on the blanket; and (b) a split transfer, in which the ink image transferring to the substrate and the ink remaining on the blanket at least partially superimpose. The extent of transfer from the blanket was evaluated by the application of a transparent adhesive tape to the surface of the printing blanket and its subsequent peeling therefrom. The area of dried ink, if any, transferred to the adhesive tape was assumed to substantially correspond to the area of untransferred ink remaining on the blanket. A score of 0 to 5 was assigned to estimate the percent area of dried ink remaining on the blanket. A score of 5 indicates that less than 5% of dried ink remained on the blanket, a score of 4.5 indicates that up to 10% of the ink image remained on the blanket, a score of 4 indicates that up to 20% of the ink image remained on the blanket, a score of 3 means up to 40%, a score of 2 means up to 60%, a score of 1 means up to 80%, while a score of 0 means up to 100% of the dried ink remained on the blanket. It is to be noted that if an ink formulation only partially transfers, the percent area on the printing substrate and on the blanket sum up to about 100%±5-10%. It is possible, however, that the summation of both values yields up to 200% dried ink area, in the event of complete splitting between the image transferring to the substrate and remaining on the blanket. Combinations of partial transfer and partial splitting are also possible, and are reported accordingly. An ink is considered suitable for transfer at a particular temperature from a specific blanket treated, when necessary, with a selected conditioning agent, if the transferability score or evaluation (transfer to the printing substrate) is at least 4.5, and preferably 5, the untransferred ink score is at least 4.5, and preferably 5. The overall transferability rating is produced by summing the two scores for transferred and untransferred ink, and dividing by 10. A perfect score yields a rating of 1.0.

The percentage area on a surface can be visually assessed with sufficient certainty by trained operators to assign the above-described evaluation. If necessary, the ink can be jetted to the blanket by a printing head to deposit a test image facilitating a more quantitative assessment of ink transferability under the operating conditions of interest. This can be achieved, for instance, by high resolution scanning of the printed image and image analysis of the scan by appropriate image capturing and analysis programs Typically, ink formulations of the present invention achieved overall transferability ratings of at least 0.9, and more typically, 0.95 or 1.0.

In some embodiments, ink formulations according to the present teachings, deposited (e.g., either manually or by jetting) on a PDMS release layer heated to 90° C. and treated with PEI, can transfer to a coated fibrous printing substrate at least 90% of the area of a dried ink image, at least 95%, at least 97.5%, at least 99%, or substantially all of the area of the image as dried on the release layer.

In some embodiments, ink formulations according to the present teachings, deposited on a PDMS release layer heated to 90° C. and treated with PEI can transfer to an uncoated fibrous printing substrate at least 90% of the area of a dried image, or at least 95%, or at least 97.5%, or at least 99%, or substantially all of the area of the image as dried on the release layer.

In some embodiments, ink formulations according to the present teachings, deposited on a PDMS release layer heated to 90° C. and treated with PEI can transfer to a plastic printing substrate at least 90% of the area of a dried image, or at least 95%, or at least 97.5%, or at least 99%, or substantially all of the area of the image as dried on the release layer.

In some embodiments, ink formulations according to the present teachings, deposited on a PDMS release layer heated to 90° C. and treated with PEI can transfer to a coated fibrous printing substrate, or to an uncoated fibrous printing substrate, or to a plastic printing substrate, such that the area of a dried ink image not transferring to the substrate is at most 5%, at most 2.5%, at most 1%, at most 0.5%, or substantially 0%. For each formulation, the transferability evaluation was performed at least three times for each temperature of transfer and/or printing substrate. The surface of the release layer of the blanket was cleaned with isopropanol (technical grade) and a lint-free wipe, in-between experiments. Reported results correspond to average of repeats under the same experimental conditions.

Softening Agents

The inventors have found that certain softening agents may be introduced to the ink formulations according to the present invention. In some embodiments of the inventive ink formulations, the addition of such softening agents may enable the use of various resins exhibiting characteristically poor flowability at low temperatures.

As described herein, the inventors have developed a system and process, and ink formulations suitable therefor, for producing ink film constructions in which the transfer of the dry ink films from the intermediate transfer member to the printing substrate takes place at low temperature, which depending on the duration of contact with and/or the temperature of the substrate, can be between 60° C. and 140° C., typically at the higher end of such range for printing substrates at room temperature (circa 23° C.) contacting the ink film for a short duration (e.g., less than 100 msec), for instance between 100° C. and 130° C., and typically at the lower end of the range for printing substrates contacting the ink film on blanket for enough time (e.g., a few seconds) to reduce the gradient of temperature between the contacted surfaces, for instance between 60° C. to 100° C. Other factors may affect optimal transfer temperatures, which may depend among other things from the printing system being used, the composition of the blanket release layer and conditioning solution, if any, the nature of the ink and substrate, their residency time of contact, the pressure applied at the impression station, and the like.

In the printing system herein disclosed, temperatures of 40° C. to 100° C. or 70° C. to 90° C. can be used at the image forming station where the ink formulations are deposited on the transfer member, at which stage the inks need to sufficiently hold to the surface of the release layer. Additionally, the ink formulations need be jettable at the print head temperature, and more particularly, at the nozzle plate temperature. Typically, print heads operate at temperatures between about 20° C. and about 50° C., or between about 25° C. and about 40° C.

While there exist various advantages to such low-temperature dry transfer (e.g., energy saving), significant disadvantages also exist. For example, one apparent design constraint is that the polymeric resin or binder needs to be soft to enable a dry transfer at such temperatures. Consequently, various mechanical properties of the printed ink image or ink film construction may be compromised. The abrasion resistance may be poor, and the printed image may become sticky even at near-ambient conditions (e.g., in a car exposed to sunlight).

Dry transfer may require a significant increase in viscosity ($\Delta\eta$) between the initial transfer temperature of the ink film and the temperature of the film after contacting the relatively cold printing substrate. The inventors have found that low-temperature dry transfer processes may require a similar substantial $\Delta\eta$. Moreover, the inventors have further found that since the initial transfer temperature of the film is now reduced with respect to higher-temperature dry transfer processes, the available $\Delta T$ for effecting the transfer may be appreciably reduced. In some cases, this has been found to result in splitting of the ink film during transfer, and/or excessive softness or flowability in the printed ink film product.

Resins having a relatively high $T_g$ may exhibit high viscosity at such low temperatures, so as to substantially preclude proper transfer to the printing substrate. As below explained, this problem is particularly relevant when the ink films have low total thickness (e.g., below 2.5 µm), leading to rapid cooling across the film thickness and shortening the time window during which the viscosity of the ink film would be suitable for transfer. Thus, despite their advantageous mechanical properties, such high $T_g$ resins may be highly unsuitable for low-temperature, dry transfer processes, a fortiori for thin ink films according to the present teachings.

The inventors have found that softening agents may be introduced to ink formulations containing various high-$T_g$ resins that would be suitable for low-temperature ink-film transfer, if not for the high-$T_g$ property. In such inventive formulations, the resin may be sufficiently hard to inhibit, or largely inhibit, clogging of the inkjet print head, even when the blanket temperature in the vicinity of the print head is 40° C.-50° C. or somewhat higher.

The softening agents may appreciably improve the flowability of a pure resin, and in the case of dry ink residue, the flowability of the dried ink solids. The softening agent may be selected, and added in suitable proportion, to effect a significant reduction in the viscosity of the high Tg resin and/or the dried ink solids containing the high Tg resin. The viscosity may be reduced, between 60 C and 110 C, by at least 20%, at least 35%, at least 50%, at least 75%, or at least 100%, relative to the identical high Tg resin, or dried ink solids, without the softening agent. In many cases, the viscosity is reduced by at least 150%, at least 200%, or at least 300%.

The selected softening agent may have a vapor pressure sufficiently low such that the softening agent remains, or largely remains, in the dry ink film, after the ink has been subjected to evaporation and heating. Thus, the vapor pressure of the at least one softening agent, at 150° C., may be at most 1.0 kPa, at most 0.8 kPa, at most 0.7 kPa, at most 0.6 kPa, or at most 0.5 kPa. In some embodiments, however, the inventors have found it advantageous for the vapor pressure to be even lower: at most 0.40 kPa, at most 0.35 kPa, at most 0.25 kPa, at most 0.20 kPa, at most 0.15 kPa, at most 0.12 kPa, at most 0.10 kPa, at most 0.08 kPa, at most 0.06 kPa, or at most 0.05 kPa.

For example, such low vapor pressures may appreciably stabilize various properties of the ink formulation, and perhaps most notably, enable the dried ink film to retain or largely retain its transferability property, even over the course of continuous heating of the film (e.g., on the ITM) for at least one hour, at least six hours, at least 24 hours, or at least 3 days.

The inventors have found that the introduction of such softening agents to the inventive ink formulations may compromise various mechanical properties of the printed image. Abrasion resistance may be reduced, and the printed image may become sticky at near-ambient temperatures of 35° C.-45° C. The inventors have further found, however, that such deleterious trends may be appreciably mitigated by at least one of the following:

limiting the weight ratio of softening agent to high $T_g$ resin to at most 1, at most 0.50, at most 0.40, at most 0.30, at most 0.20, at most 0.17, at most 0.15, at most 0.12, or at most 0.10;

limiting the weight ratio of softening agent to total resin content to at most 0.25, at most 0.20, at most 0.15, at most 0.12, at most 0.10, at most 0.08, or at most 0.06;

limiting the weight ratio of softening agent to total solids content to at most 0.20, at most 0.15, at most 0.12, at most 0.10, at most 0.08, at most 0.06, at most 0.05, or at most 0.04.

Typically, the weight ratio of softening agent to high $T_g$ resin is at least 0.02, at least 0.04, at least 0.06, at least 0.08, at least 0.10, at least 0.12, at least 0.15, or at least 0.20. The weight ratio of softening agent to total resin content may be at least 0.01, at least 0.02, at least 0.03, at least 0.04, at least 0.06, at least 0.08, at least 0.10, or at least 0.12. The weight ratio of softening agent to total solids content may be at least 0.01, at least 0.02, at least 0.03, at least 0.04, at least 0.06, at least 0.08, or at least 0.10.

Such quantities of softening agents are nonetheless substantial, and might be expected to more severely impact mechanical properties of the printed image. This notwithstanding, the inventors have surprisingly found that various affected mechanical properties of the printed image may remain within a suitable range. Without wishing to be bound by theory, the inventors believe that this phenomenon may be at least partially attributable to the characteristically thin ink films that may be obtained using the system and process described herein. Such thin ink films may have an average film thickness of at most 2.5 micrometer (μm), or at most 2.0 μm, and more typically, at most 1.8 μm, at most 1.6 μm, at most 1.4 μm, at most 1.2 μm, at most 1.0 μm, at most 0.8 μm, or at most 0.6 μm.

While those of ordinary skill in the art may identify chemical families or groups that may be particularly suitable for specific resin chemistries, the inventors have discovered specific chemical families whose members may act as potent softening agents for a wide variety of organic polymeric resins. These families include: low vapor pressure esters, more particularly sorbitans, polyoxyethylene sorbitans and polysorbates; and low vapor pressure ethers, more particularly polyethylene glycols. Exemplary compounds are Polyoxyethylene sorbitan monolaurate, Polyoxyethylene sorbitan monopalmitate, Polyoxyethylene sorbitan monostearate, Polyoxyethylene sorbitan tristearate, Polyoxyethylene sorbitan monooleate, Polyoxyethylene sorbitan Trioleate, Sorbitan monolaurate, Sorbitan stearate, Sorbitan tristearate, Sorbitan monooleate, Sorbitan trioleate and mid to high MW PEGs which are in solid form at room temperature. These materials are commercially available for instance as Tween® 20, Tween® 40, Tween 60, Tween 65, Tween 80, Tween 85, Span 20, Span 60, Span 65, Span 80, Span® 85, PEG 8,000, and PEG 20,000.

Such softening agents may be particularly appropriate for resins selected from acrylic polymers, acrylic styrene copolymers, styrene polymers, and polyesters. Exemplary compounds are commercially available as Joncryl® 90, Joncryl® 530, Joncryl® 537E, Joncryl® 538, Joncryl® 631, Joncryl® 1158, Joncryl® 1180, Joncryl® 1680E, Joncryl® 1908, Joncryl® 1925, Joncryl® 2038, Joncryl® 2157, Joncryl® Eco 2189, Joncryl® LMV 7051, Joncryl® 8055, Joncryl® 8060, Joncryl® 8064, Joncryl® 8067, all acrylic-based polymers available from BASF; Dynacoll® 7150, Desmophen® XP2607 and Hoopol® F-37070, all polyester-based polymers respectively available from Evonik, Bayer and Synthesia International, and any other chemical equivalents thereof.

The molecular weight of the softening agents used in conjunction with the present invention may have a molecular weight of at least 300, at least 500, at least 600, at least 700, or at least 800; the molecular weight may be at most 20,000, at most 10,000, at most 5,000, at most 3,000, at most 2,500, at most 2,000, at most 1,750, at most 1,500, or at most 1,400.

The solubility of the softening agents in water may be at least 0.1% (weight:weight of water), and more typically, at least 0.2%, at least 0.3%, or at least 0.5%.

In the present application, the term softening agent is used to refer to compounds able to significantly lower the glass transition temperature of the resin to which it is added. The agent is said to have a significant effect if when mixed 1:1 by solid weight with the resin of interest, the $T_g$ of the mixture is lowered with respect to the original $T_g$ of the resin by at least 5° C., at least 10° C., at least 15° C., at least 20° C., or at least 25° C.

Figure 7A:
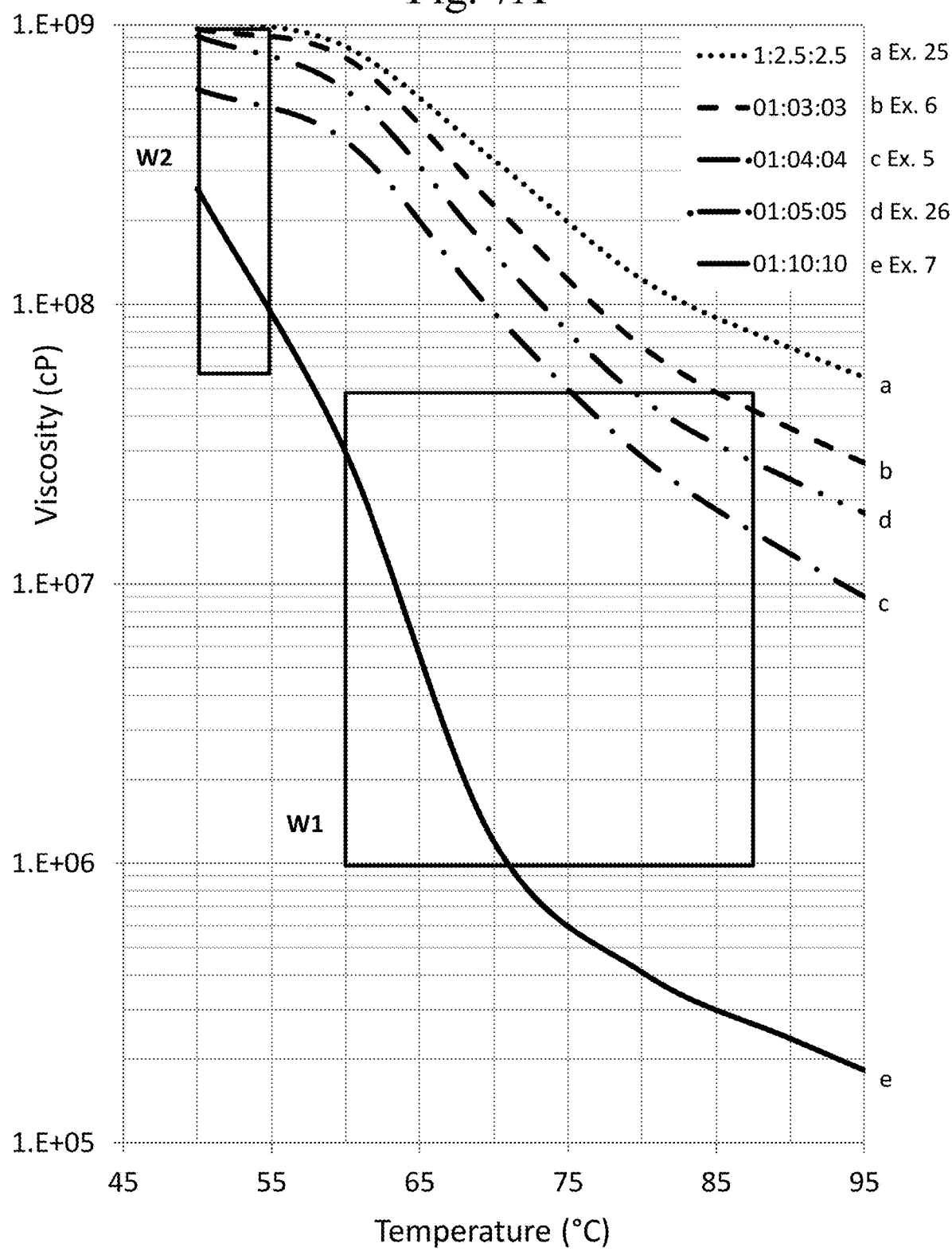
FIG. 7A provides a first plurality of temperature sweep plots of dynamic viscosity as a function of temperature, for dried ink residues of five ink formulations having identical components, and a varying ratio of softening agent, using a first thermoplastic resin and a first softening agent.

By way of example, FIG. 7A displays a first plurality of temperature sweep plots of dynamic viscosity as a function of temperature, for dried ink residues of five ink formulations having identical components, and a varying ratio of softening agent, using a first thermoplastic resin (Joncryl® 1680E), and a first softening agent (polyethylene glycol (PEG) 20,000). The dried residues were obtained from the ink formulations corresponding to Examples 5, 6, 7, 25 and 26.

Figure 7B:
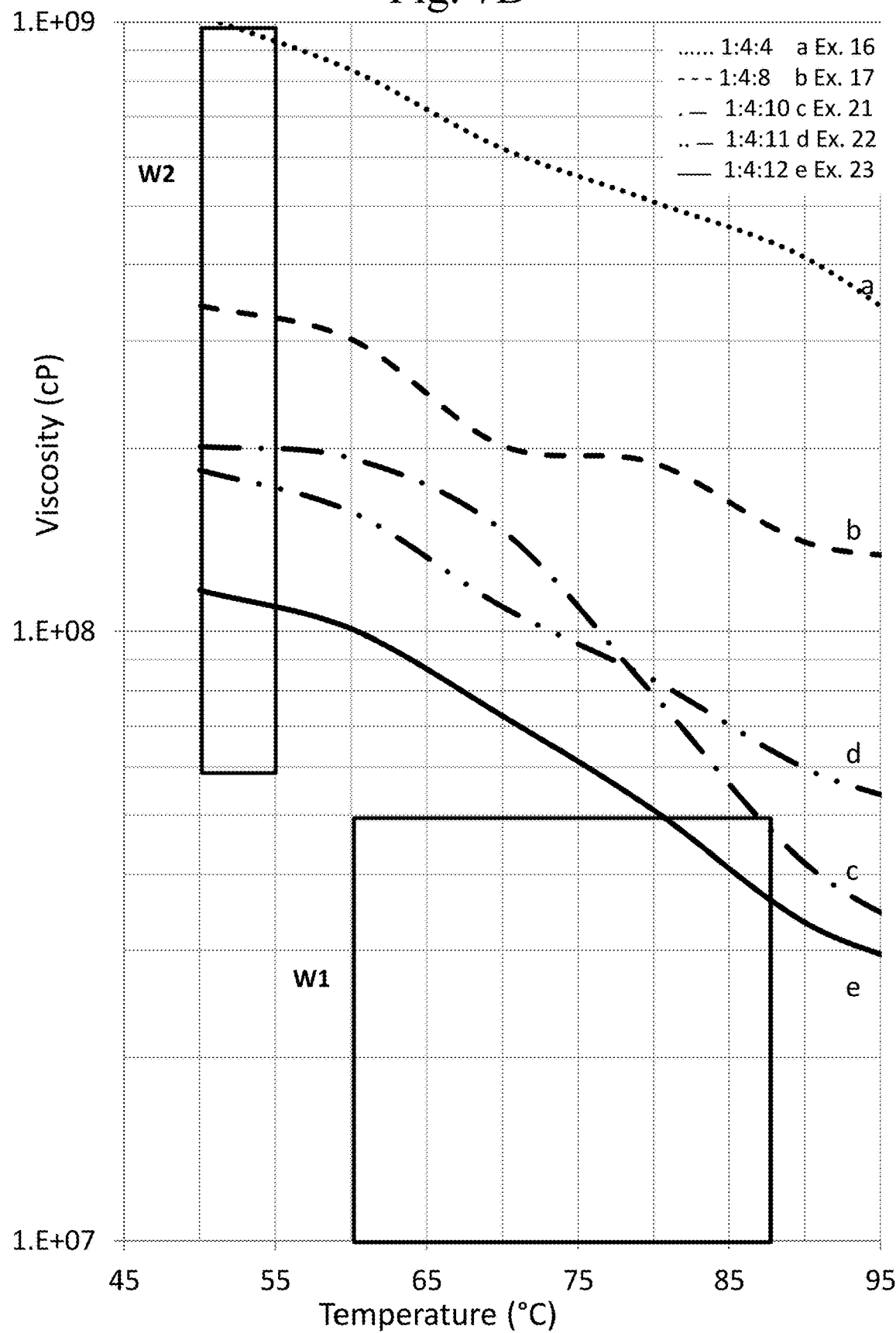
FIG. 7B provides a second plurality of temperature sweep plots of dynamic viscosity as a function of temperature, for dried ink residues of five ink formulations having identical components, and a varying ratio of softening agent, using a different thermoplastic resin and a different softening agent with respect to those used in FIG. 7A.

FIG. 7B provides a second plurality of temperature sweep plots of dynamic viscosity as a function of temperature, for dried ink residues of five ink formulations having identical components, and a varying ratio of softening agent, using a second thermoplastic resin, namely, Joncryl® 8060, and a second softening agent, namely, PEG 8,000. The dried residues were obtained from the ink formulations corresponding to Examples 16, 17, 21, 22 and 23.

Figure 8A:
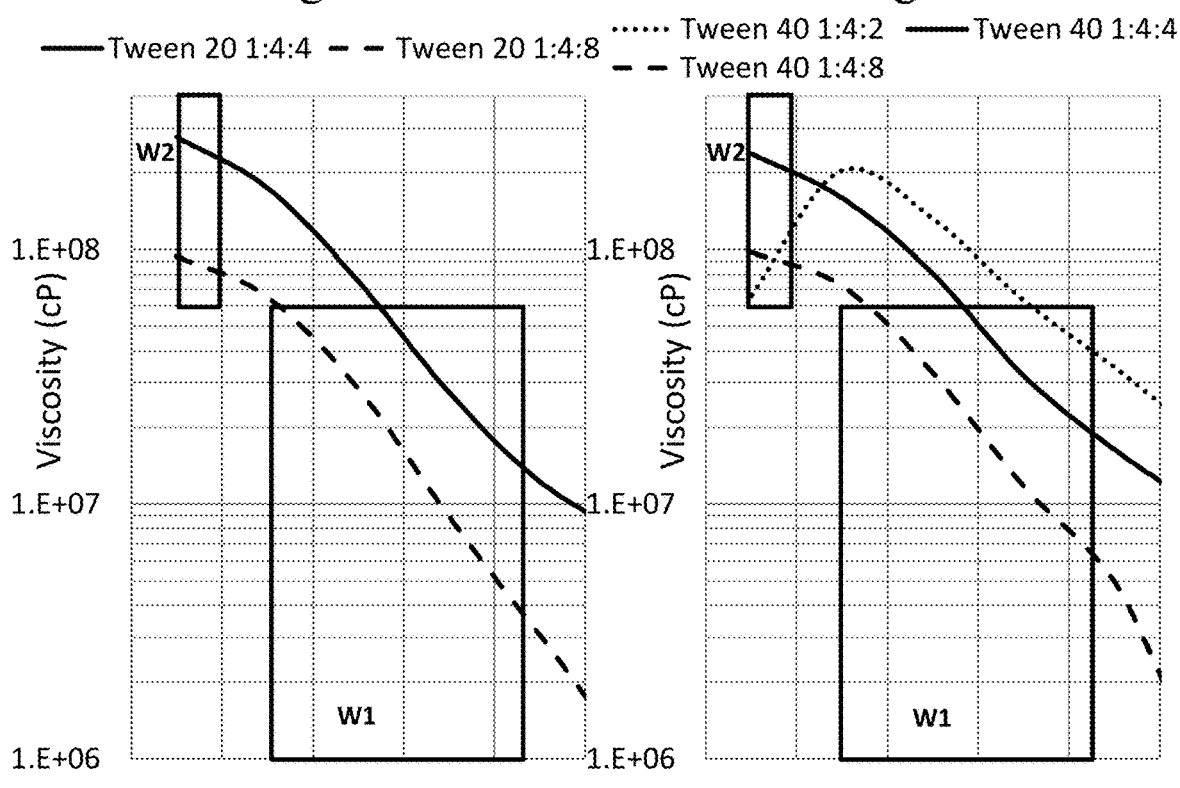
FIGS. 8A-8D are temperature sweep plots of dynamic viscosity as a function of temperature, for residue films of ink formulations having different softening agents, and varying concentrations of those agents.
Figure 8B:
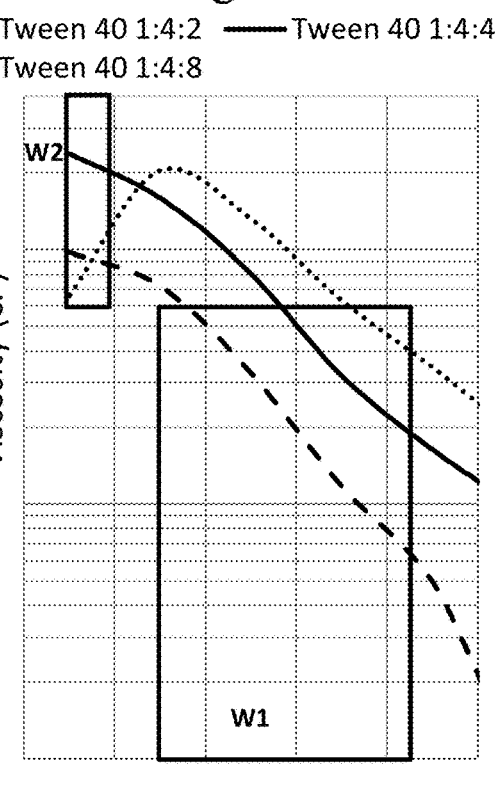
Figure 8C:
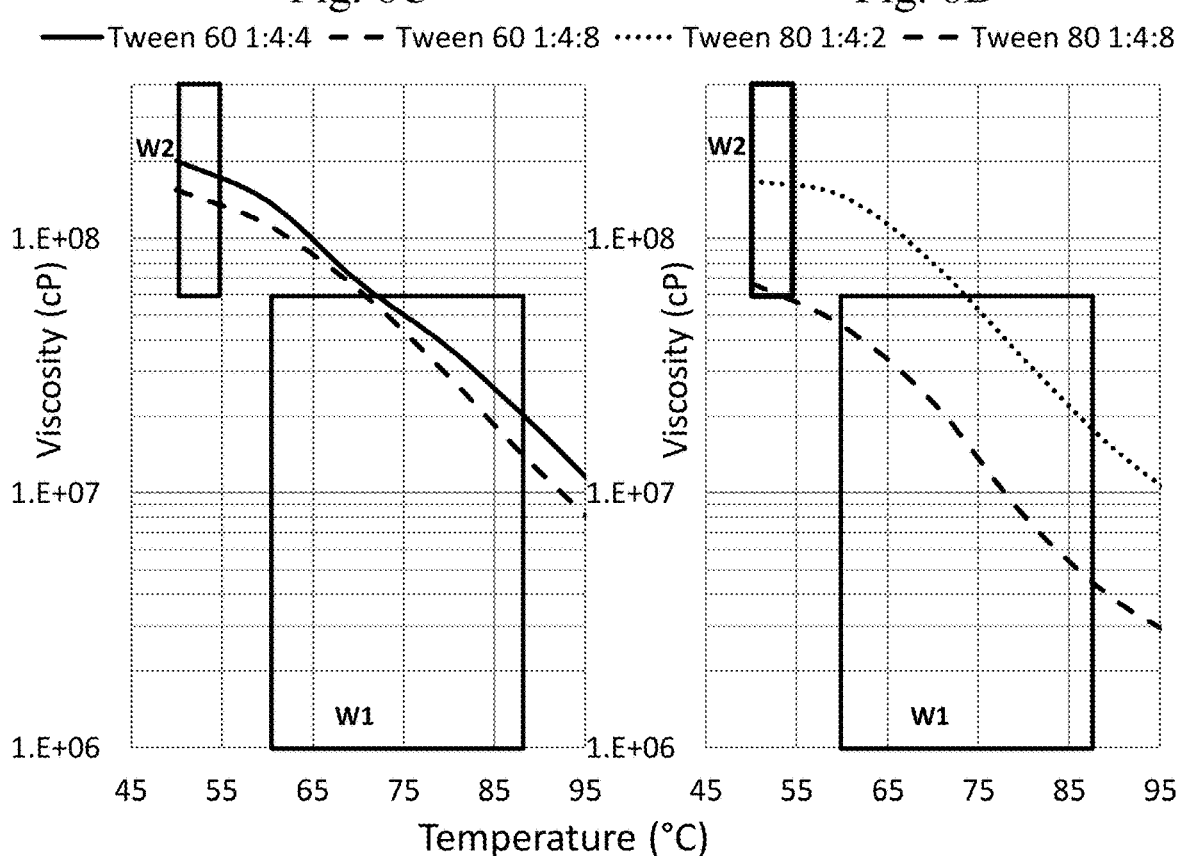
Figure 8D:
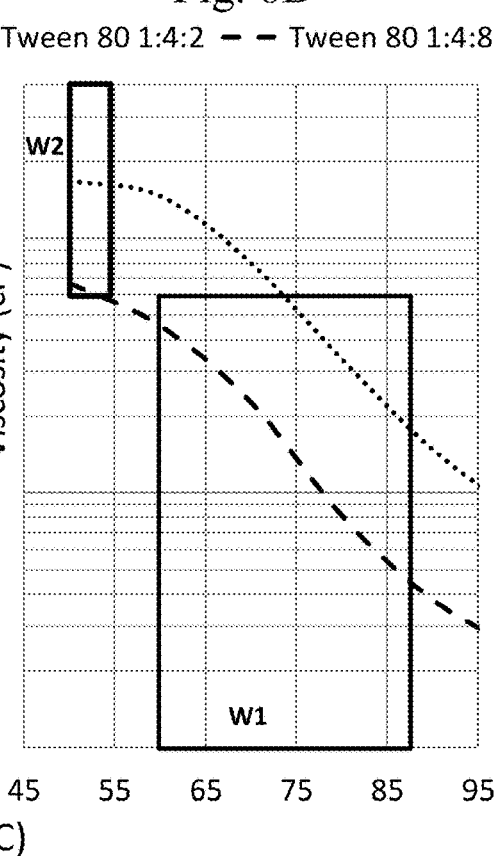

FIGS. 8A-8D are temperature sweep plots of dynamic viscosity as a function of temperature, for residue films of ink formulations having different softening agents, and varying concentrations of those agents. For convenience of comparison, the pigment and the polymeric resin were the same black pigment and Joncryl® 2038, and were kept at a 1:4 ratio for all samples. FIG. 8A provides the thermo-rheological behavior of dried residues of ink formulations comprising Tween® 20 (Examples 27-28); FIG. 8B displays sweep plots observed for formulations comprising Tween® 40 (Examples 29-31); FIG. 8C for formulations comprising Tween® 60 (Examples 9-10); and FIG. 8D for formulations comprising Tween® 80 (Examples 32-33).

In some embodiments, the softening agent may have a vapor pressure of at most 0.40 kPa, at most 0.35 kPa, at most 0.25 kPa, at most 0.20 kPa, at most 0.15 kPa, at most 0.12 kPa, at most 0.10 kPa, at most 0.08 kPa, at most 0.06 kPa, or at most 0.05 kPa, at 150° C.

In some embodiments, the softening agent may be stable up to a temperature of at least 170° C., at least 185° C., at least 200° C., or at least 220° C.

In some embodiments, the weight ratio of the softening agent to the resin within the formulation may be at least 0.05:1, at least 0.10:1, at least 0.15:1, at least 0.2:1, at least 0.25:1, at least 0.35:1, at least 0.4:1, at least 0.5:1, at least 0.6:1, at least 0.75:1, at least 1:1, at least 1.25:1, at least 1.5:1, at least 1.75:1, or at least 2:1.

In some embodiments, this weight ratio may be at most 3:1, at most 2.5:1, at most 2:1, at most 1.6:1, or at most 1.4:1.

Various analytical methods and devices may be used to identify the various components of aqueous ink formulations, and the various components of the ink films produced therefrom, and these may be apparent to those of skill in the art. It may be advantageous to separate the resins and any other polymeric materials from the aqueous phase, which contains the softening agent. The softening agent may be identified using HPLC, MS, or other known analytical methods and devices. The softening agent may be extracted from the resins and polymers by various means. In one method, the resin may be swelled using an appropriate solvent (e.g., ISOPAR), which may help to release the softening agent. Nanofiltration may also be appropriate in some cases.

Coloring Agents

The term "colorant" or "coloring agent", as used herein in the specification and in the claims section that follows, refers to a substance that is considered, or would be considered to be, a colorant in the art of printing. The colorant may include at least one pigment. Alternatively or additionally, the colorant may include at least one dye.

As used herein in the specification and in the claims section that follows, the term "pigment" refers to a solid colorant, typically finely divided. The pigment may have an organic and/or inorganic composition. Typically, pigments are insoluble in, and essentially physically and chemically unaffected by, the vehicle or medium in which they are incorporated. Pigments may be colored, fluorescent, metallic, magnetic, transparent or opaque. Pigments may alter appearance by selective absorption, interference and/or scattering of light. They are usually incorporated by dispersion in a variety of systems and may retain their crystal or particulate nature throughout the pigmentation process.

As used herein in the specification and in the claims section that follows, the term "dye" refers to at least one colored substance that is soluble or goes into solution during the application process and imparts color by selective absorption of light.

Although a wide range of average particle sizes ($d_{50}$) or particle size distributions (PSDs) may be suitable for pigments utilized in various embodiments of the inventive inks, the inventors believe that best results may be attained when the $d_{50}$ of the pigment is within the range of 20 nm to 300 nm, (e.g., at most 120 nm, at most 100 nm, or 40-80 nm). The pigments may thus be nanopigments; the particle size of the nanopigments may depend on the type of pigment and on the size reduction methods used in the preparation of the pigments. Pigments of various particle sizes, utilized to give different colors, may be used for the same print. Some pigments having such particle sizes are commercially available, and may be employed as-is in embodiments of the invention; in other cases, the pigments may be milled to the appropriate size. It will be appreciated that in general, the pigments are dispersed (or at least partly dissolved) within the solvent along with the polymeric resin, or can be first dispersed within the polymeric resin (e.g., by kneading) to obtain colored resin particles that are then mixed with the solvent.

The concentration of the at least one colorant within the ink formulation, when the formulation is substantially dry, may be at least 2%, at least 3%, at least 4%, at least 6%, at least 8%, at least 10%, at least 15%, at least 20%, or at least 22%, by weight. Typically, the concentration of the at least one colorant within the ink film is at most 40%, at most 35%, at most 30%, or at most 25%. More typically, the dry ink residue may contain 2-30%, 3-25%, or 4-25% of the at least one colorant.

In some applications, particularly when it is desirable to have an ultra-thin ink film laminated onto the printing substrate, the weight ratio of the polymeric resin to the colorant may be at most 10:1, at most 7:1, at most 5:1, at most 3:1, at most 2.5:1, at most 2:1, or at most 1.7:1.

Figure 9:
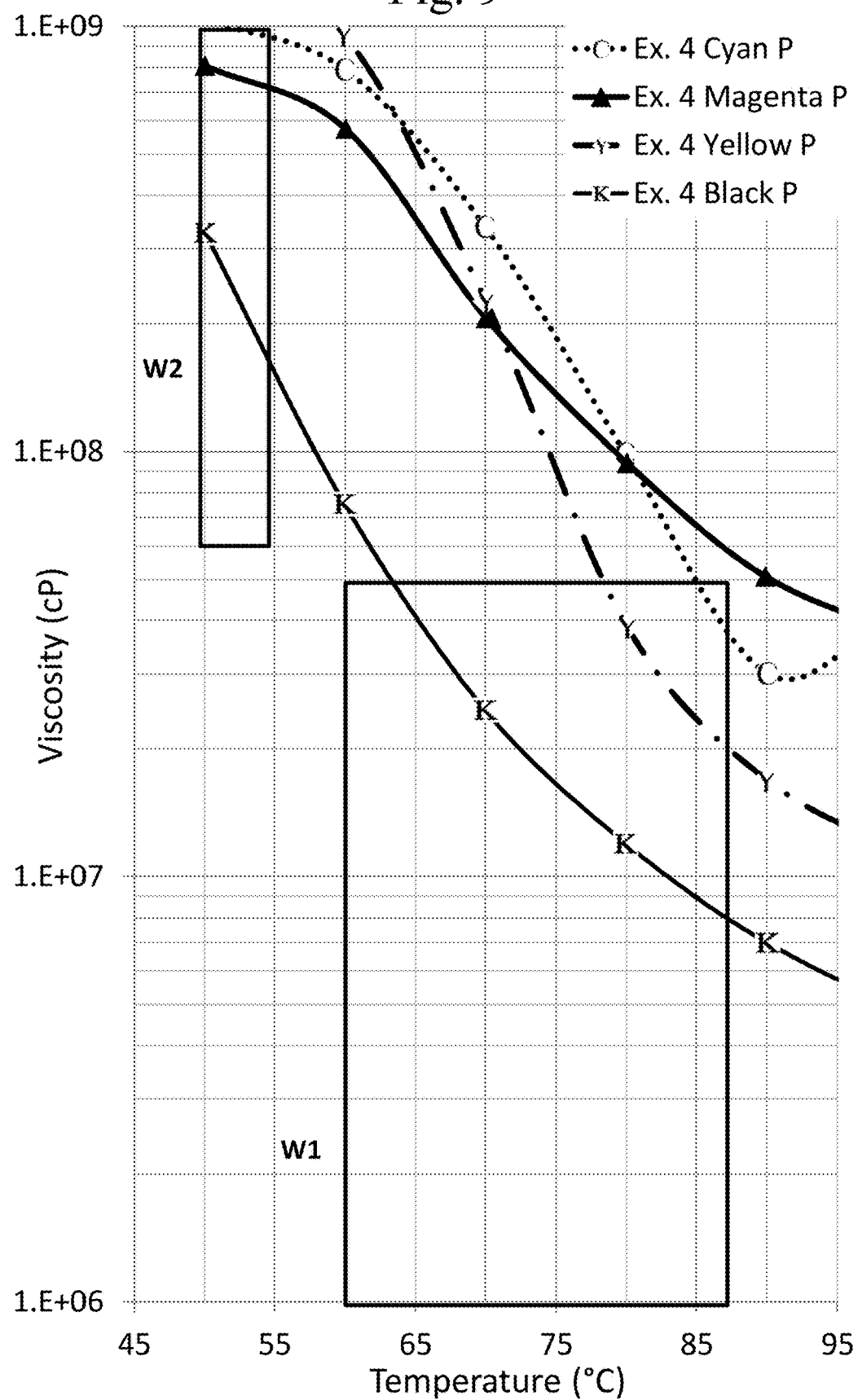
FIG. 9 provides temperature sweep plots of dynamic viscosity as a function of temperature, for dried ink residues of four ink formulations having different colorants (C, M, Y, K) but otherwise identical formulation components.

FIG. 9 provides temperature sweep plots of dynamic viscosity as a function of temperature, for dried ink residues of four ink formulations having different colorants (C, M, Y, K) but otherwise identical formulation components. The black formulation is as disclosed in Example 4.

It will be appreciated by those of skill in the art that the inventive formulations may be modified in a fairly predictable manner to achieve desired formulation properties, and in particular, thermo-rheological properties. To this end, a large number of exemplary formulations, and thermo-rheological plots thereof, have been provided. Moreover, the plots have been arranged within the Figures to provide guidance on the effect of resin to pigment ratio on the thermo-rheological behavior. FIG. 7A and FIG. 7B demonstrate the effect of the softening agent to resin ratio on thermo-rheological behavior, for 2 different thermoplastic resins and 2 different softening agents. Higher softening agent to resin ratios are generally associated with lower viscosities. Relatively hard resins may be made suitable for low-temperature transfer by the softening agents. FIGS. 8A-8D demonstrate the effect of different softening agents on thermo-rheological performance, combined with varying softening agent to resin ratio, while keeping other formulation parameters constant. From the similarity of the curves in FIG. 9 it is evident that the colorants play a thermo-rheological role, but that that role is generally of secondary importance.

The first, "high-temperature" viscosity (associated with W1) provides a general indication of film transfer properties, which is important in the transfer of the film from the release layer of the ITM. The maximum viscosity value associated with that physical property may be represented by the top line or area of W1.

The second, "low-temperature" viscosity (associated with W2 at 50-55° C.) provides a general indication of how the film will behave on the printing substrate. The minimum viscosity value associated with that physical property may be represented by the bottom of W2.

With respect to the drying of inks for thermo-rheological testing of dry ink samples, the inventors have used various rigorous procedures and operating conditions to ensure that the ink residues attain a sufficient level of dryness to enable comparative testing between samples and to achieve good repeatability of thermo-rheological results for dried ink residues produced from an identical ink formulation.

The inventors have found that some of these rigorous procedures and operating conditions may be relaxed without appreciably impinging upon thermo-rheological repeatability, such that the following definition of ink residue dryness may be utilized: as used in the Specification and in the claims section that follows, the term "substantially dry", and the like, with regard to an ink residue, refers to an ink residue, obtained by drying of a particular ink, the ink residue preferably containing no more solvent and other volatile compounds than does a "standard" layer of that particular ink, having a 1 mm initial thickness, after such layer is dried in an oven for 12 hours at 100° C. and at 10 mbar vacuum (absolute). In the case of inks that prove difficult to dry, the depth of the vacuum may be increased to 5 mbar. In the case of inks that prove particularly difficult to dry, the ink residue may be allowed to exhibit a % loss-on-drying (LOD) of up to 1% or up to 2% below the % LOD exhibited by the "standard" layer.

Similarly, an ink formulation dried to form a "substantially dried" ink residue is termed "substantially dried".

In some embodiments, the ink formulation is devoid or substantially devoid of wax. Typically, the ink formulation contains less than 30 wt. % wax, less than 20 wt. % wax, less than 15 wt. % wax, less than 10 wt. % wax, less than 7 wt. % wax, less than 5 wt. % wax, less than 3 wt. % wax, less than 2 wt. % wax, or less than 1 wt. % wax. In other embodiments, wax is included in the ink formulation in order to impart greater abrasion resistance in the printed ink. Such waxes may be natural or synthetic, e.g., based on esters of fatty acids and fatty alcohols or long-chain alkanes (paraffin waxes), or mixtures thereof. In such cases, the formulation may comprise, for example, 0.1-10 wt. % wax, e.g., up to 0.1, 0.3, 0.5, 0.7, 1.0, 1.5, 2, 3, 4, 6, 8, or 10 wt. % wax. The wax may be incorporated into the formulation as an aqueous dispersion of small wax particles, e.g., having an average size of 10 micrometers or smaller, preferably having average size of 1 μm or smaller.

In some embodiments, the ink formulation is devoid or substantially devoid of oils such as mineral oils and vegetable oils (e.g., linseed oil and soybean oil). Typically, the ink formulation contains at most 20 wt. %, at most 12 wt. %, at most 8 wt. %, at most 5 wt. %, at most 3 wt. %, at most 1 wt. %, at most 0.5 wt. %, or at most 0.1 wt. %, by weight, of one or more oils, cross-linked fatty acids, or fatty acid derivatives produced upon air-drying.

In some embodiments, the ink formulation is devoid or substantially devoid of glycerol. Typically, the ink formulation contains at most 10%, at most 8%, at most 6%, at most 4%, at most 2%, at most 1%, at most 0.5%, or at most 0.2% glycerol, by weight.

In some embodiments, the ink formulation is devoid or substantially devoid of one or more salts, including salts used to coagulate or precipitate ink on a transfer member or on a substrate (e.g., calcium chloride). Typically, the ink formulation contains at most 8 wt. %, at most 5 wt. %, at most 3 wt. %, at most 1 wt. %, at most 0.5 wt. %, at most 0.1 wt. %, or substantially 0 wt. % of one or more salts. Such salts may be referred to herein as "precipitants", and it will be appreciated that when it is stated that a formulation does not include a salt or contains salt in an amount less than a certain weight percentage, this does not refer to salts that may form between the polymer(s) of the polymeric resin and pH modifiers, such as alcohol amines, or that may be present in the polymeric resin itself if the polymeric resin is provided as a salt. As discussed above, it is presently believed that the presence of negative charges in the polymeric resin is beneficial to the print process.

In some embodiments, the ink formulation is devoid or substantially devoid of inorganic particulates, e.g., silica particulates, titania particulate or alumina particulates, containing less than 2 wt. %, less than 1 wt. %, less than 0.1 wt. % or substantially no inorganic particulates. By "silica particulates" is meant fumed silica, silica chips, silica colloids, and the like. Specific examples of such silica particulates include those available from DuPont Company under the names: Ludox® AM-30, Ludox® CL, Ludox® HS-30; and those available from Nyacol Nanotechnologies Company under the names: NexSil™ 12, NexSil™ 20, NexSil™ 8, NexSil™ 85. In the context of the present application, the term "silica particulates" does not include colorants.

Ink Film Constructions

In the ink film constructions of the present invention, the ink dot may essentially be laminated onto a top surface of the printing substrate. As described herein, the form of the dot may be determined or largely determined prior to the transfer operation, and the dot is transferred as an integral unit to the substrate. This integral unit may be substantially devoid of solvent, such that there may be no penetration of any kind of material from the blanket transfer member into, or between, substrate fibers. The continuous dot, which may largely contain organic polymeric resin and colorant, adheres to, or forms a laminated layer on, the top surface of the fibrous printing substrate.

Printing tests employing the afore-disclosed ink compositions show good transfer to various and varied paper and plastic substrates, as will be illustrated in some of the following Figures.

Figure 10A:
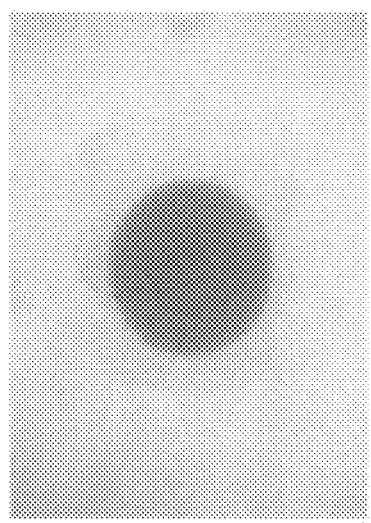
Figure 10B:
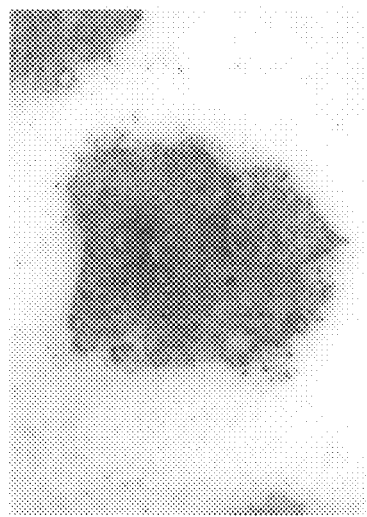
Figure 10C:
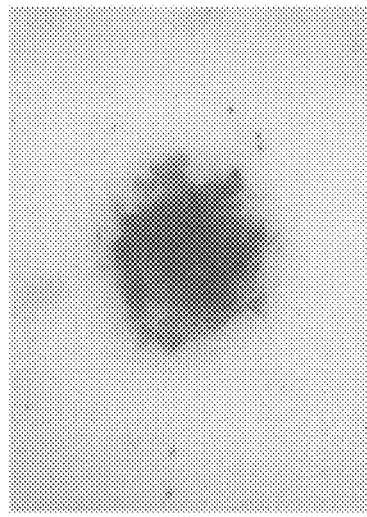
Figure 10D:
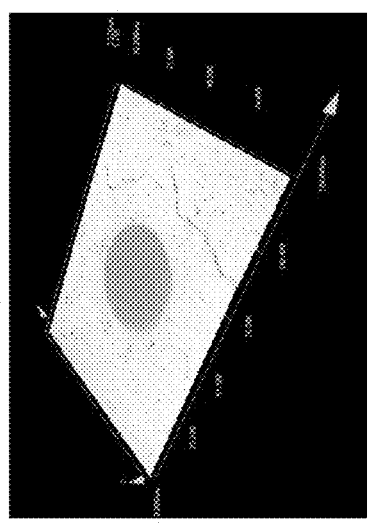
Figure 10E:
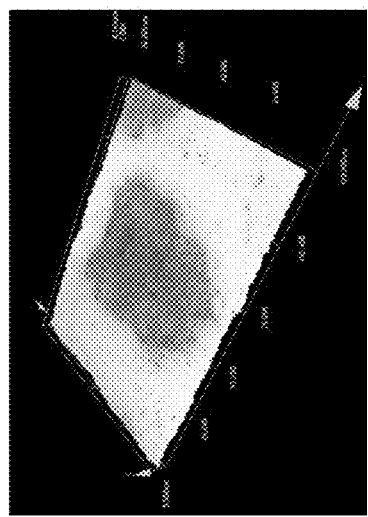
Figure 10F:
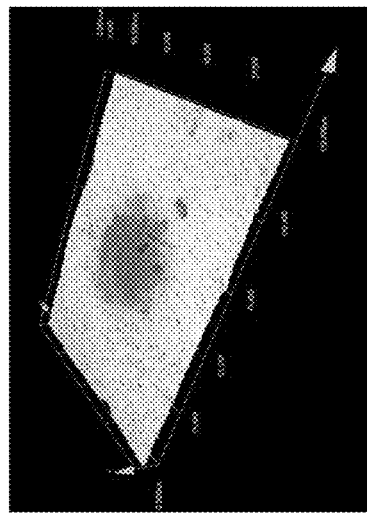

FIGS. 10A-F display two-dimensional (FIGS. 10A-C) and three-dimensional (FIGS. 10D-F) laser-microscope acquired magnified images of ink films on commodity-coated paper substrates, obtained using various printing technologies, wherein: FIGS. 10A and 10D are magnified images of a liquid electro-photography film (LEP); FIGS. 10B and 10E are magnified images of an offset splotch; and FIGS. 10C and 10F are magnified images of an inkjet ink film construction according to the present invention. The laser microscopy imaging was performed using an Olympus LEXT 3D measuring laser microscope, model OLS4000.

Figure 11A:
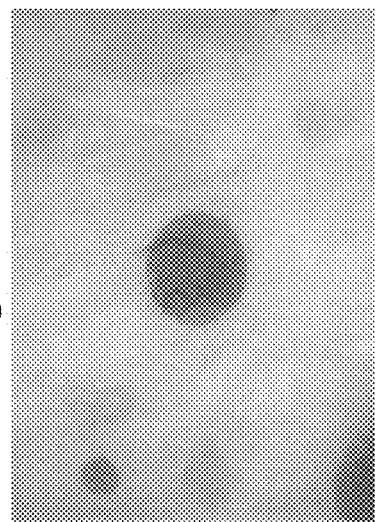
Figure 11B:
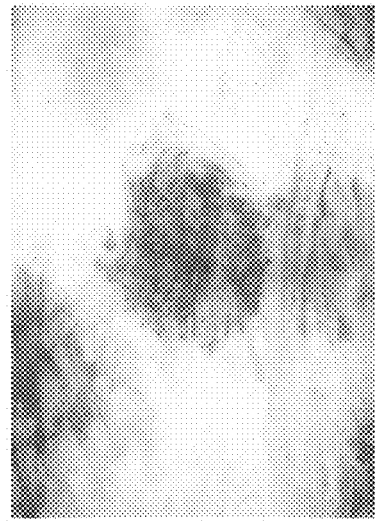
Figure 11C:
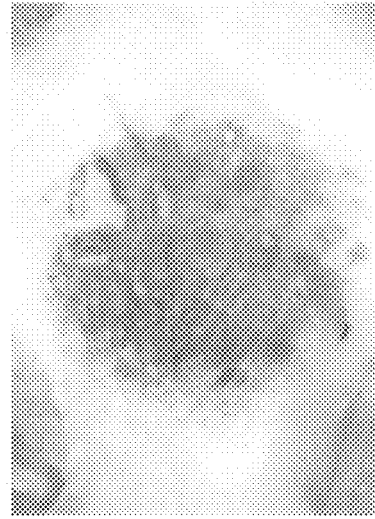
Figure 11D:
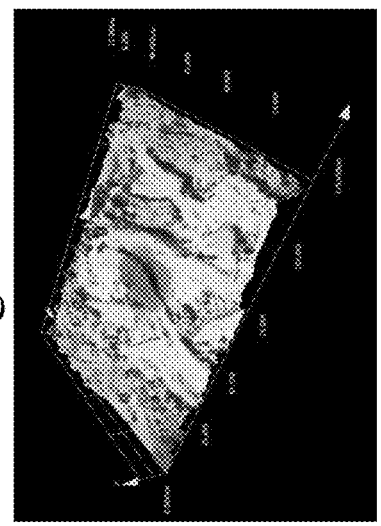
Figure 11E:
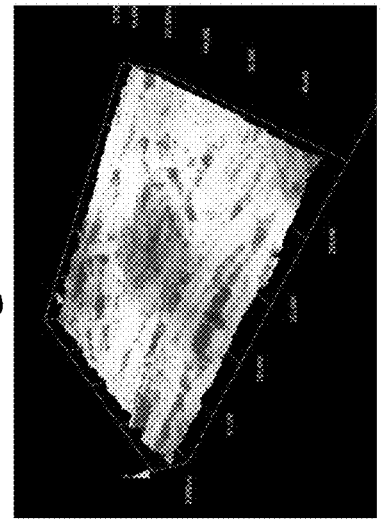
Figure 11F:
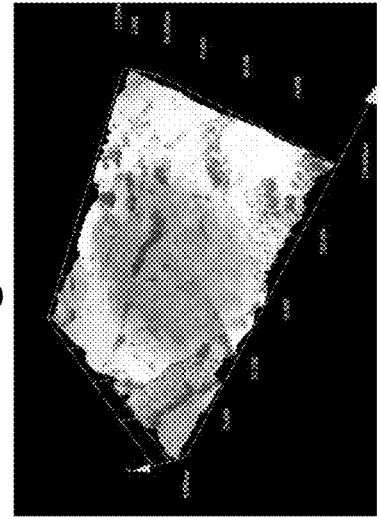

FIGS. 11A-F display two-dimensional (FIGS. 11A-C) and three-dimensional (FIGS. 11D-F) laser-microscope acquired magnified images of ink films on uncoated paper substrates, obtained using various printing technologies, wherein: FIGS. 11A and 11D are magnified images of a liquid electro-photography film (LEP); FIGS. 11B and 11E are magnified images of a lithographic offset splotch; and FIGS. 11C and 11F are magnified images of an inkjet ink film construction according to the present invention.

The ink dots in the ink dot constructions of the present invention may exhibit consistently good shape properties (e.g., roundness, edge raggedness, and the like), irrespective, to an appreciable degree, of the particular, local topographical features of the substrate, and irrespective, to an appreciable degree, of the type of printing substrate (coated or uncoated printing substrates, plastic printing substrates, etc.).

By contrast, the quality of ink dots in various known printing technologies, and in direct aqueous inkjetting technologies in particular, may vary significantly with the type of printing substrate, and with the particular, local topographical features of the substrate. It will be readily appreciated that, by way of example, when an ink drop is jetted onto a particularly flat local contour having a relatively homogeneous substrate surface (such as a broad fiber), the ink dot obtained may display significantly better shape properties, with respect to the other, or average ink dots disposed elsewhere on the substrate.

In these prior art ink and substrate constructions, the inkjet ink drops have penetrated the surface of the paper, as may be best seen in FIGS. 11D-11F. Such penetration may be typical of various printing technologies using uncoated or commodity-coated paper, in which the paper may draw ink carrier solvent and pigment within the matrix of the paper fibers.

In contrast to these prior art ink constructions, the inventive inkjet ink film constructions may be characterized by well-defined individual ink films, disposed generally above, and adhering to, the fibrous substrates, both coated (FIGS. 10C, 10F) and uncoated (FIGS. 11C, 11F).

The inventive inkjet single-drop ink film (or individual ink dot) construction was produced using the inventive system and method described herein, using an ink formulation Example 29 according to the present invention.

Dot Perimeter Characterization

The perimeter of the offset ink splotch and the perimeter of the LEP ink splotch have a plurality of protrusions or rivulets, and a plurality of inlets or recesses. These ink forms may be irregular, and/or discontinuous. By contrast, the inkjet ink dot produced according to the present invention, best seen in FIGS. 10C and 11C, has a manifestly rounded, convex, shape. The perimeter of the ink film is relatively smooth, regular, continuous and well defined.

Figure 15A:
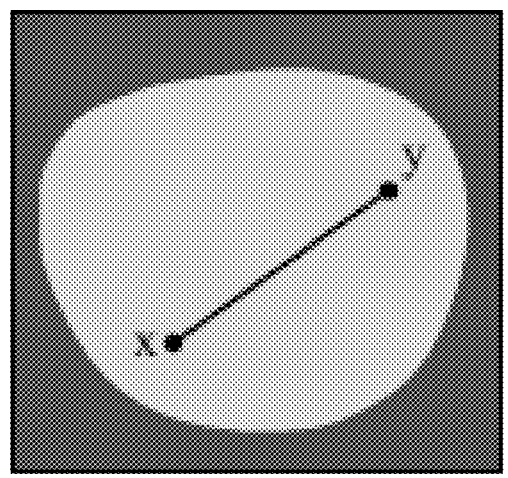
FIG. 15A shows a two-dimensional shape having the mathematical property of a convex set.
Figure 15B:
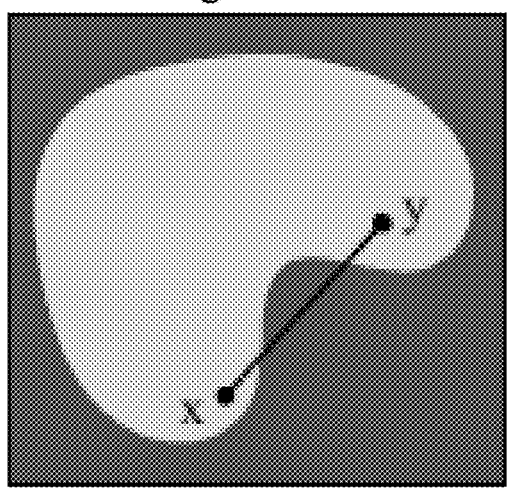
FIG. 15B shows a two-dimensional shape having the mathematical property of a non-convex set.

More particularly, projections of the ink film of the invention against the substrate surface (i.e., projections from a top view) tend to be rounded, convex projections that form a convex set, i.e., for every pair of points within the projection, every point on the straight line segment that joins them is also within the projection. Such a convex set is shown in FIG. 15A. By sharp contrast, the rivulets and inlets in the projections of various prior-art define those projections as a non-convex sets, i.e., for at least one straight line segment within a particular projection, a portion of that straight line segment is disposed outside the projection, as illustrated in FIG. 15B.

It must be emphasized that ink images may contain an extremely large plurality of individual or single ink films. For example, a 5 mm by 5 mm ink image, at 600 dpi, may contain more than 10,000 of such single ink films. Therefore, it may be appropriate to statistically define the ink film constructions of the present invention: at least 10%, at least 20%, or at least 30%, and more typically, at least 50%, at least 70%, or at least 90%, of the single ink dots (selected at random), or projections thereof, may be convex sets.

Figure 15C:
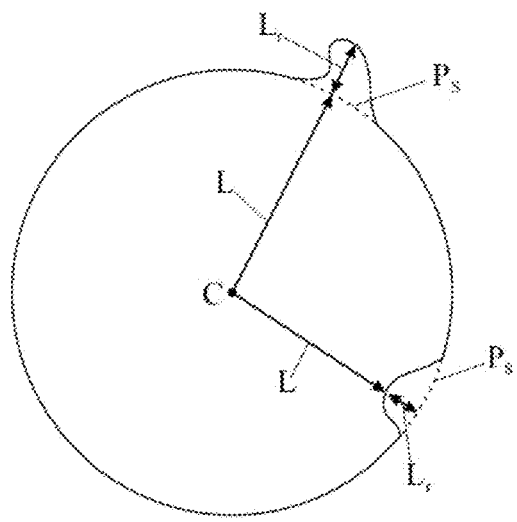
FIG. 15C is a schematic top projection of an ink film having a rivulet and an inlet, the schematic projection showing a smoothed projection of the ink image.

It must be further emphasized that ink images may not have crisp boundaries, particularly when those boundaries are viewed at high magnification. Therefore, it may be appropriate to relax the definition of the convex set whereby non-convexities (rivulets or inlets) having a radial length $L_r$ (as shown in FIG. 15C) of up to 3,000 nm, up to 1,500 nm, up to 1,000 nm, up to 700 nm, up to 500 nm, up to 300 nm, or up to 200 nm, are ignored, excluded, or are "smoothed", whereby the ink film or ink film projection is considered to be a convex set. The radial length $L_r$ is measured by drawing a radial line L from the center point C of the ink film image, through a particular rivulet or inlet. The radial length $L_r$ is the distance between the actual edge of the rivulet or inlet, and a smoothed projection $P_s$ of the ink image, devoid of that rivulet or inlet, and matching the contour of the ink film image.

In relative terms, it may be appropriate to relax the definition of the convex set whereby non-convexities (rivulets or inlets) having a radial length of up to 15% of the film/drop/splotch diameter or average diameter, up to 10%, and more typically, up to 5%, up to 3%, up to 2%, or up to 1%, are ignored, excluded, or are "smoothed", as above, whereby the ink film or ink film projection is considered to be a convex set.

The perimeter of various ink dots or films of the prior art may characteristically have a plurality of protrusions or rivulets, and a plurality of inlets or recesses. These ink forms may be irregular, and/or discontinuous. By sharp contrast, the inkjet ink dot produced according to the present invention characteristically has a manifestly rounded, convex, circular shape. The perimeter of the ink dot of the invention may be relatively smooth, regular, continuous and well defined. Ink dot roundness, convexity, and edge raggedness are structural parameters used to evaluate or characterize shapes, or optical representations thereof.

It can readily be observed, by comparing the magnified images of the prior-art ink forms of FIGS. 10A and 10B with the inventive ink dot construction of FIG. 10C, or by comparing the magnified images of the prior-art ink forms of FIGS. 11A and 11B with the inventive ink dot construction of FIG. 11C, that the appearance of the ink dots of the present invention is manifestly distinct from these prior-art ink forms. That which is readily observed by the human eye may be quantified using image-processing techniques. Various characterizations of the ink forms are described hereinbelow, after a description of the image acquisition method.

Acquisition Method (1) For each of the known printing technologies to be compared in the study, single dots, splotches, or film images printed on coated paper and on uncoated paper were used, including numerous coated and uncoated fibrous substrates, and various plastic printing substrates.

(2) With regard to the printing technology according to the present invention, single drop dot images were printed on coated paper and on uncoated paper. Care was taken to select substrates having similar characteristics to the substrates of the known ink-dot constructions used in (1).

(3) The acquisition of the dot images was performed using an OLS4000 (Olympus) microscope. Those of ordinary skill in the art know how to adjust the microscope to achieve the requisite focus, brightness and contrast, so that the image details will be highly visible. These image details include the dot contour, the color variance within the dot area, and the fibrous structure of the substrate surface.

(4) The images were taken with an ×100 optical zoom lens having a resolution of 129 micrometers×129 micrometers. This high resolution may be essential in obtaining fine details of the dot and of the fibrous structure of the substrate surface.

(5) The images were saved in uncompressed format (Tiff) having a resolution of 1024×1024 pixels, as image data may be lost in compression.

(6) Generally, a single dot or splotch was evaluated for each printing technology. From a statistical point of view, however, it may be advantageous to obtain 15 dot images (at least) for each type of hard-copy print being analyzed, and to manually select the 10 (at least) most representative dot images for image processing. The selected dot images should be representative in terms of dot shape, contour and color variation within the dot area. Another approach to print dot sampling, termed "field of view", is described hereinbelow.

Dot Contour Computation

The dot images were loaded to the image-processing software (ImageXpert). Each image was loaded in each of the Red, Green and Blue channels. The processing channel was selected based on a highest visibility criterion. For example, for cyan dots, the Red channel typically yielded the best dot feature visibility, and was thus selected for the image processing step; the Green channel was typically most suitable for a magenta dot. The dot edge contour was detected (automatically computed), based on a single threshold. Using a "full screen view" mode on a 21.5" display, this threshold was chosen manually for each image, such that the computed edge contour would best match the real and visible dot edge. Since a single image-channel was processed, the threshold was a gray value (from 0 to 255, the gray value being a non color value).

A computed perimeter value was obtained from the image-processing software (e.g., ImageXpert), the perimeter value being the sum of all distances between the adjacent, connected pixels at the edge of the dot or splotch. If, for example, the XY coordinates for adjacent pixels are (x1, y1) and (x2, y2), the distance is $\sqrt{[(x2-x1)^2+(y2-y1)^2]}$, while the perimeter equals $\Sigma\{\sqrt{[(x_{i+1}-x_i)^2+(y_{i+1}-y_i)^2]}\}$.

In various embodiments of the invention, it is desired to measure the length of the perimeter of an ink dot. An alternative method for measuring the perimeter length will now be described. As a first step, an image comprising an ink dot is used as input for an algorithm that outputs perimeter length. The pixel dimension M×N of the image may be stored in a two-element array or an ordered pair image_pixel_size. An example of the value of the image_pixel_size is 1280,760—in this example M=1280 and N=760. This corresponds to an image 1280 pixels in the horizontal axis and 760 pixels in the vertical axis. Subsequently, the image magnification ratio or scale is obtained and stored in variable image_magnification. One example of variable image_magnification is 500. When comparing perimeters between ink dots in first and second images it is mandatory that the variables image_pixel_size and image_magnification of the two images are equal. It is now possible to calculate the corresponding length of one square pixel—i.e. the side length in a real-world length units (e.g., micrometers) or a pixel. This value is stored in a variable pixel_pitch. One example of the variable pixel_pitch is 0.05 μm. The image is now converted to grayscale by methods known to the skilled artisan. One proposed method is converting the input image, the image typically in an sRGB color space, to the L*a*b* color space. Once the image is in the Lab color space, the values for the variables a and b are changed to zero. It is now possible to apply an edge detection operator to the image. The preferred operator is a Canny edge detection operator. However, any operator known in the art may be applied. The operators are not limited to first order derivatives, such as the canny operator, but rather open to second derivatives as well. Furthermore, a combination of operators may be used in order to obtain results that may be compared between operators and subsequently remove "unwanted" edges. It may be favorable to apply a smoothing operator such as a Gaussian blur prior to applying the edge detection operator. The threshold level applied when applying the edge detection operator is such that an edge that forms an endless loop is first obtaining in the area between the formerly described minimal circumference Ink dot engulfing circle and the maximal circumference ink dot enclosed circle. A thinning operator is now implemented to render the endless loop edge substantially one pixel wide. Any pixel that is not a part of the endless loop edge has its L* value change to zero, while any pixel that is part of the endless loop edge has its L* value change to 100. The endless loop edge is defined as the perimeter of the ink dot. A pixel link is defined as a straight line connecting to pixels. Each pixel along the perimeter incorporates two pixel links, a first pixel link and a second pixel link. These two pixel links define a pixel link path within a single pixel. In this method of computing perimeter length, each pixel is a square pixel. Therefore, each pixel link may form a line from the center of the pixel to one of eight possible nodes. The possible nodes being the corners of the pixel or a midpoint between two neighboring corners of the pixel. Nodes at the corners of the pixels are of the type node_1 one nodes at the midpoint between two corners are of type node_2. As such, there are six possibilities of pixel link paths within a pixel. These can be categorized into three groups. Group A, B, and C. Each group has its own corresponding coefficient, namely, coefficient_A, coefficient_B, and coefficient_C. The value of coefficient_A is 1, the value of coefficient_B is the sqrt(2), and the value of coefficient_C is (1+sqrt(2))/2. Group A contains pixels whose pixel link path coincides with nodes of type node_2. Group B contains pixels whose pixel link path coincides with nodes of type node_1. Group C contains pixels whose pixel link path coincides with nodes of type node_1 and type node_2. It is now possible to calculate the pixel length of the perimeter. The pixel length of the perimeter is calculated by summing all of the pixels in the perimeter multiplied by their corresponding coefficient. This value is stored in variable perimeter_pixel_length. It is now possible to calculate the actual length of the ink dot perimeter. This is done by multiplying perimeter_pixel_length by pixel_pitch.

Roundness

A dimensionless roundness factor (ER), may be defined by:

$$ER=P^2/(4\pi A)$$

wherein P is the measured or calculated perimeter, and A is the measured or computed area within the ink film, dot or splotch. For a perfectly smooth and circular ink dot, ER equals 1.

The deviation from a round, smooth shape may be represented by the expression (ER-1). For a perfectly circular, idealized ink dot, this expression equals zero.

The R-square of the roundness factor may be computed for each of the 10 most representative dot images selected for each type of printing technology, and averaged into a single value.

For ink film constructions in which the fibrous substrate (e.g., paper) is uncoated, or for ink film constructions in which the fibrous substrate is coated with a coating such as the commodity coating in coated offset paper (or such as coatings which enable the carrier from traditional water-based inkjet ink to reach the paper fibers), the deviation from a round, smooth round shape [(ER-1), henceforth, "deviation"] for the ink dots of the present invention is not ideal, and will exceed 0.

Figure 2:
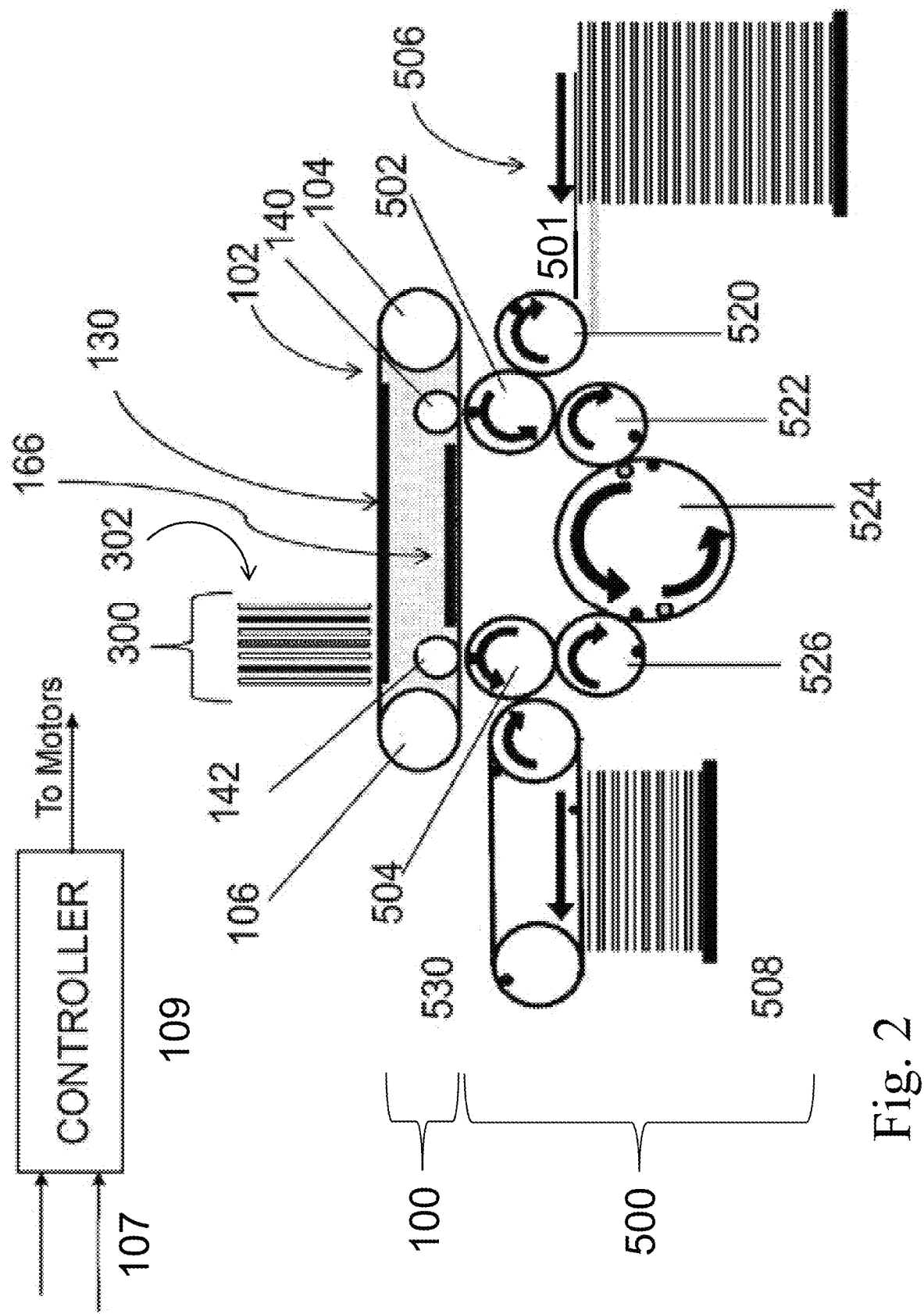
FIG. 2 is a schematic vertical section through the printing system of FIG. 1, in which the various components of the printing system are not drawn to scale.
Figure 3:
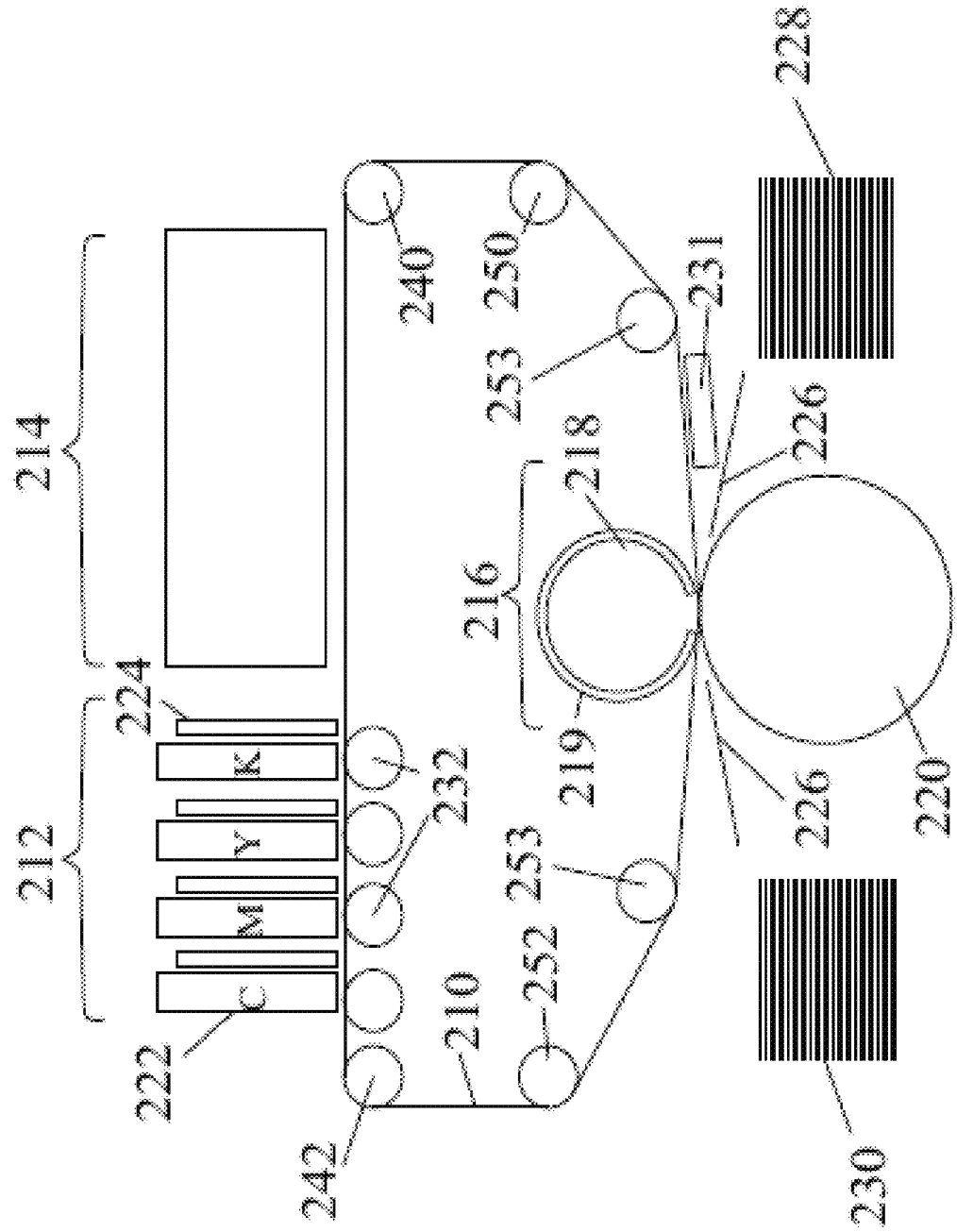
FIG. 3 is a schematic representation of a printing system of the invention in accordance with which an embodiment of the invention may be used.
Figures 1, 14A:
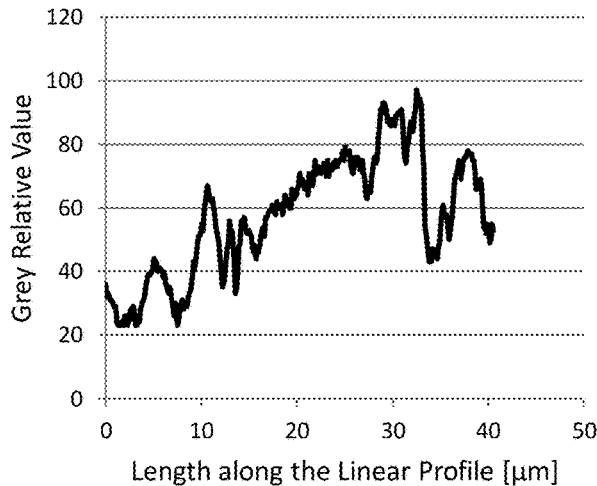
Figures 2, 14A:
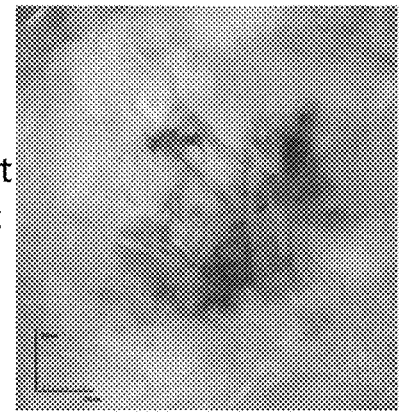
Figures 1, 14B:
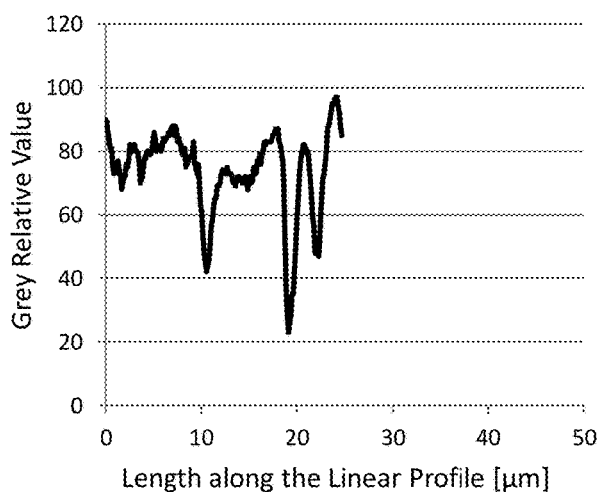
Figures 2, 14B:
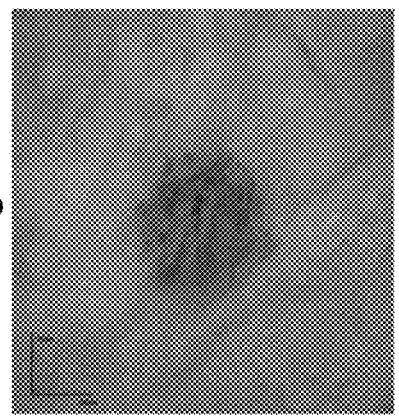
Figures 1, 14C:
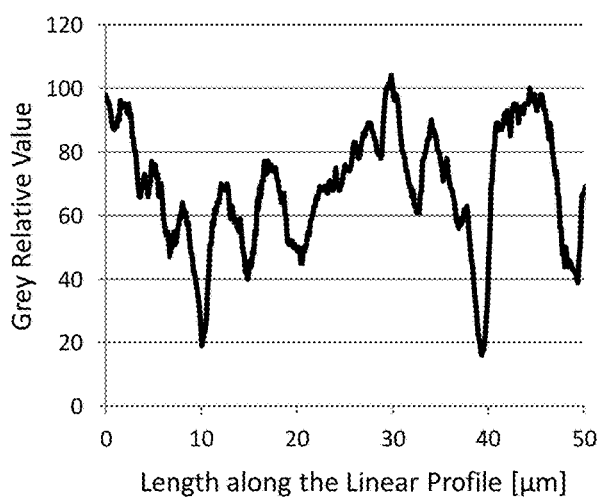
Figures 2, 14C:
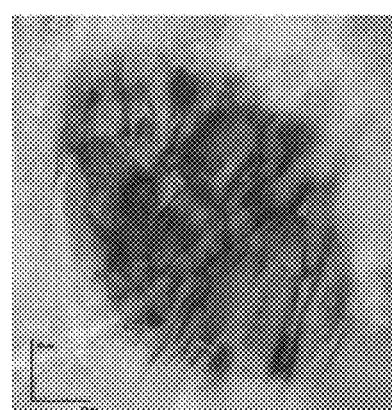
Figures 1, 14D:
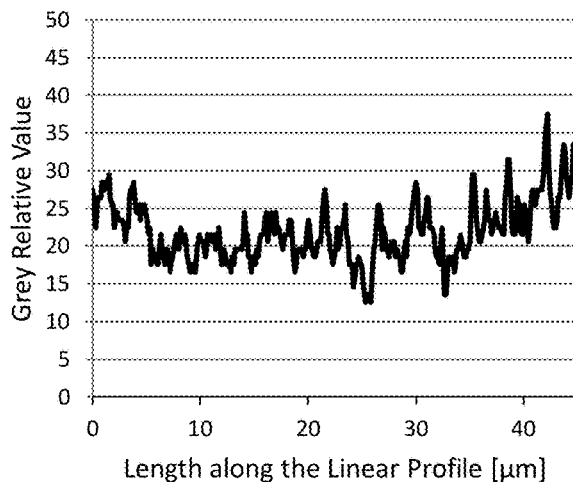
Figures 2, 14D:
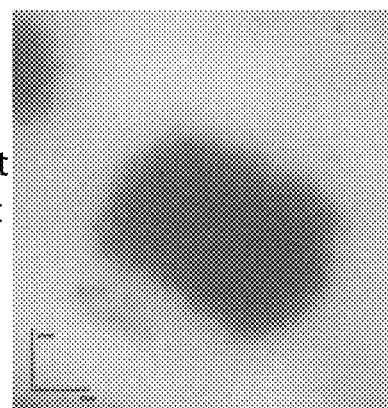
Figures 1, 14E:
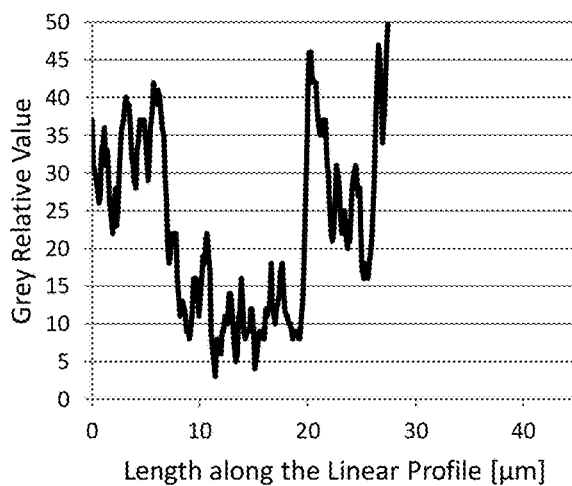
Figures 2, 14E:
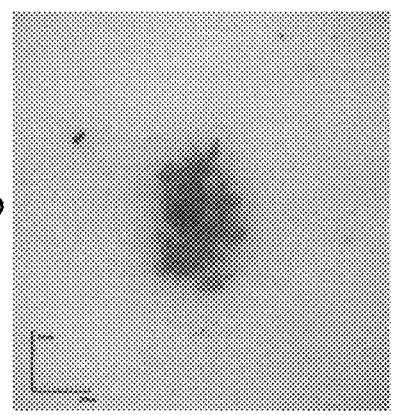
Figures 1, 14F:
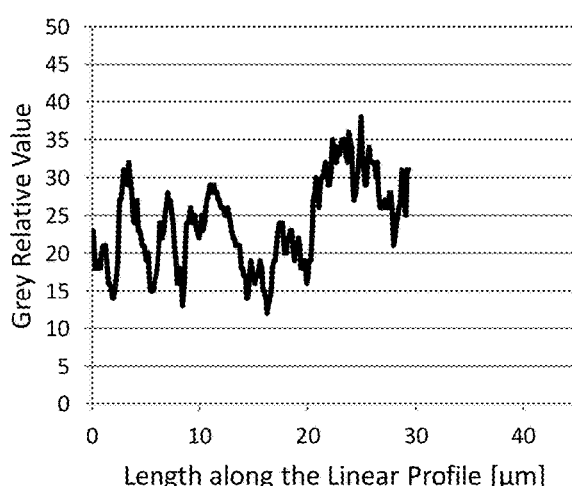
Figures 2, 14F:
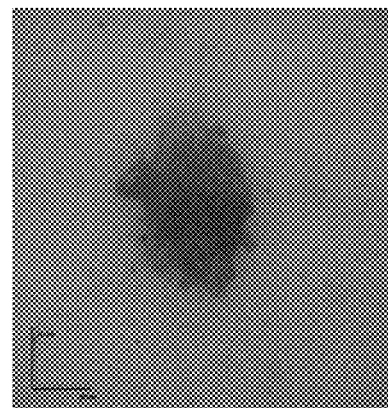
Figures 3, 14A:
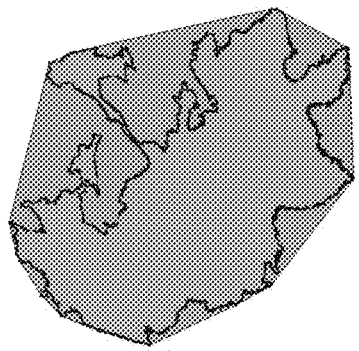
Figures 3, 14D:
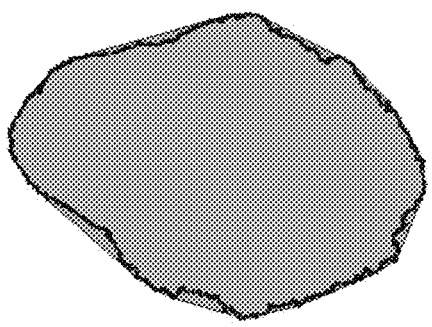
Figures 3, 14B:
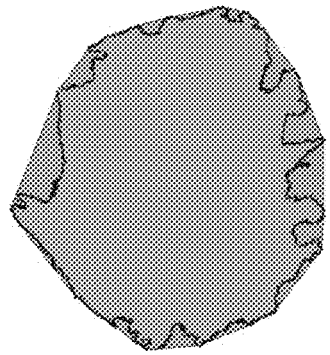
Figures 3, 14E:
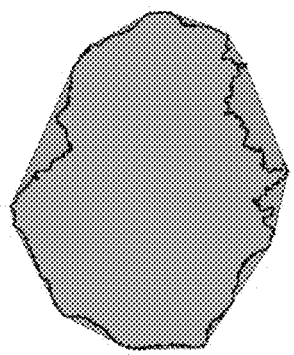
Figures 3, 14C:
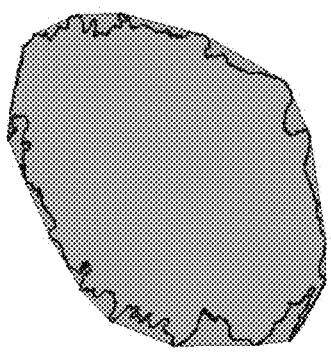
Figures 3, 14F:
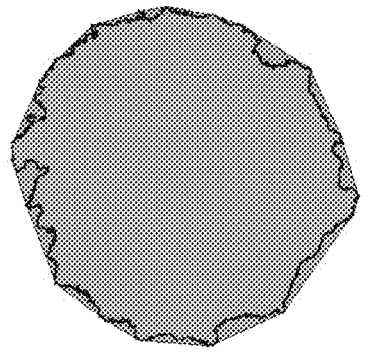

In FIGS. 14A-2 to 14F2, exemplary magnified ink film images disposed on uncoated and coated substrates are provided for the following printers: direct inkjet: HP DeskJet 9000 (uncoated: FIG. 14A-2; coated: FIG. 14D-2); digital press: HP Indigo 7500 (uncoated: FIG. 14B-2; coated: FIG. 14E-2); and lithographic offset: Ryobi 755 (uncoated: FIG. 14C-2; coated: FIG. 14F-2).

FIGS. 12A-2 to 12E-2 provide magnified views of ink films disposed on coated paper (12A-2 to 12C-2) and uncoated paper (12D-2 and 12E-2), according to the present invention. These ink film images were obtained generally according to the image acquisition method detailed hereinabove.

Quantitative analysis of the deviation from roundness (ER-1) is provided hereinbelow.

Convexity

As previously described, the ink dots or films of the prior art may characteristically have a plurality of protrusions or rivulets, and a plurality of inlets or recesses. These ink forms may be irregular, and/or discontinuous. By sharp contrast, the inkjet ink film produced according to the present invention characteristically has a manifestly rounded, convex, circular shape. Dot convexity, or deviation therefrom, is a structural parameter that may be used to evaluate or characterize shapes, or optical representations thereof.

The image acquisition method may be substantially identical to that described hereinabove.

Convexity Measurement

The dot images were loaded to the image-processing software (ImageXpert). Each image was loaded in each of the Red, Green and Blue channels. The processing channel was selected based on a highest visibility criterion. For example, for cyan dots, the Red channel typically yielded the best dot feature visibility, and was thus selected for the image processing step; the Green channel was typically most suitable for a magenta dot. The dot edge contour was detected (automatically computed), based on a single threshold. Using a "full screen view" mode on a 21.5" display, this threshold was chosen manually for each image, such that the computed edge contour would best match the real and visible dot edge. Since a single image-channel was processed, the threshold was a gray value (from 0 to 255, the gray value being a non color value).

A MATLAB script was created to compute the ratio between the area of the minimal convex shape that bounds the dot contour and the actual area of the dot. For each ink dot image, the (X,Y) set of points of the dot edge contour, created by ImageXpert, was loaded to MATLAB.

In order to reduce the sensitivity of measurement to noise, the dot edge was passed through a Savitzky-Golay filter (image-processing low-pass filter) to slightly smooth the edge contour, but without appreciably modifying the raggedness characteristic thereof. A window frame size of 5 pixels was found to be generally suitable.

Subsequently, a minimal-area convex shape was produced to bound the smoothed edge contour. The convexity ratio between the convex shape area (CSA) and the actual (calculated) dot or film area (AA) was then computed as follows:

$$CX=AA/CSA$$

The deviation from this convexity ratio, or "non-convexity", is represented by 1-CX, or $DC_{dot}$.

Quantitative analysis of this non-convexity is provided hereinbelow.

Field of View

On both commodity-coated and uncoated fibrous substrates, the ink dots in the ink dot constructions of the present invention may exhibit consistently good shape properties (e.g., convexity, roundness, edge raggedness, and the like), irrespective, to a large degree, of the particular, local topographical features of the substrate, and irrespective, to some degree, of the type of printing substrate (coated or uncoated printing substrates, plastic printing substrates, etc.). By contrast, the quality of ink dots in various known printing technologies, and in direct aqueous inkjetting technologies in particular, may vary appreciably with the type of printing substrate, and with the particular, local topographical features of the substrate.

Using a more robust, statistical approach, however, may better distinguish between the inventive ink dot constructions with respect to ink dot constructions of the art. Thus, in some embodiments of the present invention, the ink dot constructions may be characterized as a plurality of ink dots disposed on the substrate, within a representative field of view. Assuming the characterization of the dot is obtained through image processing, a field of view contains a plurality of dot images, of which at least 10 dot images are suitable for image processing. Both the field of view and the dot images selected for analysis are preferably representative of the total population of ink dots on the substrate (e.g., in terms of dot shape).

Procedure

A printed sample, preferably containing a high incidence of single ink dots, is scanned manually on the LEXT microscope, using a ×20 magnification to obtain a field that includes at least 10 single dots in a single frame. Care should be taken to select a field whose ink dot quality is fairly representative of the overall ink dot quality of the printed sample.

Each dot within the selected frame is analyzed separately. Dots that are "cleaved" by the frame margins (which may be considered a square geometric projection) are considered to be part of the frame, and are analyzed. Any satellites and overlapping dots are excluded from the analysis. A "satellite" is defined as an ink dot whose area is less than 25% of the average dot area of the dots within the frame, for frames having a generally homogeneous dot size, or as an ink dot whose area is less than 25% of the nearest adjacent dot, for non-homogeneous frames.

Each distinct ink dot is subsequently magnified with a ×100 zoom, and image processing may be effected according to the procedure provided hereinabove with respect to the convexity and roundness procedures.

Results

Figure 13A:
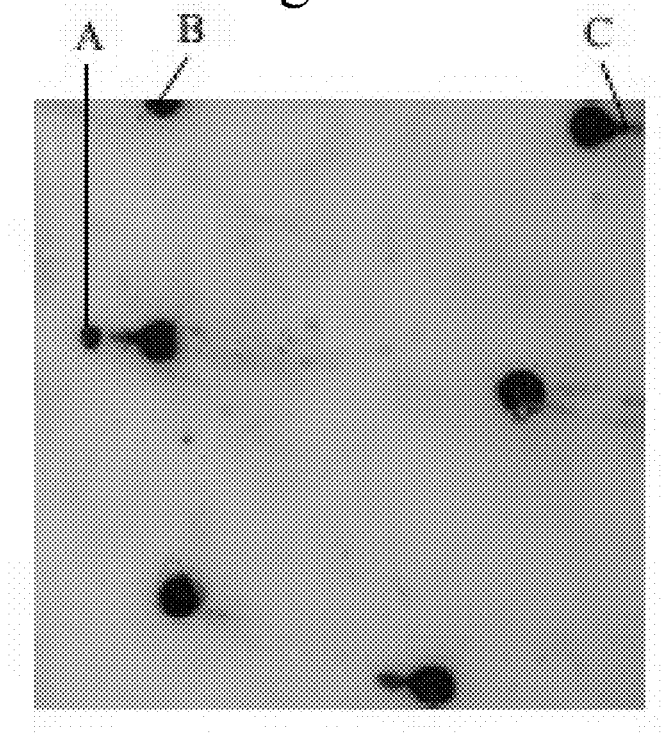
FIG. 13A provides a magnified view of a field of ink dots on a commodity-coated fibrous substrate, produced using a commercially available, aqueous, direct inkjet printer.
Figure 13B:
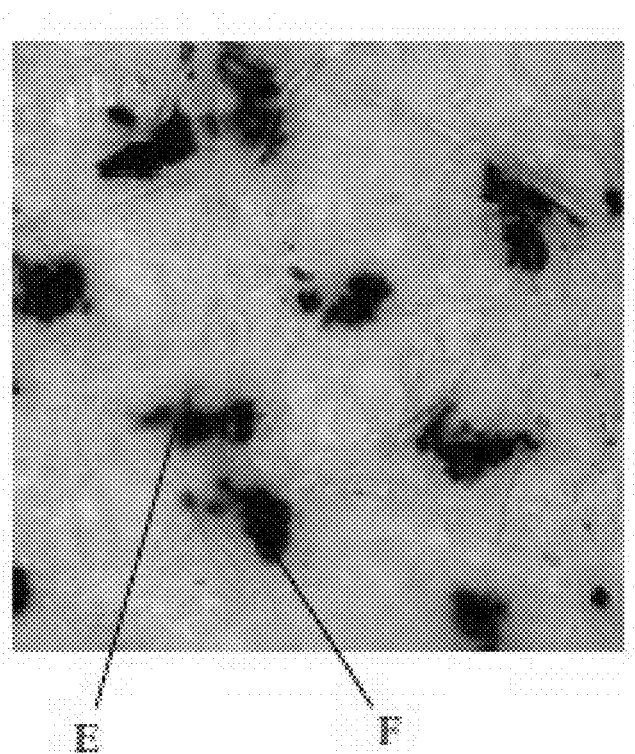
FIG. 13B provides a magnified view of a field of ink dots on an uncoated fibrous substrate, produced using the identical, commercially available, aqueous, direct inkjet printer.

FIG. 13A provides a magnified view of a field of ink dots on a commodity-coated fibrous substrate (Arjowiggins coated recycled gloss, 170 gsm), produced using a commercially available, aqueous, direct inkjet printer. FIG. 13B provides a magnified view of a field of ink dots on an uncoated fibrous substrate (Hadar Top uncoated-offset 170 gsm), produced using the identical, commercially available, aqueous, direct inkjet printer. Although technically, the frame of FIG. 13A does not qualify as a "field" of ink dots, such fields requiring at least 10 single dots within a single frame, the frames are provided, and the dots are characterized, for illustrative purposes.

In FIG. 13A, ink image A is a satellite, and is excluded from the analysis. Dot B is cleaved by the frame margin, and is included in the analysis (i.e., the full ink dot is analyzed). Tail or projection C is considered to be part of the ink dot disposed to its left. Thus, the field contains only 6 ink dots for image processing.

With regard to FIG. 13B, it became evident, only at high magnification, that dots E and F are distinct individual dots. While several splotches are reasonably round and well-formed, most of the splotches display poor roundness and convexity, have poorly-defined edges, and appear to contain multiple ink centers that are associated or weakly associated.

FIGS. 12A-1 to 12E-1 provide a magnified view of a field of ink dots or films on commodity-coated fibrous substrates (FIGS. 12A-1 to 12C-1) and uncoated fibrous substrates (FIGS. 12D-1 and 12E-1), produced in accordance with the present invention. The printed image was prepared by jetting an ink, corresponding to Example 29, on a blanket having a release layer comprising a condensation cured silanol terminated polydimethylsiloxane. The blanket was heated to about 70° C. and was pre-treated with a conditioning solution comprising PEI subsequently removed and evaporated, as already described for the basic transferability test. A black ink corresponding to Example 29 was jetted upon the treated release layer using a traditional ink jet head at a resolution of 600×1200 dpi (providing an average drop volume of 9 pL) to form an ink image of varying ink coverage/dot density. The relative speed of the blanket relative to the print bars was 0.5 m/sec. The ink image was dried at 200° C. for up to 5 seconds and the dried image transferred to the substrates indicated in the table below and in FIGS. 12A-1 to 12E-3, by application of manual pressure.

FIGS. 12A-2 to 12E-2 provide further magnified views of a portion of the frames of FIGS. 12A-1 to 12E-1, in which the magnified views of the ink films disposed on commodity-coated paper are provided in FIGS. 12A-2 to 12C-2, and the magnified views of the ink films disposed on uncoated paper are provided in FIGS. 12D-2 and 12E-2.

It is manifest from a comparison of the figures that the fields of ink dots in the inventive ink constructions exhibit superior dot shape (roundness, convexity, and edge definition) and average dot shape, with respect to the prior-art fields provided in FIGS. 13A and 13B. In fact, the field of ink dots provided in FIG. 12D-1, in which the uncoated substrate is the most coarse and challenging, the inventive ink construction exhibits superior dot shape and average dot shape, relative to the prior-art field (FIG. 13A) in which the substrate is a relatively smooth, coated substrate.

That which is readily observed by the human eye may be quantified using the image-processing techniques and field-of-view processing procedures provided above.

TABLE 1

Inventive Ink Dot Constructions -- Field of View

| Manufacturer Name | Brand Name or Paper Type | GSM | ER-1 | 1-CX | Optical Uniformity (Standard Deviation) |
|---|---|---|---|---|---|
| SAPPI | MAGNO Gloss Star | 170 | 0.096 | 0.0044 | 2.01 |
| SAPPI | MAGNO Satin | 170 | 0.126 | 0.0055 | 2.21 |

TABLE 1-continued

Inventive Ink Dot Constructions -- Field of View

| Manufacturer Name | Brand Name or Paper Type | GSM | ER-1 | 1-CX | Optical Uniformity (Standard Deviation) |
|---|---|---|---|---|---|
| DALUM | DALUM Gloss Recycled | 250 | 0.110 | 0.0046 | 2.65 |
| Fedrigoni | Uncoated | 400 | 0.305 | 0.0220 | 4.70 |
| UPM Fine | Offset Uncoated | 250 | 0.276 | 0.0180 | 4.62 |

TABLE 2

Prior Art Ink Dot Constructions -- Field of View

| Substrate Type | ER-1 | 1-CX | Optical Uniformity (Standard Deviation) |
|---|---|---|---|
| Coated Paper | 0.943 | 0.085 | 4.0 |
| Uncoated Paper | 3.347 | 0.253 | 19.1 |

These exemplary results have been confirmed on several additional fibrous substrates, both commodity-coated and uncoated.

For all tested commodity-coated fibrous substrates, fields of the ink dot construction according to the present invention exhibited a mean non-convexity of at most 0.05, at most 0.04, at most 0.03, at most 0.025, at most 0.020, at most 0.015, at most 0.012, at most 0.010, at most 0.009, or at most 0.008.

For all tested uncoated fibrous substrates, fields of the ink dot construction according to the present invention exhibited a mean non-convexity of at most 0.085, at most 0.07, at most 0.06, at most 0.05, at most 0.04, at most 0.03, at most 0.025, at most 0.020, at most 0.018, or at most 0.015.

In some embodiments, the field non-convexity is at least 0.0005, at least 0.001, at least 0.002, at least 0.003, or at least about 0.004. In some cases, and particularly for uncoated fibrous substrates, the field or mean non-convexity may be at least 0.05, at least 0.07, at least 0.10, at least 0.12, at least 0.15, at least 0.16, at least 0.17, or at least 0.18.

For all tested commodity-coated fibrous substrates, fields of the ink dot construction according to the present invention exhibited a mean deviation from roundness of at most 0.60, at most 0.50, at most 0.45, at most 0.40, at most 0.35, at most 0.30, at most 0.25, at most 0.20, at most 0.17, at most 0.15, at most 0.12, or at most 0.10.

For all tested uncoated fibrous substrates, fields of the ink dot construction according to the present invention exhibited a mean deviation from roundness of at most 0.85, at most 0.7, at most 0.6, at most 0.5, at most 0.4, at most 0.35, at most 0.3, at most 0.25, at most 0.22, or at most 0.20.

In some embodiments, the mean deviation from roundness is at least 0.010, at least 0.02, at least 0.03, or at least about 0.04. In some cases, the deviation from roundness may be at least 0.05, at least 0.07, at least 0.10, at least 0.12, at least 0.15, at least 0.16, at least 0.17, or at least 0.18.

While the above-described non-convexity and deviation from roundness values are for fields having at least 10 dots suitable for evaluation, they further apply to fields having at least 20, at least 50, or at least 200 of such suitable dots. Moreover, the inventors have found that the distinction between both the non-convexity values and deviation from roundness values of the inventive ink dot constructions vs. the prior-art ink dot constructions becomes even more statistically significant with increasing field size.

For plastic substrates, the fields of the ink dot construction according to the present invention can exhibit a mean non-convexity of at most 0.075, at most 0.06, at most 0.05, at most 0.04, at most 0.03, at most 0.025, at most 0.020, at most 0.015, at most 0.012, at most 0.010, at most 0.009, or at most 0.008; the fields of the ink dot construction according to the present invention may exhibit a mean deviation from roundness of at most 0.8, at most 0.7, at most 0.6, at most 0.5, at most 0.4, at most 0.35, at most 0.3, at most 0.25, at most 0.20, at most 0.18, or at most 0.15. Smooth plastics, such as atactic polypropylene and various polyesters, typically exhibit a mean deviation from roundness of at most 0.35, at most 0.3, at most 0.25, at most 0.20, at most 0.18, at most 0.15, at most 0.12, at most 0.10, at most 0.08, at most 0.06, at most 0.05, at most 0.04, or at most 0.035.

Optical Uniformity

The ink film images provided in FIGS. 5A and 5B are not optically uniform. Generally, the ink film images disposed on uncoated paper are less optically uniform than the corresponding ink film images disposed on coated paper.

Furthermore, it can be observed that the inventive ink dots exhibit superior optical uniformity in comparison with the various prior-art ink forms. This appears to hold for both uncoated and coated printed substrates. That which is readily observed by the human eye may be quantified using image-processing techniques. The method of measuring ink dot uniformity is provided below.

Optical Uniformity Measurement

The dot images are loaded to the ImageXpert Software, preferably using the statistical rules provided hereinabove. Each image is loaded in each of the Red, Green and Blue channels. The channel selected for the image processing is the channel exhibiting the highest visible details, which include the dot contour and color variance within the dot area, and the substrate surface fibrous structure. For example, the Red channel is typically most suitable for a cyan dot, while the Green channel is typically most suitable for a magenta dot.

For each of the selected dots, a line profile (preferably 3 line profiles for each of the at least 10 most representative dots) is measured across the dot area, crossing through the center of the dot. Since the line profile is measured on a single channel, gray values (0-255, non color values) are measured. The line profiles are taken across the center of the dot and cover only the inner two thirds of the dot diameter, to avoid edge effects. The standard for sampling frequency is about 8 optical measurements along the line profile (8 measured gray values evenly spaced along each micrometer, or 125 nm+/−25 nm per measurement along the line profile), which was the automatic frequency of the ImageXpert Software, and which was found to be suitable and robust for the task at hand.

The standard deviation (STD) of each of the line profiles is computed, and multiple line-profile STDs for each type of printed image are averaged into a single value.

FIGS. 14A-1 to 14F-2 provide images of ink splotches or dots obtained using various printing technologies, and optical uniformity profiles therefor. More specifically, FIGS. 14A-2 to 14C-2 provide ink dot images disposed on uncoated paper, for the following printing technologies: HP DeskJet 9000 (FIG. 14A-2); Digital press: HP Indigo 7500 (FIG. 14B-2); and Offset: Ryobi 755 (FIG. 14C-2). Similarly, FIGS. 14D-2 to 14F-2 provide ink dot images disposed on commodity coated paper, for those printing technologies.

FIGS. 14A-1 to 14F-1 provide the (non-color) gray relative value as a function of the position on the line passing through the center of the ink dot image, for each of the ink dot images provided by FIGS. 14A-2 to 14C-2 (on uncoated paper), and by FIGS. 14D-2 to 14F-2 (on coated paper), for those printing technologies.

FIGS. 14A-3 to 14-F3 provide the contour analysis of these dots on uncoated and coated substrates as obtained by the afore-mentioned printing technology of the art. The contour profile are used for the calculation of the convexity characteristics of the printed dots.

FIGS. 12A-3 to 12E-3, respectively, provide graphs plotting the (non-color) gray relative value as a function of the position on the line passing through the center of the ink dot image, for each of the ink dot images provided by FIGS. 12A-3 to 12C-3 (on coated paper), and by 12D-3 to 12E-3 (on uncoated paper). A relatively flat linear profile for a particular ink dot image indicates high optical uniformity along the line.

The results would appear to confirm that the ink dots disposed on the uncoated fibrous printing substrates exhibit poorer uniformity with respect to the corresponding ink dots disposed on the coated fibrous printing substrates.

Moreover, for uncoated substrates, the line profile of the inventive ink film produced by the inventive system and process had an average STD of about 4.7, which compares favorably to the STD achieved using the prior art technology (19). For coated substrates, the line profile of the inventive ink dot produced by the inventive system and process produced an STD of about 2 to 2.7, which compares favorably, though less strikingly so, to the STD achieved using the prior art technology (4).

When comparing between films or dots on coated papers, the average of each of the standard deviations (STD) of the dot profiles of the present invention was always below 3.5. More generally, the STD of the dot profiles of the present invention is less than 3.2, less than 3.0, less than 2.9, or less than 2.8.

In comparing between films or dots on uncoated papers, the standard deviation (STD) of the dot profiles of the present invention was always below 6. More generally, the STD of the dot profiles of the present invention is less than 15, less than 12, less than 10, less than 8, less than 7, or less than 6.

Because, as noted above, ink images may contain an extremely large plurality of individual or single ink dots (at least 20, at least 100, at least 1,000, at least 10,000, or at least 100,000), it may be meaningful to statistically define the inventive ink dot constructions wherein at least 10%, at least 20%, or at least 30%, and in some cases, at least 50%, at least 70%, or at least 90%, of the inventive ink dots (or inventive single-drop ink dots), disposed on any uncoated or coated (or commodity-coated) fibrous substrate, exhibit the above-mentioned standard deviations for uncoated papers and for commodity-coated papers.

Penetration

In the ink film constructions of the present invention, the ink dot may essentially be laminated onto a top surface of the printing substrate. As described herein, the form of the dot may be determined or largely determined prior to the transfer operation, and the dot is transferred as an integral unit to the substrate. This integral unit may be substantially devoid of solvent, such that there may be no penetration of any kind of material from the blanket transfer member into, or between, substrate fibers. The continuous dot, which may largely contain organic polymeric resin and colorant, adheres to, or forms a laminated layer on, the top surface of the fibrous printing substrate.

Such continuous dots are typically produced by various inkjetting technologies, such as drop-on-demand and continuous jetting technologies.

Figure 16A:
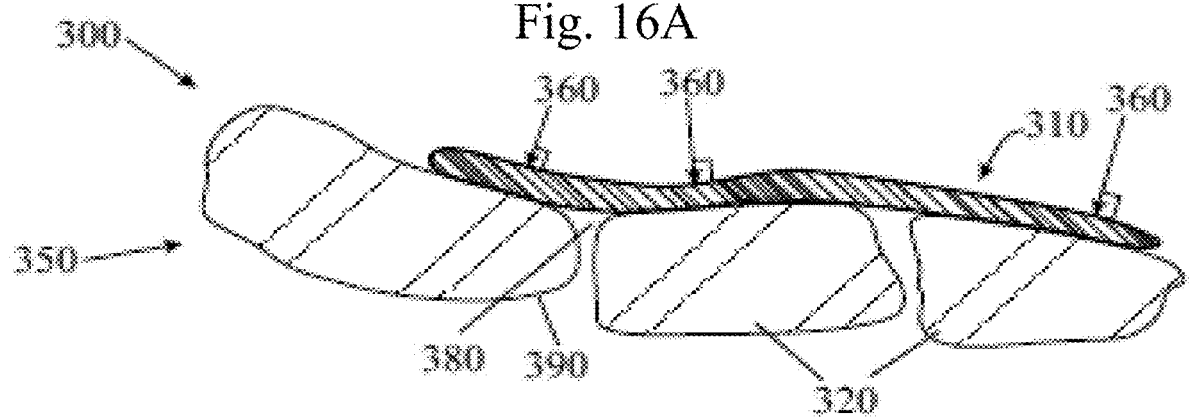
FIGS. 16A and 16B provide respective schematic cross-sectional views of an inventive ink film construction and an inkjet ink dot construction of the prior art, wherein the substrate is a fibrous paper substrate.
Figure 16B:
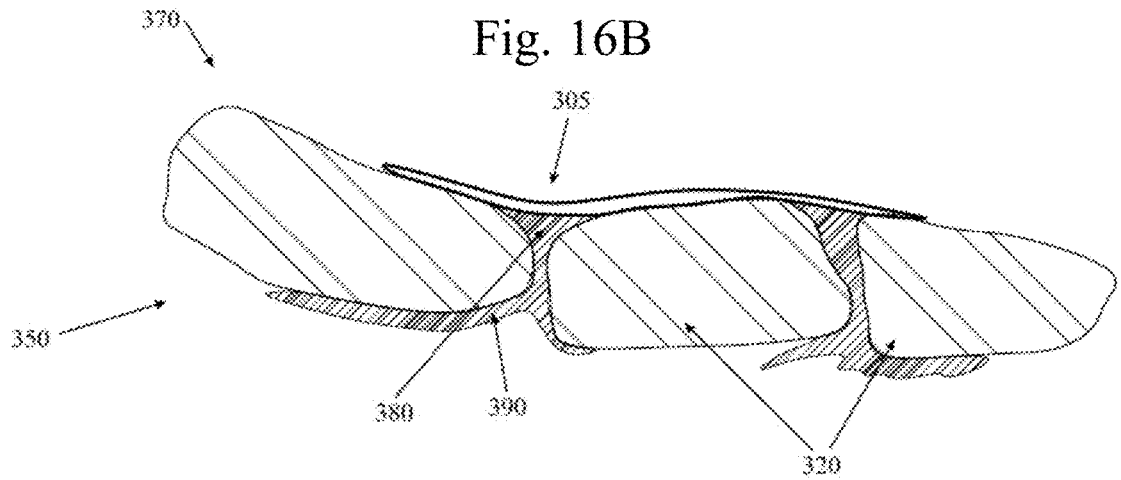

Referring again to the drawings, FIGS. 16A and 16B provide schematic cross-sectional views of an inventive ink film construction 300 and an inkjet ink splotch or film construction 370 of the prior art, respectively. Referring now to FIG. 16B, inkjet ink film construction 370 includes a single-drop ink splotch 305 adhering to, or laminated to, a plurality of substrate fibers 320 in a particular continuous area of a fibrous printing substrate 350. Fibrous printing substrate 350 may be, by way of example, an uncoated paper such as bond, copy, or offset paper. Fibrous printing substrate 350 may also be one of various commodity coated fibrous printing substrates, such as a coated offset paper.

A portion of ink splotch 305 is disposed below the top surface of substrate 350, between fibers 320. Various components of the ink, including a portion of the colorant, may penetrate the top surface along with the ink carrier solvent, to at least partially fill a volume 380 disposed between fibers 320. As shown, a portion of the colorant may diffuse or migrate underneath fibers 320, to a volume 390 disposed beneath fibers 320. In some cases (not shown), some of the colorant may permeate into the fibers.

By sharp contrast, inventive ink film construction 300, provided in FIG. 16A, includes an integral continuous ink dot such as individual ink dot 310, disposed on, and fixedly adhering (or laminated) to, a top surface of a plurality of substrate fibers 320, in a particular continuous area of fibrous printing substrate 350. The adhesion or lamination may be, primarily or substantially, a physical bond. The adhesion or lamination may have little, or substantially no, chemical bonding character or more specifically, no ionic bonding character.

Ink dot 310 contains at least one colorant dispersed in an organic polymeric resin. Within the particular continuous area of fibrous substrate 350, there exists at least one direction (as shown by arrows 360—several directions) perpendicular to the top surface of printing substrate 350. With respect to all the directions normal to this top surface over all of the dot area, ink dot 310 is disposed entirely above the area. The volume 380 between fibers 320 and the volume 390 underneath fibers 320 are devoid, or substantially devoid, of colorant, resin, and any and all components of the ink.

The extent of penetration of an ink into a printing substrate may be quantitatively determined using various analytical techniques, many of which will be known to those of ordinary skill in the art. Various commercial analytical laboratories may perform such quantitative determination of the extent of penetration.

These analytical techniques include the use of various staining techniques such as osmium tetroxide staining (see Patrick Echlin, "Handbook of Sample Preparation for Scanning Electron Microscopy and X-Ray Microanalysis" (Springer Science+Business Media, LLC 2009, pp. 140-143).

One alternative to staining techniques may be particularly suitable to inks containing metals such as copper. Time of Flight Secondary Ion Mass Spectrometry (TOF-SIMS) was performed using a TOF-SIMS V Spectrometer [Ion-ToF (Munster, Germany)]. This apparatus provides elemental and molecular information with regard to the uppermost layer of organic and inorganic surfaces, and also provides depth profiling and imaging having depth resolution on the nanometric scale, submicrometer lateral resolution and chemical sensitivity on the order of 1 ppm.

Translation of the raw data of the TOF-SIMS into concentration may be performed by normalizing the signals obtained to the carbon (C+) concentration measured by X-ray Photoelectron Spectroscopy (XPS), in the sample. The XPS data was obtained using a Thermo VG Scientific Sigma Probe (England). Small area chemical analysis of solid surfaces with chemical bonding information was obtained by using a microfocused (from 15 to 400 µm) monochromated x-ray source. Angle resolved information is obtained with and without tilting the sample. This enables depth profiling with good depth resolution.

As a baseline, the atomic concentration of copper within a fibrous paper substrate was measured, as a function of depth. The atomic concentration of copper was found to be substantially zero at the surface, down to a depth of several micrometers. This procedure was repeated for two cyan-colored inkjet ink film constructions of the prior art, and for a cyan-colored ink film construction of the present invention.

Measurements of the atomic concentration of copper [Cu] within the ink dot and within the fibrous paper substrate, as a function of the approximate depth, within a first cyan-colored inkjet ink film construction of the prior art, were performed as described above. The initial [Cu], measured near the top surface of the cyan-containing ink film construction, was approximately 0.8 atomic %. Within a depth of about 100 nm, [Cu] dropped steadily to about 0.1 atomic %. Over a depth range of about 100 nm-1,000 nm, [Cu] dropped from about 0.1 atomic % to about zero. Thus, it is evident that the inkjet ink pigment has penetrated into the fibrous paper substrate, possibly attaining a penetration depth of at least 700 nm, at least 800 nm, or at least 900 nm.

Additional measurements of the atomic concentration of copper within the ink dot construction, as a function of the approximate depth, within a second cyan-colored inkjet ink film construction of the prior art, led to the following findings: the initial atomic concentration of copper [Cu] within the ink dot construction, measured near the top surface, was approximately 0.02 atomic %. This concentration was generally maintained over a depth of about 3,000 nm. Over a depth range of about 3,000 nm to almost 6,000 nm, [Cu] dropped very gradually to about 0.01 atomic %. It would appear that this prior-art construction has little or no ink film on the surface of the substrate, and that penetration of the pigment into the substrate was pronounced (at least 5-6 micrometers).

In view of the fundamental nature of the inventive laminated film transfer technology, described hereinabove (particularly with regard to FIGS. 16A and 16B) and in view of atomic concentration of copper [Cu] measurements performed by the inventors on similar ink film constructions, it is would appear manifest that the ink films of the inventive constructions are substantially solely disposed on the surface of the substrate, and that pigment penetration into the substrate is substantially negligible, both in terms of penetration depth and in terms of the penetration quantity or fraction.

Film Height or Thickness

Instrumentally measured heights (H) or thicknesses of single-film ink dots or splotches were obtained using a measuring laser microscope (Olympus LEXT 3D, model OLS4000). The LEP specimens typically had a height or thickness within a range of 900-1150 nm; the lithographic offset specimens typically had a height or thickness within a range of 750-1200 nm.

With regard to ink dots or films produced from jetted ink drops, we have found that the maximum average supra-substrate thickness of the ink dot may be calculated from the following equation:

$$T_{AVG(MAX)} = V_{DROP}/[A_{FILM} * R_{VOL}] \quad (I)$$

wherein:

$T_{AVG(MAX)}$ is the maximum average supra-substrate thickness;

$V_{DROP}$ is the volume of the jetted drop, or a nominal or characteristic volume of a jetted drop (e.g., a nominal volume provided by the inkjet head manufacturer or supplier);

$A_{FILM}$ is the measured or calculated area of the ink dot; and $R_{VOL}$ is a dimensionless ratio of the volume of the original ink to the volume of the dried ink residue produced from that ink.

By way of example, an ink dot disposed on a plastic printing substrate has an area of 1075 square micrometers. The nominal size of the jetted drop is 10.0±0.3 picoliters. $R_{VOL}$ was determined experimentally: a vessel containing 20.0 ml of the ink was heated at 130° C. until a dry residue was obtained. The residue had a volume of 1.8 ml. Plugging into Equation (I), $T_{AVG(MAX)}$=10 picoliters/[1075 µm²*(20.0/1.8)]=837 nm.

For generally round ink dots, the area of the ink dot may be calculated from the ink dot diameter. Moreover, it was found that the dimensionless ratio $R_{VOL}$ is generally about 10 for a wide variety of inkjet inks.

While for inks that penetrate into the substrate, the actual average thickness may be somewhat less than $T_{AVG(MAX)}$, this calculation may reliably serve as an upper bound for the average thickness. Moreover, in the case of various plastic substrates, and in the case of various premium coated substrates, the maximum average supra-substrate thickness may substantially equal the average supra-substrate thickness. In the case of various commodity-coated substrates, the maximum average supra-substrate thickness may approach the average supra-substrate thickness, often within 100 nm, 200 nm, or 300 nm.

With regard to ink dots or films produced from jetted ink drops, it was found that the maximum average supra-substrate thickness of the ink dot may be calculated from the following equation:

$$T_{AVG(MAX)} = [V_{DROP} * \rho_{INK} * F_{nRESIDUE}]/[A_{FILM} * \rho_{FILM}] \quad (II)$$

wherein:

$\rho_{INK}$ is the specific gravity of the ink;

$F_{nRESIDUE}$ is the weight of the dried ink residue divided by the weight of the original ink; and $\rho_{FILM}$ is the specific gravity of the ink.

Typically, the ratio of pINK to pFILM is approximately 1, such that Equation (II) may be simplified to:

$$T_{AVG(MAX)} = [V_{DROP} * F_{nRESIDUE}]/A_{FILM} \quad (III)$$

For a wide variety of aqueous ink jet inks, $F_{nRESIDUE}$ roughly equals the weight fraction of solids in the ink jet ink.

Using the above-described Olympus LEXT 3D measuring laser microscope, the height of above the substrate surface was measured for various ink dot constructions.

Atomic Force Microscopy (AFM) is another, highly accurate measurement technique for measuring height and determining ink dot thickness on a substrate. AFM measurements may be performed using commercially available apparatus, such as a Park Scientific Instruments Model Autoprobe CP, Scanning Probe Microscopy equipped with Proscan version 1.3 software (or later). The use of AFM is described in depth in the literature, for example, by Renmei Xu, et al., "The Effect of Ink Jet Papers Roughness on Print Gloss and Ink Film Thickness" [Department of Paper Engineering, Chemical Engineering, and Imaging Center for Ink and Printability, Western Michigan University (Kalamazoo, Mich.)].

With regard to the ink film constructions of the present invention, the inventors have found that the thickness of the dry ink film on the substrate may be adjusted by modifying the inkjet ink formulation. To obtain a lower dot thickness, such modifying may entail at least one of the following:

reducing the resin to pigment ratio;
selecting a resin or resins enabling adequate film transfer, even with a reduced resin to pigment ratio;
utilizing finer pigment particles;
reducing the absolute quantity of pigment.

To obtain thicker dots, at least one of the opposite modifications (e.g., increasing the resin to pigment ratio) may be made.

Such changes in the formulation may necessitate, or make advantageous, various modifications in the process operating conditions. The inventors have found that lower resin to pigment ratios may require a relatively high transfer temperature.

For a given inkjet ink formulation, an elevated transfer temperature may reduce ink film thickness. Increased pressure of the pressure roller or cylinder toward the impression cylinder during the transfer of the residue film to a substrate at the impression station may also reduce ink film thickness. Also, ink film thickness may be reduced by increasing the time of contact between the substrate and the intermediate transfer member, interchangeably termed herein an "image transfer member" and both abbreviated ITM.

All this notwithstanding, a practical minimum characteristic (i.e., median) thickness or average thickness for ink films produced according to the present invention may be about 100 nm. More typically, such ink films are single-drop ink films having a dot thickness, average dot thickness, or height (of the top surface of the dot) with respect to the substrate of at least 125 nm, at least 150 nm, at least 175 nm, at least 200 nm, at least 250 nm, at least 300 nm, at least 350 nm, at least 400 nm, at least 450 nm, or at least 500 nm.

Using the above-provided film thickness guidelines, the inventors are able to obtain inventive film constructions having an average thickness of at least 600 nm, at least 700 nm, at least 800 nm, at least 1,000 nm, at least 1,200 nm, or at least 1,500 nm. The characteristic thickness or average thickness of a single drop film (or an individual ink dot) may be at most about 2,000 nm, at most 1,800 nm, at most 1,500 nm, at most 1,200 nm, at most 1,000 nm, or at most 900 nm. More typically, the characteristic thickness or average thickness of a single drop film may be at most 800 nm, at most 700 nm, at most 650 nm, at most 600 nm, at most 500 nm, at most 450 nm, at most 400 nm, or at most 350 nm.

Using the film thickness guidelines delineated hereinabove, the inventors are able to obtain inventive film constructions in which a characteristic thickness or average thickness of the ink film may be within a range of 100 nm, 125 nm or 150 nm up to 1,800 nm, 1,500 nm, 1,200 nm, 1,000 nm, 800 nm, 700 nm, 600 nm, 550 nm, 500 nm, 450 nm, 400 nm, or 350 nm. More typically, the characteristic thickness or average thickness of the ink film may be within a range of 175 nm, 200 nm, 225 nm or 250 nm up to 800 nm, 700 nm, 650 nm, 600 nm, 550 nm, 500 nm, 450 nm, or 400 nm. Suitable optical density and optical uniformity may be obtained, using the system, process, and ink formulations of the present invention.

The thickness ($H_{dot}$) of single-drop ink film or individual ink dot (shown schematically as dot 310 in FIG. 16A) may be at most 1,800 nm, at most 1,500 nm, at most 1,200 nm, at most 1,000 nm, or at most 800 nm, and more typically, at most 650 nm, at most 600 nm, at most 550 nm, at most 500 nm, at most 450 nm, or at most 400 nm. The thickness ($H_{dot}$) of single-drop ink dot 310 may be at least 50 nm, at least 100 nm, or at least 125 nm, and more typically, at least 150 nm, at least 175 nm, at least 200 nm, or at least 250 nm.

Aspect Ratio

The inventors have found that the diameter of an individual ink dot in the ink film constructions of the present invention may be adjusted, inter alia, by selection of a suitable ink delivery system for applying the ink (e.g., jetting) onto the ITM, and by adjusting the ink formulation properties (e.g., surface tension) to the requirements of the particular ink head.

This ink film diameter, $D_{dot}$, or the average dot diameter on the substrate surface, $D_{dot}$ average, may be at least 10 micrometers, at least 15 μm, or at least 20 μm, and more typically, at least 30 μm, at least 40 μm, at least 50 μm, at least 60 μm, or at least 75 μm. $D_{dot}$ or $D_{dot\ average}$ may be at most 300 micrometers, at most 250 μm, or at most 200 μm, and more typically, at most 175 μm, at most 150 μm, at most 120 μm, or at most 100 μm.

Generally $D_{dot}$ or $D_{dot\ average}$ may be in the range of 10-300 micrometers, 10-250 μm, 15-250 μm, 15-200 μm, 15-150 μm, 15-120 μm, or 15-100 μm. More typically, with the currently used ink formulations, and a particular ink head, $D_{dot}$ or $D_{dot\ average}$ may be in the range of 20-120 μm, 20-120 μm, 20-100 μm, 20-80 μm, 20-60 μm, 20-50 μm, or 25-50 μm.

Each single-drop ink film or individual ink dot is characterized by a dimensionless aspect ratio defined by:

$$R_{aspect}=D_{dot}/H_{dot}$$

wherein $R_{aspect}$ is the aspect ratio; $D_{dot}$ is the longest diameter of the dot; and $H_{dot}$ is the average height of the top surface of dot with respect to the substrate.

The aspect ratio may be at least 15, at least 20, at least 25, or at least 30, and more typically, at least 40, at least 50, at least 60, at least 75. In many cases, the aspect ratio may be at least at least 95, at least 110, or at least 120. The aspect ratio is typically below 200 or below 175.

Surface Roughness

Using laser microscopy imaging and other techniques, the inventors have observed that the top surface of the ink dots in the ink film constructions of the present invention may be characterized by a low surface roughness, particularly when the substrates of those constructions have a high paper (or substrate) gloss.

Without wishing to be limited by theory, the inventors believe that the relative flatness or smoothness of the ink film constructions of the present invention may largely be attributed to the smoothness of the release layer on the surface of the ITM, and to the inventive system and process in which the emerging ink film surface substantially complements that of that surface layer, and in which the developing ink film image may substantially retain or completely retain that complementary topography through the transfer onto the printing substrate.

Figure 17A:
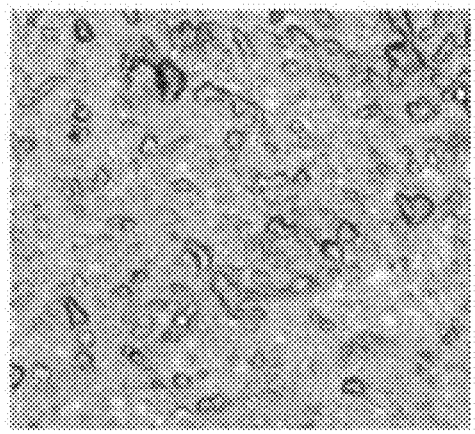
FIGS. 17A and 17C each show an image of the surface of the outer layer of an intermediate transfer member.
Figure 17B:
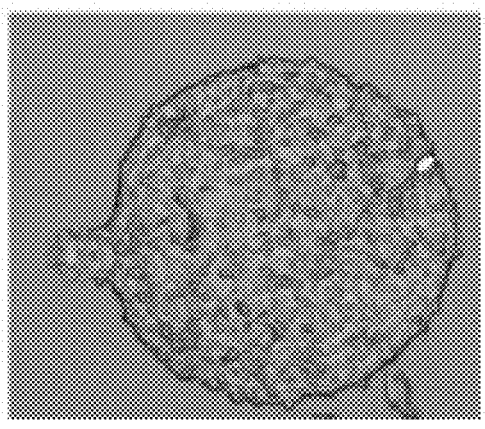
FIGS. 17B and 17D are corresponding images of the surface of the ink films produced using those outer layers, in accordance with the present invention.

Referring now to FIG. 17A, FIG. 17A is an image of the surface of a release layer of an ITM or blanket used in accordance with the present invention. While the surface may be nominally flat, various pockmarks (recesses) and protuberances, typically of the order of 1-5 μm, may be observed. Many of these marks have sharp, irregular features. An image of an ink dot surface produced using this blanket, provided in FIG. 17B, displays topographical features that are strikingly similar in nature to those shown in FIG. 17A. The dot surface is peppered with a large plurality of marks having sharp, irregular features, which strongly resemble (and are within the same size range as) the irregular marks in the blanket surface.

Figure 17C:
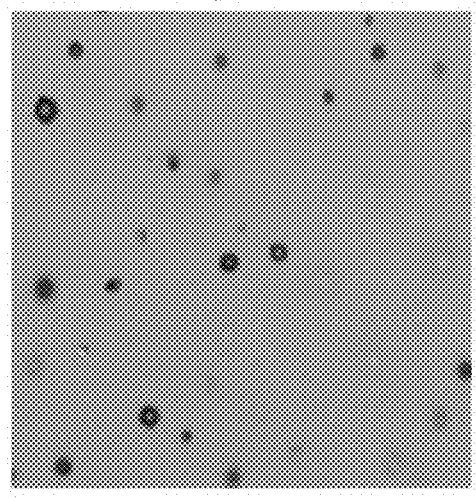
Figure 17D:
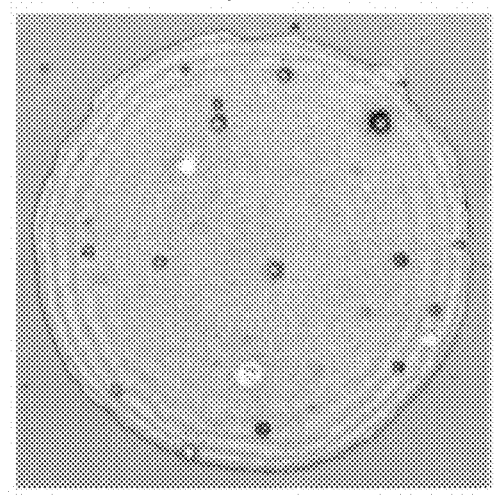

A smoother blanket was installed; FIG. 17C provides an image of the release layer of this blanket. The irregular pockmarks of FIG. 17A are conspicuously absent. Dispersed on the highly smooth surface are highly circular surface blemishes, perhaps made by air bubbles, typically having a diameter of about 1-2 μm. An image of an ink dot surface produced using this blanket, provided in FIG. 17D, displays topographical features that are strikingly similar in nature to those shown in FIG. 17C. This image has virtually no distinctive pockmarks, but has a number of highly circular surface blemishes that are strikingly similar in size and form to those shown of the blanket surface.

Plastic Substrates

In view of the afore-mentioned results as observed on various fibrous substrates, and in view of the fundamental nature of the inventive transfer technology, the ink dots of the present invention are expected to exhibit superior optical and shape properties, including roundness, convexity, edge raggedness, and surface roughness, on plastic printing substrates as well.

The non-convexity, or deviation from convexity for ink dots printed on a wide variety of plastic printing substrates, may typically be at most 0.020, at most 0.018, at most 0.016, at most 0.014, at most 0.012, or at most 0.010. At least some of the ink dots, can exhibit non-convexities of at most 0.008, at most 0.006, at most 0.005, at most 0.004, at most 0.0035, at most 0.0030, at most 0.0025, or at most 0.0020. On some substrates (e.g., polyester and atactic polypropylene substrates), typical ink dots may exhibit non-convexities of at most 0.006, at most 0.004, at most 0.0035, and even more typically, at most 0.0030, at most 0.0025, or at most 0.0020.

On all plastic substrates, individual ink dots in the ink dot constructions according to the present invention may exhibit a typical deviation from roundness of at most 0.8, at most 0.7, at most 0.6, at most 0.5, at most 0.4, at most 0.35, at most 0.3, at most 0.25, at most 0.20, at most 0.18, or at most 0.15. On various smooth plastics, such as atactic polypropylene and various polyesters, individual ink dots may exhibit a typical deviation from roundness of at most 0.35, at most 0.3, at most 0.25, at most 0.20, at most 0.18, at most 0.15, at most 0.12, at most 0.10, at most 0.08, at most 0.06, at most 0.05, at most 0.04, or at most 0.035.

Glass Transition Temperature of the Resin

The inventors have found that in selecting resins, and combinations of resins, for use within the formulations supporting the ink film constructions of the present invention, the softening temperature (or glass transition temperature for at least partially amorphous resins) may be a useful indicator of resin suitability. Specifically, the resins used in the ink formulations (and disposed in the ink films of the present invention) may have a glass transition temperature ($T_g$) of at least 42° C., at least 44° C., at least 46° C., at least 48° C., or at least 50° C. However, such resins may be too soft, which may negatively impact the abrasion resistance of the printed image, and may also be associated with stickiness and flowability of the image at near-ambient temperatures (e.g., around 40° C.). More significantly, such resins may cause clogging of the inkjet print heads, particularly when the blanket is hot and delivers heat to the jetting units. Thus, more typically, the Tg may be at least 52° C., at least 54° C., at least 56° C., at least 58° C., at least 60° C., at least 65° C., at least 70° C., at least 75° C., at least 80° C., at least 85° C., at least 90° C., or at least 95° C. The glass transition temperature is typically at most 120° C., at most 110° C., at most 105° C., or at most 100° C., and in some cases, at most 95° C., at most 90° C., or at most 85° C.

More generally, from a process standpoint, the ink formulations disposed on the ITM, after becoming devoid or substantially devoid of water, any co-solvent, and any other vaporizable material that would be vaporized under process conditions, e.g., pH adjusting agents, (producing "ink solids", a "dried ink residue", or the like), and/or the resins thereof, may have a $T_g$ of at least 42° C., at least 44° C., at least 46° C., at least 48° C., or at least 50° C.

In the event that multiple glass transition temperatures are observed, the term $T_g$, as used herein, refers to at least one of: (i) the glass transition temperature of the predominant resin, on a weight basis, and (ii) to the highest Tg of the plurality of resins.

Analysis of Ink Films on Printed Substrates 3 sheets of printed matter (based on B2, 750×530 mm) are subjected to the following procedure: after 1 week, the sheets are cut into 3×3 cm pieces and introduced into 300 grams of a solution containing 1% 2-amino-2-methyl-1-propanol dissolved in water, which is able to sufficiently dissolve ink images printed using various water-soluble inks. If, however, the solution remains colorless, the water is separated off and an identical weight of a less polar solvent, ethanol, is introduced. Again, if the solution remains colorless, the solvent is separated off, and an identical weight of a less polar solvent, methyl ethyl ketone, is introduced. The procedure continues with successfully less polar solvents: ethyl acetate, toluene, and Isopar™ (synthetic mixture of isoparaffins). After 5 hours stirring at room temperature with the most appropriate solvent, the mixture is filtered through a 5 micrometer filter. The filtrate or filtrates containing the dissolved ink is dried using a rotary evaporator. The residues are then dissolved in 5 grams of DMSO (or one of the above-listed solvents) and dried in an oven at 110° C. for 12 hours to yield the "recovered residue".

The thermo-rheological behavior of the recovered residue may then be characterized (e.g., by performing a viscosity "sweep" as a function of temperature, as described above) and compared with the thermo-rheological behavior of a dried sample of the original ink, when available. The inventors have found this procedure to provide a strong correlation between the thermo-rheological behavior of the recovered residue and the thermo-rheological behavior of a dried sample of the original ink. The inventors believe that this correlation may be attributed to both the increase in residence time and the use of additional solvents of varying polarity.

This procedure may advantageously be used to produce and thermo-rheologically characterize dry ink residues recovered from printed matter such as magazines and brochures.

One of ordinary skill in the art will readily appreciate that other, potentially superior, procedures may be used to de-ink a printed substrate and produce the recovered ink residue for rheological, thermo-rheological and/or chemical analysis.

Ink Formulations and Ink Film Compositions

Among other things, the present inkjet inks are aqueous inks, in that they contain water, usually at least 30 wt. % and more commonly around 50 wt. % or more; optionally, one or more water-miscible co-solvents; at least one colorant dispersed or at least partly dissolved in the water and optional co-solvent; and an organic polymeric resin binder, dispersed or at least partly dissolved in the water and optional co-solvent.

It will be appreciated that acrylic-based polymers may be negatively charged at alkaline pH. Consequently, in some embodiments, the resin binder has a negative charge at pH 8 or higher; in some embodiments the resin binder has a negative charge at pH 9 or higher. Furthermore, the solubility or the dispersability of the resin binder in water may be affected by pH. Thus in some embodiments, the formulation includes a pH-raising compound, non-limiting examples of which include diethyl amine, monoethanol amine, and 2-amino-2-methyl propanol. Such compounds, when included in the ink, are generally included in small amounts, e.g., about 1 wt. % of the formulation and usually not more than about 2 wt. % of the formulation. In other embodiments, the ink formulations are not supplemented by pH modifying agents.

The ink film of the inventive ink film construction contains at least one colorant. The concentration of the at least one colorant within the ink film may be at least 2%, at least 3%, at least 4%, at least 6%, at least 8%, at least 10%, at least 15%, at least 20%, or at least 22%, by weight of the complete ink formulation. Typically, the concentration of the at least one colorant within the ink film is at most 40%, at most 35%, at most 30%, or at most 25%.

More typically, the ink film may contain 2-30%, 3-25%, or 4-25% of the at least one colorant.

The particle size of the pigments may depend on the type of pigment and on the size reduction methods used in the preparation of the pigments. Generally, the $d_{50}$ of the pigment particles is expected to be within a range of 20 nm to 300 nm. Pigments of various particle sizes, utilized to give different colors, may be used for the same print.

The ink film contains at least one resin or resin binder, typically an organic polymeric resin. The concentration of the at least one resin within the ink film may be at least 10%, at least 15%, at least 20%, at least 25%, at least 35%, at least 40%, at least 50%, at least 60%, at least 70%, or at least 80%, by weight.

The total concentration of the colorant and the resin within the ink film may be at least 10%, at least 15%, at least 20%, at least 30%, or at least 40%, by weight. More typically, however, the total concentration of the colorant and the resin within the ink film may be at least 50%, at least 60%, at least 70%, at least 80%, or at least 85%. In many cases, the total concentration of the colorant and the resin within the ink film may be at least 90%, at least 95%, or at least 97% of the ink film weight.

Nominally, the resin dispersion may be, or include, a polyester (including co-polyester) or an acrylic styrene co-polymer (or co(ethylacrylate metacrylic acid) dispersion. The acrylic styrene co-polymer from the ink formulation ultimately remains in the ink film adhering to the printing substrate.

In one embodiment, the ink film in the ink film constructions according to the present invention is devoid or substantially devoid of wax. Typically, the ink film according to the present invention contains less than 30% wax, less than 20% wax, less than 15% wax, less than 10% wax, less than 7% wax, less than 5% wax, less than 3% wax, less than 2% wax, or less than 1% wax.

In one embodiment, the ink film according to the present invention is devoid or substantially devoid of oils such as mineral oils and vegetable oils (e.g., linseed oil and soybean oil), or various oils used in offset ink formulations. Typically, the ink film according to the present invention contains at most 20%, at most 12%, at most 8%, at most 5%, at most 3%, at most 1%, at most 0.5%, or at most 0.1%, by weight, of one or more oils, cross-linked fatty acids, or fatty acid derivatives produced upon air-drying.

In one embodiment, the ink film according to the present invention is devoid or substantially devoid of one or more salts, including salts used to coagulate or precipitate ink on a transfer member or on a substrate (e.g., calcium chloride). Typically, the ink film according to the present invention contains at most 8%, at most 5%, at most 4%, at most 3%, at most 1%, at most 0.5%, at most 0.3%, or at most 0.1% of one or more salts.

In one embodiment, the ink film according to the present invention is devoid or substantially devoid of one or more photoinitiators. Typically, the ink film according to the present invention contains at most 2%, at most 1%, at most 0.5%, at most 0.3%, at most 0.2%, or at most 0.1% of one or more photoinitiators.

In one embodiment, the printing substrate of the inventive ink film construction is devoid or substantially devoid of one or more soluble salts, including salts used for, or suitable for coagulating or precipitating ink, or components thereof, on the substrate (e.g., calcium chloride). In one embodiment, the printing substrate of the inventive ink film construction contains, per 1 $m^2$ of paper, at most 100 mg of soluble salts, at most 50 mg of soluble salts, or at most 30 mg of soluble salts, and more typically, at most 20 mg of soluble salts, at most 10 mg of soluble salts, at most 5 mg of soluble salts, or at most 2 mg of soluble salts.

In one embodiment, the ink film and formulation are substantially free of saccharides. Typically, the concentration of saccharides, by weight, within the inventive ink is at most 6%, at most 4%, at most 3%, at most 1%, at most 0.5%, at most 0.3%, or at most 0.1%.

In one embodiment, the ink film according to the present invention is devoid or substantially devoid of one or more priming agents (such as a coagulating agent or viscosity-building agent). Such priming agents may be jetted onto the surface of the substrate, or otherwise applied, as will be appreciated by those of ordinary skill in the art. The priming agents may be applied solely in the vicinity of the subsequently jetted drops, or may be applied substantially on the entire printing surface of the substrate. Typically, the ink film according to the present invention contains at most 2%, at most 1%, at most 0.5%, at most 0.3%, at most 0.2%, or at most 0.1% of such priming agents.

It will be appreciated that such a priming agent may chemically interact with the printing substrate, or, more commonly, with a component of an ink jet ink, to produce a "bonded priming agent". Thus, in one embodiment, the ink film according to the present invention is devoid or substantially devoid of one or more bonded priming agents. Typically, the ink film according to the present invention contains at most 2%, at most 1%, at most 0.5%, at most 0.3%, at most 0.2%, or at most 0.1% of such priming agents.

In one embodiment, the ink film in the ink film constructions according to the present invention contains at most 5%, at most 3%, at most 2%, at most 1%, or at most 0.5%, by weight, of inorganic filler particles such as silica.

In one embodiment, the dried resins present in the ink film of the invention may have a solubility of at least 3%, at least 5%, or at least 10% in water, at at least one particular temperature within a temperature range of 20° C. to 60° C., at a pH within a range of 7.5 to 10 or within a range of 8 to 11. In alternative embodiments, the polymeric resin is not highly soluble in water (e.g., less than 3%, by weight, at at least one pH within a range of 7.5 to 10), but dispersible therein.

In one embodiment, the recovered ink film of the invention may have a solubility of at least 3%, at least 5%, or at least 10% in water, at at least one particular temperature within a temperature range of 20° C. to 60° C., at a pH within a range of 8 to 10 or within a range of 8 to 11.

Waterfastness of Print Images

ASTM Standard F2292-03 (2008), "Standard Practice for Determining the Waterfastness of Images Produced by Ink Jet Printers Utilizing Four Different Test Methods—Drip, Spray, Submersion and Rub", may be used to assess the waterfastness of ink dots and films printed on various substrates. The waterfastness of ink constructions according to the present invention can be evaluated by three of these test methods: drip, spray, and submersion.

In all three tests, several inventive ink film constructions exhibited complete waterfastness; no ink bleeding, smearing or transfer was observed.

In some embodiments, the upper film surface contains at least one of PEI, a poly quaternium cationic guar, such as a guar hydroxypropyltrimonium chloride, and a hydroxypropyl guar hydroxypropyltrimonium chloride.

In some embodiments, the upper film surface contains a polymer having quaternary amine groups, such as an HCl salt of various primary amines.

As used herein in the specification and in the claims section that follows, the term "dye" refers to at least one colored substance that is soluble or goes into solution during the application process and imparts color by selective absorption of light.

As used herein in the specification and in the claims section that follows, the term "average particle size", or "$d_{50}$", with reference to the particle size of pigments, refers to an average particle size, by volume, as determined by a laser diffraction particle size analyzer (e.g., Mastersizer™ 2000 of Malvern Instruments, England) or by a dynamic light scattering particle size analyzer (e.g., Zetasizer™ Nano-S, ZEN1600, also of Malvern Instruments, England), using standard practice.

As used herein in the specification and in the claims section that follows, the term "geometric projection" refers to an imaginary geometric construct that is projected onto a printed face of a printing substrate.

As used herein in the specification and in the claims section that follows, the term "distinct ink dot" refers to any ink dot or ink dot image, at least partially disposed within the "geometric projection", that is neither a "satellite", nor an overlapping dot or dot image.

As used herein in the specification and in the claims section that follows, the term "mean deviation", with respect to the roundness, convexity, and the like, of a plurality of "distinct ink dots", refers to the sum of the individual distinct ink dot deviations divided by the number of individual distinct ink dots.

As used herein in the specification and in the claims section that follows, the term "weight" or "weight ratio", with respect to a resin in a formulation or dried ink residue, is meant to include the entire resin content within that formulation or residue, including, by way of example, the resin "binder" and any resin dispersant.

As used herein in the specification and in the claims section that follows, the term "softening agent" is used as the term would normally be understood by those of skill in the art of polymeric resins. Thus, by way of example, a material added to a particular polymeric resin in a ratio of 1:1 by weight, and attained insignificant softening of the resin (e.g., the Tg was lowered by less than 1° C.), would not be considered a "softening agent" with respect to that particular polymeric resin.

With regard to fibrous printing substrates, persons skilled in the printing arts will appreciate that coated papers used for printing may be generally classified, functionally and/or chemically, into two groups, coated papers designed for use with non-inkjet printing methods (e.g., offset printing) and coated papers designed specifically for use with inkjet printing methods employing aqueous inks. As is known in the art, the former type of coated papers utilize mineral fillers not only to replace some of the paper fibers in order to reduce costs, but to impart specific properties to paper, such as improved printability, brightness, opacity, and smoothness. In paper coating, minerals are used as white pigments to conceal the fiber, thereby improving brightness, whiteness, opacity, and smoothness. Minerals commonly used to this end are kaolin, calcined clay, ground calcium carbonate, precipitated calcium carbonate, talc, gypsum, alumina, satin white, blanc fixe, zinc sulfide, zinc oxide, and plastic pigment (polystyrene).

Coated papers designed for use in non-inkjet printing methods have hitherto been unsuitable for use with aqueous inkjet inks, or produce print dots or splotches that may be manifestly different from the printed ink film constructions of the present invention.

In contrast, specialty coated papers designed for use with inkjet inks, which in some cases may have layer of filler pigment as with other types of coated papers, may also include a layer of highly porous mineral, usually silica, in combination with a water-soluble polymer such as polyvinyl alcohol (PVA) or polyvinyl pyrrolidone (PVP), which acts as a binder, upon which the ink is printed. Such coated inkjet papers are designed to quickly remove the water from the printed ink, facilitating the printing of ink droplets with good uniformity and edge roughness. The present invention encompasses ink droplets printed on uncoated paper as well as coated paper not designed for inkjet use, but some embodiments of the present invention are not intended to encompass ink droplets printed on special coated inkjet paper.

Thus, in some embodiments, the substrate is an uncoated paper. In other embodiments, the substrate is a coated paper that does not contain a water-soluble polymer binder in a layer upon which the ink is printed.

As used herein in the specification and in the claims section that follows, the term "commodity coated fibrous printing substrate" is meant to exclude specialty and high-end coated papers, including photographic paper and coated inkjet papers.

In a typical paper coating of a commodity coated fibrous printing substrate, the coating formulation may be prepared by dispersing pigments, such as kaolin clay and calcium carbonate into water, then adding in binder, such as polystyrene butadiene copolymer and/or an aqueous solution of cooked starch. Other paper coating ingredients, such as rheological modifiers, biocides, lubricants, antifoaming compounds, crosslinkers, and pH adjusting additives may also be present in small amounts in the coating.

Examples of pigments that can be used in coating formulations are kaolin, calcium carbonate (chalk), China clay, amorphous silica, silicates, barium sulfate, satin white, aluminum trihydrate, talcum, titanium dioxide and mixtures thereof. Examples of binders are starch, casein, soy protein, polyvinylacetate, styrene butadiene latex, acrylate latex, vinylacrylic latex, and mixtures thereof. Other ingredients that may be present in the paper coating are, for example, dispersants such as polyacrylates, lubricants such as stearic acid salts, preservatives, antifoam agents that can be either oil based, such as dispersed silica in hydrocarbon oil, or water-based such as hexalene glycol, pH adjusting agents such as sodium hydroxide, rheology modifiers such as sodium alginates, carboxymethylcellulose, starch, protein, high viscosity hydroxyethylcellulose, and alkali-soluble lattices.

As used herein in the specification and in the claims section that follows, the term "fibrous printing substrate" of the present invention is specifically meant to include:

Newsprint papers including standard newsprint, telephone directory paper, machine-finished paper, and super-calendered paper;
Coated mechanical papers including light-weight coated paper, medium-weight coated paper, high-weight coated paper, machine finished coated papers, film coated offset;
Woodfree uncoated papers including offset papers, light-weight papers;
Woodfree coated papers including standard coated fine papers, low coat weight papers, art papers;
Special fine papers including copy papers, digital printing papers, continuous stationery;
Paperboards and Cartonboards; and
Containerboards.

As used herein in the specification and in the claims section that follows, the term "fibrous printing substrate" of the present invention is specifically meant to include all five types of fibrous offset substrates described in ISO 12647-2.

As used herein in the specification and in the claims section that follows, the term "dispersed", with regard to a polymeric resin, is meant to include a polymeric resin that is partially dissolved.

As used herein in the specification and in the claims section that follows, the term "jettable ink formulation", and the like, refers to an ink formulation that is suitable for repeated drop-on-demand jetting using a drop-on-demand piezo print head.

The patent or application file contains at least one drawing executed in color. Copies of this patent or patent application publication with color drawing(s) will be provided by the Office upon request and payment of the necessary fee.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including PCT Publications Nos. WO 2013/132418, WO 2013/132419, WO 2013/132420, WO 2013/132424, WO 2013/136220, WO 2013/132339, WO 2013/132432 and WO 2013/132438, are hereby incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A water-based ink formulation comprising:
   (a) a solvent containing water;
   (b) at least one colorant dispersed or at least partly dissolved within the solvent; and
   (c) at least one organic polymeric resin, dispersed within the solvent; and
   (d) a softening agent selected to reduce a glass transition temperature ($T_g$) of said polymeric resin, the ink formulation forming, when dried, a substantially dry ink residue having:
   (i) a first dynamic viscosity within a range of $10^6$ cP to $3 \cdot 10^8$ cP over at least part of a first temperature range of 60° C. to 110° C.; and
   (ii) a second dynamic viscosity of at least $6 \cdot 10^7$ cP, over at least a part of a second temperature range of 50° C. to 55° C.;
   said second dynamic viscosity at 55° C. exceeding the first dynamic viscosity at 85° C.;
   said softening agent having a pure vapor pressure of at most 0.40 kPa at 150° C.;
   at least one particular resin of said organic polymeric resin having an elevated glass transition temperature ($T_g$) of at least 56° C.;
   wherein said softening agent is selected and/or added in an amount to reduce said elevated glass transition temperature by at least 5° C.;
   wherein the ink formulation is devoid of inorganic filler particles;
   and wherein a weight ratio of said organic polymeric resin to said colorant is at least 3.5:1.

2. The ink formulation of claim 1, wherein the formulation is an aqueous inkjet ink having at least one of:
   (i) a viscosity of 2 to 25 cP at at least one particular temperature in a jetting temperature range of 20-60° C.; and
   (ii) a surface tension of at most 50 milliNewton/m at at least one particular temperature within said jetting temperature range.

3. A water-based aqueous inkjet ink formulation comprising:
   (a) a solvent containing water;
   (b) at least one colorant dispersed or at least partly dissolved within the solvent; and
   (c) at least one organic polymeric resin, dispersed within the solvent; and
   (d) a softening agent selected to reduce a glass transition temperature ($T_g$) of said polymeric resin, the ink formulation forming, when dried, a substantially dry ink residue having:
   (i) a first dynamic viscosity within a range of $10^6$ cP to $3 \cdot 10^8$ cP over at least part of a first temperature range of 60° C. to 110° C.; and
   (ii) a second dynamic viscosity of at least $6 \cdot 10^7$ cP, over at least a part of a second temperature range of 50° C. to 55° C.;
   said second dynamic viscosity at 55° C. exceeding the first dynamic viscosity at 85° C.;
   said softening agent having a pure vapor pressure of at most 0.40 kPa at 150° C.;
   at least one particular resin of said organic polymeric resin having an elevated glass transition temperature ($T_g$) of at least 54° C.;

wherein said softening agent is selected and/or added in an amount to reduce said elevated glass transition temperature by at least 5° C.;

wherein the ink formation is devoid of inorganic filler particles;

and wherein the ink formulation has at least one of the following properties:

(i) a viscosity of 2 to 25 cP at at least one particular temperature in a jetting temperature range of 20-60° C.; and (ii) a surface tension of at most 50 milliNewton/m at at least one particular temperature within said jetting temperature range.

4. The formulation of claim 3, wherein said softening agent is selected and/or added in an amount to reduce said elevated glass transition temperature by at least 7° C.

5. The formulation of claim 3, wherein said softening agent is selected and/or added in an amount to reduce said elevated glass transition temperature by at least 10° C.

6. The formulation of claim 3, wherein said softening agent is selected and/or added in an amount to reduce said elevated glass transition temperature by at least 15° C.

7. The ink formulation of claim 3, the formulation having a total solids content, and wherein a weight ratio of said softening agent to said total solids content is at least 0.08.

8. The ink formulation of claim 3, the formulation having a total solids content, and wherein a weight ratio of said softening agent to said total solids content is at least 0.10.

9. The formulation of claim 3, wherein $\Delta T$ defines a temperature differential between a temperature ($T_F$) at which said dried ink residue begins to exhibit a particular degree of flowability, and a baseline temperature ($T_B$):

$$\Delta T = T_F - T_B$$

said degree of flowability being defined by a critical viscosity ($\mu_{CR}$) at which said degree of flowability is achieved, and wherein, when said baseline temperature equals 50° C., and said critical viscosity equals $10^8$ cP, said temperature differential is at least 3° C.

10. The formulation of claim 3, said polymeric resin including, mainly including, or consisting essentially of an acrylic-based polymer selected from the group consisting of an acrylic polymer and an acrylic-styrene copolymer.

11. The ink formulation of claim 3, wherein a weight ratio of said organic polymeric resin to said colorant is at least 3.5:1.

12. The formulation of claim 11, wherein said weight ratio of said organic polymeric resin to said colorant is at least 4:1.

13. The formulation of claim 11 wherein said weight ratio of said organic polymeric resin to said colorant is at least 5:1.

14. The formulation of claim 13, wherein said elevated glass transition temperature ($T_g$) is at least 60° C.

15. The formulation of claim 14, wherein a weight ratio of said softening agent to said substantially dry ink residue is within a range of 0.06 to 0.25.

16. The ink formulation of claim 13, the formulation having a total solids content, and wherein a weight ratio of said softening agent to said total solids content is at least 0.08.

17. The formulation of claim 11, wherein said elevated glass transition temperature ($T_g$) is at least 60° C.

18. An ink film construction including: (a) a printing substrate; and (b) at least one substantially dry ink film, fixedly adhered to a surface of the printing substrate, the ink film containing at least one colorant dispersed in an organic polymeric resin; wherein a dynamic viscosity of the ink film is within a range of $10^6$ cP to $5 \cdot 10^7$ cP over at least part of a first temperature range of 60° C. to 87.5° C., and at least $6 \cdot 10^7$ cP over at least a part of a second temperature range of 50° C. to 55° C., wherein a weight ratio of said organic polymeric resin to said colorant is at least 3.5:1 and wherein the substantially dry ink film is devoid of inorganic filler particles.

19. The ink film construction of claim 18, a viscosity of said substantially dry ink residue monotonically increasing with temperature decreasing from 85° C. to 55° C.

* * * * *